United States Patent [19]
Gannett

[11] Patent Number: 5,790,130
[45] Date of Patent: *Aug. 4, 1998

[54] TEXEL CACHE INTERRUPT DAEMON FOR VIRTUAL MEMORY MANAGEMENT OF TEXTURE MAPS

[75] Inventor: Ethan W. Gannett, Ft. Collins, Colo.

[73] Assignee: Hewlett-Packard Company, Palo Alto, Calif.

[*] Notice: The term of this patent shall not extend beyond the expiration date of Pat. No. 5,778,028.

[21] Appl. No.: 486,447

[22] Filed: Jun. 8, 1995

[51] Int. Cl.$^6$ .................................................. G06T 11/40
[52] U.S. Cl. ............................................. 345/430; 345/511
[58] Field of Search ........................... 358/93; 364/340, 364/993; 395/125, 130, 126, 162, 166, 163, 164, 165, 511; 345/201, 203, 508, 511, 425, 426, 430

[56] References Cited

U.S. PATENT DOCUMENTS

| | | | |
|---|---|---|---|
| 4,692,880 | 9/1987 | Merz et al. | 364/521 |
| 4,935,879 | 6/1990 | Ueda | 364/518 |
| 4,945,495 | 7/1990 | Ueda | 364/518 |
| 5,029,225 | 7/1991 | Ueda | 382/28 |
| 5,097,427 | 3/1992 | Lathrop et al. | 395/130 |
| 5,224,208 | 6/1993 | Miller, Jr. et al. | 395/125 |
| 5,495,563 | 2/1996 | Winser | 395/130 |
| 5,537,224 | 7/1996 | Suzuoki et al. | 358/462 |
| 5,553,208 | 9/1996 | Murata et al. | 395/125 |

OTHER PUBLICATIONS

Stone, "Microcomputer Interfacing", Addison–Wesley Publishing Company, pp. 1–25, 1983.

Primary Examiner—Mark K. Zimmerman

[57] ABSTRACT

A texture mapping computer graphics system includes a host computer having a system memory that stores texture data. A graphics hardware device, coupled to the host computer, renders texture mapped images, and includes a local memory that stores at least a portion of the texture data stored in the system memory at any one time. A software daemon runs on the processor of the host computer and manages transferring texture data from the system memory to the local memory when needed by the hardware device to render an image. The software daemon monitors use by the hardware device of texture data blocks stored in the local memory. The daemon also tracks the priorities of the texture stored in the main memory so that lowest priority and least recently used texture data blocks in the local memory are replaced with texture data blocks needed by the hardware device to render images.

24 Claims, 36 Drawing Sheets

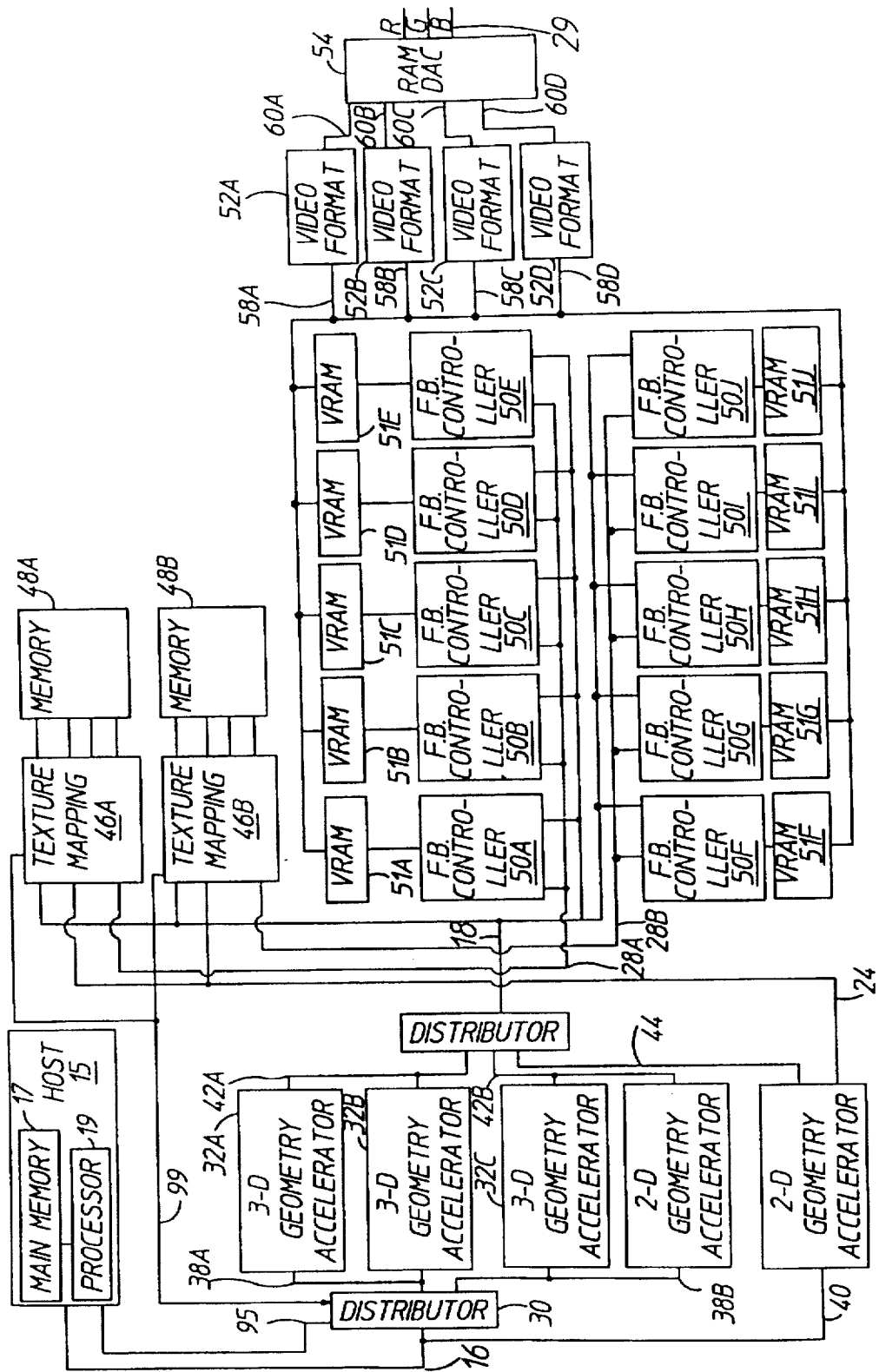

$S_8, T_8 = 1, 0$
BLOCK 2, BANK 0

$S_8, T_8 = 1, 1$
BLOCK 4, BANK 0

$S_8, T_8 = 0, 0$
BLOCK 1, BANK 1

$S_8, T_8 = 0, 1$
BLOCK 3, BANK 1

MAP 9

FIG 17

| ST3 | ST2 | ST1 | ST0 |
|---|---|---|---|
| ST7 | ST6 | ST5 | ST4 |
| ST11 | ST10 | ST9 | ST8 |
| ST15 | ST14 | ST13 | ST12 |

BLOCK 2, BANK 0

| ST0 | ST1 | ST2 | ST3 |
|---|---|---|---|
| ST4 | ST5 | ST6 | ST7 |
| ST8 | ST9 | ST10 | ST11 |
| ST12 | ST13 | ST14 | ST15 |

BLOCK 1, BANK 1

| MAP NUMBER | MAP BIT | BLOCK TAG [22:0]=(TEXTURE ID [1:0], MAP BIT, T [14:8],S[14:8]) | | | BANK |
| --- | --- | --- | --- | --- | --- |
| | | T PARAMETER AXIS MSBs | S PARAMETER AXIS MSBs | | |
| 15 | 0 | t14 t13 t12 t11 t10 t09 t08 | s14 s13 s12 s11 s10 s09 s08 | | It14^s14 |
| 14 | 1 | 0 t13 t12 t11 t10 t09 t08 | 0 s13 s12 s11 s10 s09 s08 | | It13^s13 |
| 13 | 1 | 1 0 t12 t11 t10 t09 t08 | 0 0 s12 s11 s10 s09 s08 | | It12^s12 |
| 12 | 1 | 1 1 0 t11 t10 t09 t08 | 0 0 0 s11 s10 s09 s08 | | It11^s11 |
| 11 | 1 | 1 1 1 0 t10 t09 t08 | 0 0 0 0 s10 s09 s08 | | It10^s10 |
| 10 | 1 | 1 1 1 1 0 t09 t08 | 0 0 0 0 0 s09 s08 | | It9^s9 |
| 9 | 1 | 1 1 1 1 1 0 t08 | 0 0 0 0 0 0 s08 | | It8^s8 |
| =8 | 1 | 1 1 1 1 1 1 0 | 0 0 0 0 0 0 0 | | tag[7] |
| <8 | 1 | 1 1 1 1 1 1 1 | 0 0 0 0 0 0 0 | | tag[7] |

FIG 18

| TEXEL_COMMAND REGISTER |||||||||
|---|---|---|---|---|---|---|---|---|
| 31:9 | 8 | 7 | 6:4 | 3 | 2 | 1 | 0 |
| UNUSED | HALT | INTERRUPT ENABLED | UNUSED | WRITE LOKI 1 | WRITE LOKI 0 | UNUSED | LOKI READ |
| | 350 | 352 | | 356 | 359 | | 358 |

| TEXEL_STATUS REGISTER |||||||||
|---|---|---|---|---|---|---|---|
| 31:7 | 6 | 5 | 4 | 3 | 2 | 1 | 0 |
| UNUSED | DUAL LOKI | UNUSED | INTERRUPT VALID | INTERRUPT ENABLED | HALTED | HALT ENABLED | UNUSED |
| | 360 | | 364 | 362 | 368 | 366 | |

| PIPE_TAG REGISTER ||
|---|---|
| 31:23 | 22:0 |
| UNUSED | BLOCK TAG |
| | 370 |

| TEXEL_DATA REGISTER ||||
|---|---|---|---|
| 31:24 | 23:16 | 15:8 | 7:0 |
| ALPHA | RED | GREEN | BLUE |
| 372 | 374 | 376 | 378 |

| TEXEL_CACHE_ADD REGISTER |||
|---|---|---|
| 32:22 | 21:16 | 15:0 |
| UNUSED | BLOCK INDEX | BLOCK ADDRESS |
| | 380 | 382 |

| TEXEL_DIR_TAG REGISTER ||
|---|---|
| 31:23 | 22:0 |
| UNUSED | BLOCK TAG |
| | 384 |

FIG 20

TEXEL CACHE INTERRUPT DAEMON FOR VIRTUAL MEMORY MANAGEMENT OF TEXTURE MAPS

FIELD OF THE INVENTION

The present invention relates generally to software memory management of texture maps of a texture mapping computer graphics system and, more particularly, to a daemon based virtual memory management of a hardware device local cache memory system that stores texture mapping data.

BACKGROUND OF THE INVENTION

Computer graphics systems commonly are used for displaying graphical representations of objects on a two dimensional display screen. Current computer graphics systems can provide highly detailed representations and are used in a variety of applications.

In typical computer graphics systems, an object to be represented on the display screen is broken down into a plurality of graphics primitives. Primitives are basic components of a graphics picture and may include points, lines, vectors and polygons, such as triangles. Typically, a hardware/software scheme is implemented to render, or draw, on the two-dimensional display screen, the graphics primitives that represent the view of one or more objects being represented on the screen.

Typically, the primitives that define the three-dimensional object to be rendered are provided from a host computer, which defines each primitive in terms of primitive data. For example, when the primitive is a triangle, the host computer may define the primitive in terms of the x,y,z coordinates of its vertices, as well as the R,G,B color values of each vertex. Rendering hardware interpolates the primitive data to compute the display screen pixels that are turned on to represent each primitive, and the R,G,B values for each pixel.

Early graphics systems failed to display images in a sufficiently realistic manner to represent or model complex three-dimensional objects. The images displayed by such systems exhibited extremely smooth surfaces absent textures, bumps, scratches, shadows and other surface details present in the object being modeled.

As a result, methods were developed to display images with improved surface detail. Texture mapping is one such method that involves mapping a source image, referred to as a texture, onto a surface of a three-dimensional object, and thereafter mapping the textured three-dimensional object to the two-dimensional graphics display screen to display the resulting image. Surface detail attributes commonly texture mapped include color, specular reflection, vector perturbation, specularity, transparency, shadows, surface irregularities and grading.

Texture mapping involves applying one or more point elements (texels) of a texture to each point element (pixel) of the displayed portion of the object to which the texture is being mapped. Texture mapping hardware is conventionally provided with information indicating the manner in which the texels in a texture map correspond to the pixels on the display screen that represent the object. Each texel in a texture map is defined by S and T coordinates which identify its location in the two-dimensional texture map. For each pixel, the corresponding texel or texels that map to it are accessed from the texture map, and incorporated into the final R,G,B values generated for the pixel to represent the textured object on the display screen.

It should be understood that each pixel in an object primitive may not map in one-to-one correspondence with a single texel in the texture map for every view of the object. For example, the closer the object is to the view port represented on the display screen, the larger the object will appear. As the object appears larger on the display screen, the representation of the texture becomes more detailed. Thus, when the object consumes a fairly large portion of the display screen, a large number of pixels is used to represent the object on the display screen, and each pixel that represents the object may map in one-to-one correspondence with a single texel in the texture map, or a single texel may map to multiple pixels. However, when the object takes up a relatively small portion of the display screen, a much smaller number of pixels is used to represent the object, resulting in the texture being represented with less detail, so that each pixel may map to multiple texels. Each pixel may map to multiple texels also when a texture is mapped to a small portion of an object. Resultant texel data is calculated for each pixel that maps to more than one texel. Because it is common for a pixel to map to multiple texels, resultant texel data for a pixel typically represents an average of the texels that map to that pixel.

Texture mapping hardware systems typically include a local memory that stores data representing a texture associated with the object being rendered. As discussed above, a pixel may map to multiple texels. If it were necessary for the texture mapping hardware to read a large number of texels that map to a pixel from the local memory to generate an average value, then a large number of memory reads and the averaging of many texel values would be required, which would be time consuming and would degrade system performance.

To overcome this problem, a scheme has been developed that involves the creation of a series of MIP maps for each texture, and storing the MIP maps of the texture associated with the object being rendered in the local memory of the texture mapping hardware. A MIP map for a texture includes a base map that corresponds directly to the texture map, as well as a series of filtered maps, wherein each successive map is reduced in size by a factor of two in each of the two texture map dimensions. An illustrative example of a set of MIP maps is shown in FIG. 1. The MIP (multum in parvo-many things in a small place) maps include a base map 100 that is eight-by-eight texels in size, as well as a series of maps 102, 104 and 108 that are respectively four-by-four texels, two-by-two texels, and one texel in size.

The four-by-four map 102 is generated by box filtering (decimating) the base map 100, such that each texel in the map 102 corresponds to an average of four texels in the base map 100. For example, the texel 110 in map 102 equals the average of the texels 112–115 in map 100, and texels 118 and 120 in map 102 respectively equal the averages of texels 121–124 and 125–128 in map 100. The two-by-two map 104 is similarly generated by box filtering map 102, such that texel 130 in map 104 equals the average of texels 110 and 118–120 in map 102. The single texel in map 108 is generated by averaging the four texels in map 104.

Conventional graphics systems generally download, from the main memory of the host computer to the local memory of the texture mapping hardware, the complete series of MIP maps for any texture that is to be used with the primitives to be rendered on the display screen. Thus, the texture mapping hardware can access texture data from any of the series of MIP maps. The determination of which map to access to provide the texel data for any particular pixel is based upon the number of texels to which the pixel maps. For example, if the pixel maps in one-to-one correspondence with a single texel in the texture map, then the base map 100 is accessed. However, if the pixel maps to four, sixteen or sixty-four texels, then the maps 102, 104 and 108 are respectively accessed because those maps respectively store texel data representing an average of four, sixteen and sixty-four texels in the texture map.

Furthermore, some texture mapping systems are pipelined so that various operations are performed simultaneously on different object primitives. However, a series of MIP maps for a texture can be large. Most systems employ a local memory that is capable of storing only one such large series of MIP maps at a time. Thus, when there is a switch in the texture used in rendering primitives, the system must download a new series of MIP maps. Typically, the data path used to load the new texture data into the local memory in the texture mapping hardware includes passing through the system's primitive rendering pipeline. Therefore, when a new texture is to be mapped, the primitive rendering pipeline must be allowed to empty out before the new series of MIP maps can be downloaded. Once the series of MIP maps is downloaded, the pipeline must again be filled. The necessity of flushing the primitive rendering pipeline each time a new texture is required reduces the system's bandwidth.

FIG. 2 is a part hardware, part heiarchical software block diagram of a conventional computer graphics system showing the layers of software that run on the processor of the system host computer as well as the hardware device with which the host computer communicates to render the texture mapped images. The system memory of the host computer may store multiple user interactive processes PR1, PR2 . . . PRN that can run on the system processor, as shown in FIG. 2. Each process is a high level computer graphics software program or application such as a database, a CAD/CAM application, an architectural design application, a civil engineering application, a word processing package, or the like.

Within a particular process, a user can create multiple contexts. Each context created within a process may include a different view of the same image. For example, in an architectural engineering design application process, a user may create different views of the same structure, such as a building. Each context may require texture mapping to render the image. In this example, texture maps may be required to render the floors, walls, ceilings and other surface attributes of the building. Thus, the user provides the texture map or maps to render the image of that context. Because multiple contexts created within the same process typically include different views of the same image, the contexts within a process commonly require the same texture or textures.

When a context is created by a user, the user issues a command recognizable by the high level process programming language to draw that image. If the image requires a texture map, then a command is entered indicating that and the texture map is then provided by the user from an external input device, floppy disk, or the like. The process, or high level programming language, then translates that command to a lower level software command and copies the texture entered by the user. In prior art systems, such as that shown in FIG. 2, each context created within a single process requires its own copy of that texture. Each context stores its copy of the texture within a dedicated area of system memory on the host computer. Thus, when multiple contexts within a process require use of the same texture, multiple copies of that texture are stored within the system memory, one copy corresponding to each context.

The user-entered command to draw an image using a particular texture, once translated by the process, is communicated from the process to an underlying graphics application programmer interface (API). As shown in FIG. 2, a unique graphics API communicates with each process of the system. Each graphics API is an underlying lower level software language, which operates on the processor of the host computer, to translate each high level graphics command received from the corresponding process to a lower level software code command. The graphics API also stores a copy of each texture required to render the image in its own dedicated location of the system memory. The graphics API additionally breaks down the image to be rendered into graphics components such as quadrilaterals or polygons. Such information then is provided to a corresponding hardware driver.

A unique hardware driver communicates with each graphics API. Each hardware driver is another underlying lower level graphics software language that translates each low level graphics command received from the API to hardware commands recognizable by the graphics hardware device to which the host computer is connected. These commands then are communicated from the hardware driver to the hardware device which, in response, renders the texture mapped image on a display screen connected to the hardware device. As shown in FIG. 2, a unique instance of a hardware driver HWD1, HWD2 . . . HWDN communicates with each graphics API, API1, API2 . . . APIN.

In the example shown in FIG. 2, all of the hardware drivers are connected to a single graphics hardware device 150. As will be understood by those skilled in the art, however, the host computer may be connected to multiple different graphics hardware devices, with a different hardware driver communicating with each hardware device.

When a graphics API provides a low level software command to render a texture mapped polygon using a particular texture that also is provided, the graphics hardware driver translates that low level command into hardware commands recognizable by the hardware device 150. The graphics hardware driver then provides the commands to render the polygon to the hardware device 150 by writing to appropriate registers and input buffers within the hardware device. Additionally, the graphics hardware driver provides the texture data for that particular polygon to the local memory 155 of the hardware device 150 where it is temporarily stored during rendering of that polygon. As is described herein, prior art computer graphics systems download the entire series of MIP maps for a single texture from the graphics hardware driver to the local memory of the hardware device each time that texture is required to render an image or component of the image.

With conventional systems, such as the one shown in FIG. 2, multiple copies of a single texture are stored in different locations of the system software memory of the host computer. For example, if context 1A and context 1B of process PR1 require the same texture to render different views of a particular image, then the user provides a first copy of that texture when it is initially defined and introduced to the process. Each context 1A and 1B within that process PR1 also stores a copy of the texture, bringing the subtotal to three software copies of the same texture stored by process PR1. The graphics API1 makes a fourth copy of that texture and stores it in its appropriated location of the system software memory. The graphics hardware driver HWD1 makes a fifth copy of that texture and stores it in its appropriated location of the system software memory. Thus, five unique copies of the same texture are stored in different locations of the system software memory to render two views of the same image using that same texture.

Additionally, as described above, a sixth copy of the texture is provided to the hardware device and stored in the local memory thereof.

A series of texture MIP maps can require a large amount of system software memory for storage. For example, a series of MIP maps for a texture having a texture base map of 1024×1024 texels requires more than five megabytes of system software memory to store one copy of the MIP mapped texture. Thus, the multiple stored copies of the MIP mapped texture uses a significant amount of system software memory.

While system software memory may be able to store up to a few gigabytes of software data, typical dedicated local hardware texture memory of a texture hardware device can store much less data. Such local texture hardware memory can range from four megabytes to sixteen megabytes. In many texture mapping applications, therefore, the amount of system memory consumed by textures far exceeds that of the local hardware texture memory. While the system memory typically stores multiple MIP mapped textures for use with multiple contexts of a process, the local hardware device memory may store only one texture of a limited size at any one time. Therefore, proper management of the local texture memory of the hardware device is critical to achieve maximum performance of the system.

In addition to the large consumption of system software memory due to the storage of multiple copies of textures, system bandwidth generally suffers with conventional local hardware texture memory management schemes. Conventional local hardware memory management schemes repeatedly replace entire series of texture MIP maps within the local hardware memory. The series of MIP maps for a texture is replaced in the local memory each time that texture is needed to render a polygon. Such schemes both fail to consider the history of the use of that texture and to predict future use of that texture. By repeatedly downloading the entire series of the same texture from the system memory into the local hardware texture memory, system bandwidth is negatively affected.

Because conventional texture hardware memory replacement algorithms download entire texture MIP map series, each texture MIP map series cannot exceed the physical storage capacity limits of the local hardware texture memory. Therefore, the user of the graphics process that is connected to the particular hardware device, is required to know the capacity of the local texture memory so that textures greater than that capacity will not be used. While many applications (processes) can operate with several different underlying hardware devices, each with unique local texture memory constraints, the burden falls on the user to have knowledge of such constraints and create images in a device-dependent manner.

SUMMARY OF THE INVENTION

In one embodiment of the invention, a texture mapping computer graphics system is provided. The system includes a host computer having a system memory that stores texture data. A graphics hardware device, coupled to the host computer, renders texture mapped images. The hardware device includes a local memory that stores at least a portion of the texture data stored in the system memory at any one time. A software daemon runs on a processor of the host computer. The software daemon manages transferring texture data from the system memory to the local memory when needed by the hardware device to render an image.

In another embodiment of the invention, a method is provided for managing texture data in a texture mapping computer graphics system. The system includes a host computer with a 9 main memory that stores texture data. A hardware device, coupled to the host computer, has a local memory that stores in blocks at least a portion of the texture data stored in the main memory at any one time. The hardware device renders texture mapped images using the texture data stored in the local memory. The method includes the following steps: monitoring the use by the hardware device of the texture data blocks stored in the local memory; tracking the priorities of the texture stored in the main memory; and replacing lowest priority and least recently used texture data blocks in the local memory with texture data blocks needed by the hardware device to render images.

Another embodiment of the invention relates to a software system that runs on the processor of a computer graphics system. The processor also runs at least one computer graphics process, an underlying graphics API for each process, and an underlying hardware driver for each process. The computer graphics system also includes a hardware device, connected to the processor, that renders texture mapped images. The software system includes a daemon that manages the downloading of texture data from the processor to the hardware device. The software system also includes a shared memory area that stores texture data accessible by the daemon, the graphics API and the hardware driver.

In another embodiment of the invention, a software daemon is provided that manages texture data in a texture mapping computer graphics system. The system includes a processor on which the software daemon and at least one graphics process runs. A user can create multiple contexts within each process. The system also includes at least one graphics hardware device, coupled to the processor, that renders texture mapped images created in the at least one graphics process. The daemon includes a device independent portion that manages texture data for each process separately such that a single stored copy of a texture is shared among a plurality of contexts within the same process. The daemon also includes a device dependent portion for writing texture data to the graphics hardware device.

BRIEF DESCRIPTION OF THE DRAWINGS

For a better understanding of the present invention, reference is made to the accompanying drawings, which are incorporated herein by reference and in which:

FIG. 4A is a block diagram of another embodiment of a computer graphics hardware device with which the software daemon of the present invention can be used;

FIG. 8 is a diagram of a texture MIP map with texels arranged to take advantage of the local hardware device memory;

FIG. 16 is a diagram of a MIP map illustrating how the MIP map is partitioned according to a memory storage scheme;

FIG. 17 is a more detailed diagram of portions of the map shown in FIG. 16 illustrating how the map is further partitioned according to a memory storage scheme;

FIG. 18 is a diagram illustrating the manner in which the cache block tag is generated;

FIG. 20 is a diagram illustrating the texel port registers provided in the texture mapping chip;

DETAILED DESCRIPTION

I. System Overview

The present invention relates to a software daemon that runs on the processor of a computer graphics system host computer and manages the storage of texture data within the local memory of a texture mapping graphics hardware device connected to the host computer. The daemon manages the local memory in such a way that the memory appears virtual. By contrast with prior art systems that download entire series of texture MIP maps into the local memory of the hardware device, the software manager of the present invention downloads only portions of texture MIP maps necessary at any one time to render an image or image portion. The manager considers the recent past frequency of use of particular texture map portions as well as the predicted future use of such map portions (based on relative priorities of the textures) in determining which portions to replace in the local hardware memory when new texture data is required by the hardware device to render an image or portion thereof.

In one embodiment of the invention, the manager provides for the shared storing of textures among the manager, the hardware driver and the corresponding graphics API within the system memory. The manager also provides for shared storing of textures among multiple contexts of a single process. The management scheme of the present invention provides tremendous bandwidth savings and system software memory space savings in contrast with the prior art. The system additionally enables the user of the high level graphics processes to create images in a device independent manner, without knowledge of the storage capacity limits of the local memories of the underlying hardware devices.

Figure 2:
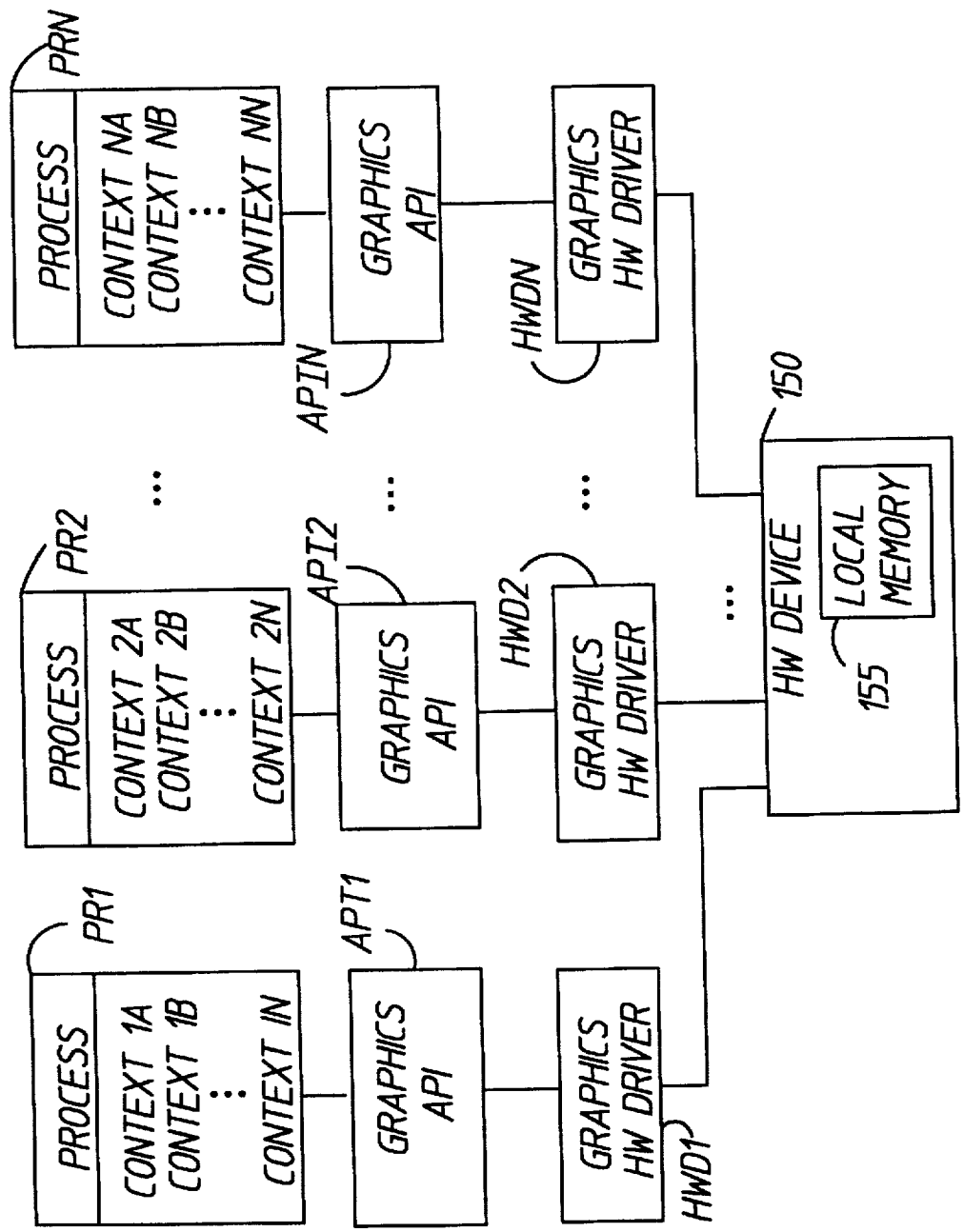
FIG. 2 is a part hardware, part heirarchical software block diagram of a prior art computer graphics system.
Figure 3:
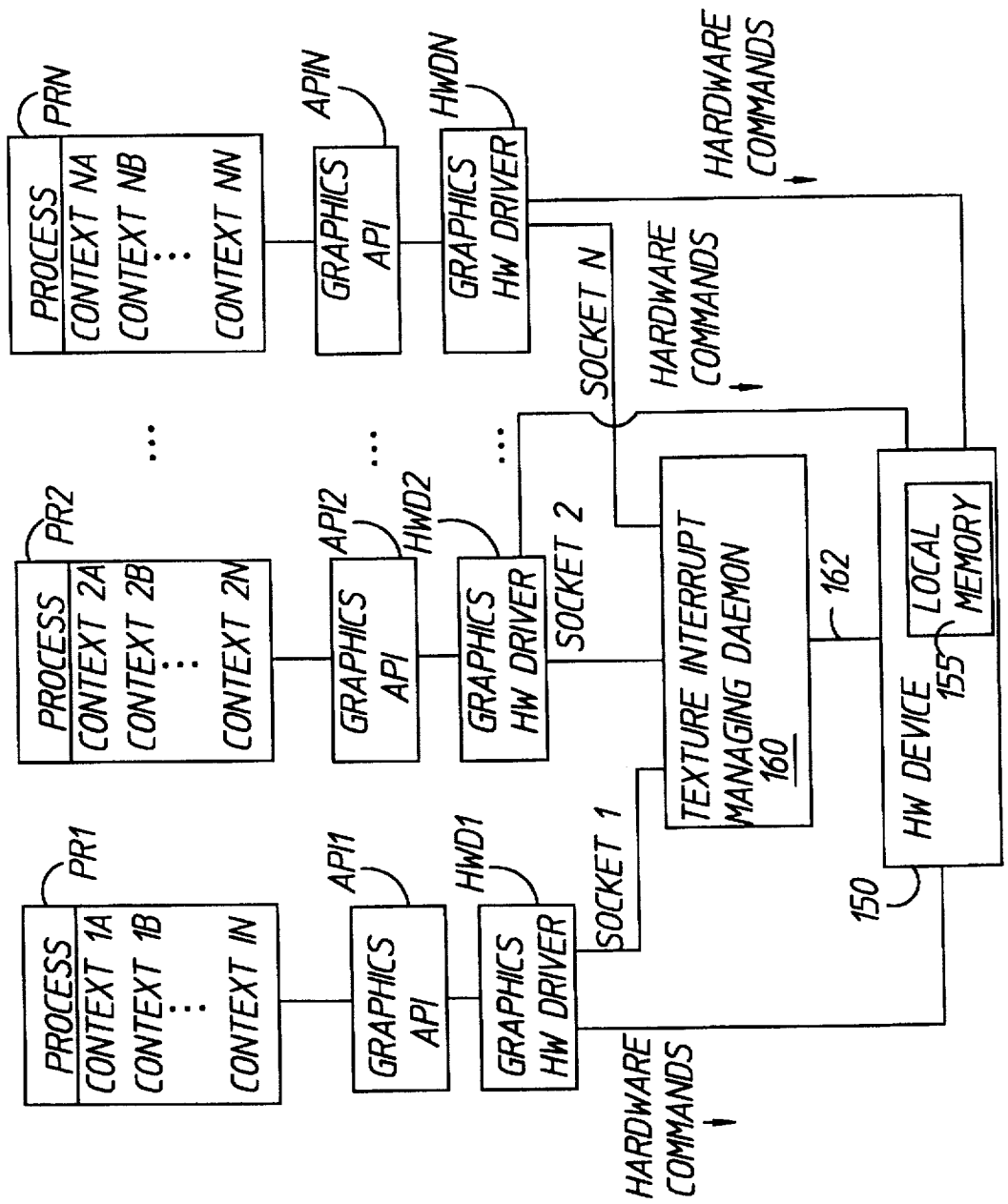
FIG. 3 is a part hardware, part software block diagram of a computer graphics system according to the present invention.

A first embodiment of the invention is shown in the block diagram of FIG. 3 in which same reference characters are used to reference identical elements to those of FIG. 2. Like the prior art embodiment of FIG. 2, the system includes multiple user interactive processes PR1, PR2, . . . PRN that run on the system processor. Within each process, the user can create multiple contexts which require the same texture maps. The system also includes an underlying graphics API and graphics hardware driver for each process.

The invention relates to a texture interrupt managing daemon (TIM) 160 that is an independent, stand alone software process that runs on the processor of the host computer, unbeknownst to the user. The TIM 160 of the present invention communicates with each of the graphics hardware drivers over a distinct socket. As will be understood by those skilled in the art, a socket is a software communications path over which two software programs can communicate. The TIM also communicates with the hardware device 150 over a bus 162.

The TIM of the present invention can run on conventional processors of computer graphics system host computers known as computer graphics workstations. One such work station includes, for example, the Hewlett-Packard™ 9000 series J200.

TIM 160 manages the storing of texture data within the local memory 155 of the hardware device 150. As will be explained in greater detail below, the TIM includes a device independent portion that handles the software texture memory management and socketed communications with the graphics hardware drivers and a device dependent portion that writes to and reads from the hardware device over bus 162.

In one embodiment of the present invention, the local memory of the hardware device is arranged as a cache memory in which portions of textures are stored in the local memory of the hardware device at any one time. The device independent portion of TIM tracks the usage of the portions of texture data stored in the cache and monitors the priorities of the textures to predict future usage of those portions. A cache miss in the hardware occurs when texture data is needed by the hardware device to render an image that is not currently stored in the cache. When a cache miss occurs, TIM determines which block of texture data within the cache to replace by considering which block or blocks of texture data within the cache were used least recently and which textures have the lowest priority.

TIM also allocates the texture data into formats recognizable by the local memories of particular hardware devices connected to the host computer for rendering images. In one embodiment of the invention, each map of a series of MIP maps for a texture is divided into quadrants and allocated among blocks of data to be downloaded by TIM to the local cache memory of the hardware device. The device dependent portion of TIM actually performs the downloading of the data when a cache interrupt occurs.

In one embodiment of the invention, TIM includes a shared memory location within the system memory in which a large texture or texture portion is stored and is shared between the graphics API, graphics hardware driver and TIM, for a particular process. As will be explained in greater detail below, each of the graphics API, the graphics hardware driver (for a particular process) and TIM 160 includes a pointer to a location within the system shared memory area to access the stored texture copy. In addition, TIM provides a memory management scheme such that all of the contexts created within a single process share the same copy of any texture needed for those contexts. For certain applications, therefore, the TIM of the present invention can provide tremendous savings of system software memory space.

With respect to the example described above with reference to FIG. 2, in which context 1A and context 1B of process PR1 require the same texture to render different views of a particular image, if the texture is large, then the TIM of the present invention would provide tremendous system memory space savings. By contrast with the prior art system described, a single copy of the texture may be stored that would be shared between context 1A and context 1B. Additionally, if the texture was large enough to warrant it being stored in the shared memory location, then only one other copy of the texture would be stored in the system shared memory location and would be shared between TIM, the graphics API1, and the graphics hardware driver HWD1. Thus, in this example, only three unique copies of the same texture would be stored in different locations of the system software memory to render two views of the same image using that same texture. One copy would be the user copy, one copy would be shared between the two contexts of the process PR1 and one copy would be shared between the graphics API, the graphics hardware driver and TIM. In the prior art system of FIG. 2, as described above, five copies of that same texture would have to be stored in the system software memory. Therefore, with the TIM of the present invention, two less copies of the texture are required to be stored in the system software memory which, for a large texture, results in great memory space savings.

When the user wishes to create an image, the user issues a command recognizable by the high level process programming language to draw that image and also inputs the texture required to texture map that image. The process then would translate that command to a lower level software command and would copy the texture. The translated command then would be communicated from the process to the underlying graphics API associated with that process. The graphics API then would translate the graphics command received from the process to a lower level software code command and would break down the image into graphics components such as quadrilaterals or polygons. That information then would be provided to the hardware driver.

When that information is communicated to the hardware driver, the corresponding socket between it and TIM would be opened. As will be explained in greater detail below, the hardware driver then communicates to TIM that the user wishes to render an image with a particular texture. The hardware driver communicates to TIM over the socket to determine whether TIM already has a stored copy of the texture. If so, then the hardware driver issues a command to the computer graphics hardware device, to which it is connected, to render that polygon using that texture. If not, then TIM copies that texture either into its own allocated system software memory location or to its shared memory location, or portions to each, as is explained in greater detail below.

When the hardware driver communicates to TIM that a new texture has been requested by the user, the priority of the texture and size of the texture also is communicated to TIM over the socket. TIM then provides a texture identifier to the texture, if available. At that point, a determination is made, depending on the size of the texture and number of MIP map levels of that texture, whether that texture will be stored in the shared memory location or whether that texture will be stored in TIM's own allocated system software memory location. This scheme will be explained in greater detail below.

As part of TIM storing a copy of the new texture, the device independent portion of TIM allocates the texture data into a format recognizable by the hardware device to which it is connected. In one embodiment of the invention, the texture data is allocated into blocks and downloaded, as requested by the hardware device, one block at a time into a local cache memory of the hardware device.

Hardware commands are issued by the graphics hardware driver to the hardware device to render the image using the texture map. The hardware commands are communicated along bus 16 of FIG. 4, for example. If the corresponding texture map is not already stored in the local memory of the corresponding hardware device, then an interrupt occurs and TIM processes that interrupt. TIM communicates with the hardware device to determine the portion of the texture necessary to render the image, selects the appropriate block within the cache memory to overwrite with the texture portion needed and then writes the block needed to the local cache memory at the selected location. The determination of which block of texture data to replace in the local memory of the hardware device when an interrupt occurs is based both on the history of usage of that block within the hardware device and the priority of the textures stored in the blocks. The prioritization of the textures is based on external user defined priorities as well as internal default priorities. Internally, the highest priority is given to a texture or textures needed for rendering newly created images with the next highest priority being given to the most recently used texture, as described in detail below. Thus, when the user creates a new image requiring a texture, that texture is, at that time, given the highest priority.

Figure 3A:
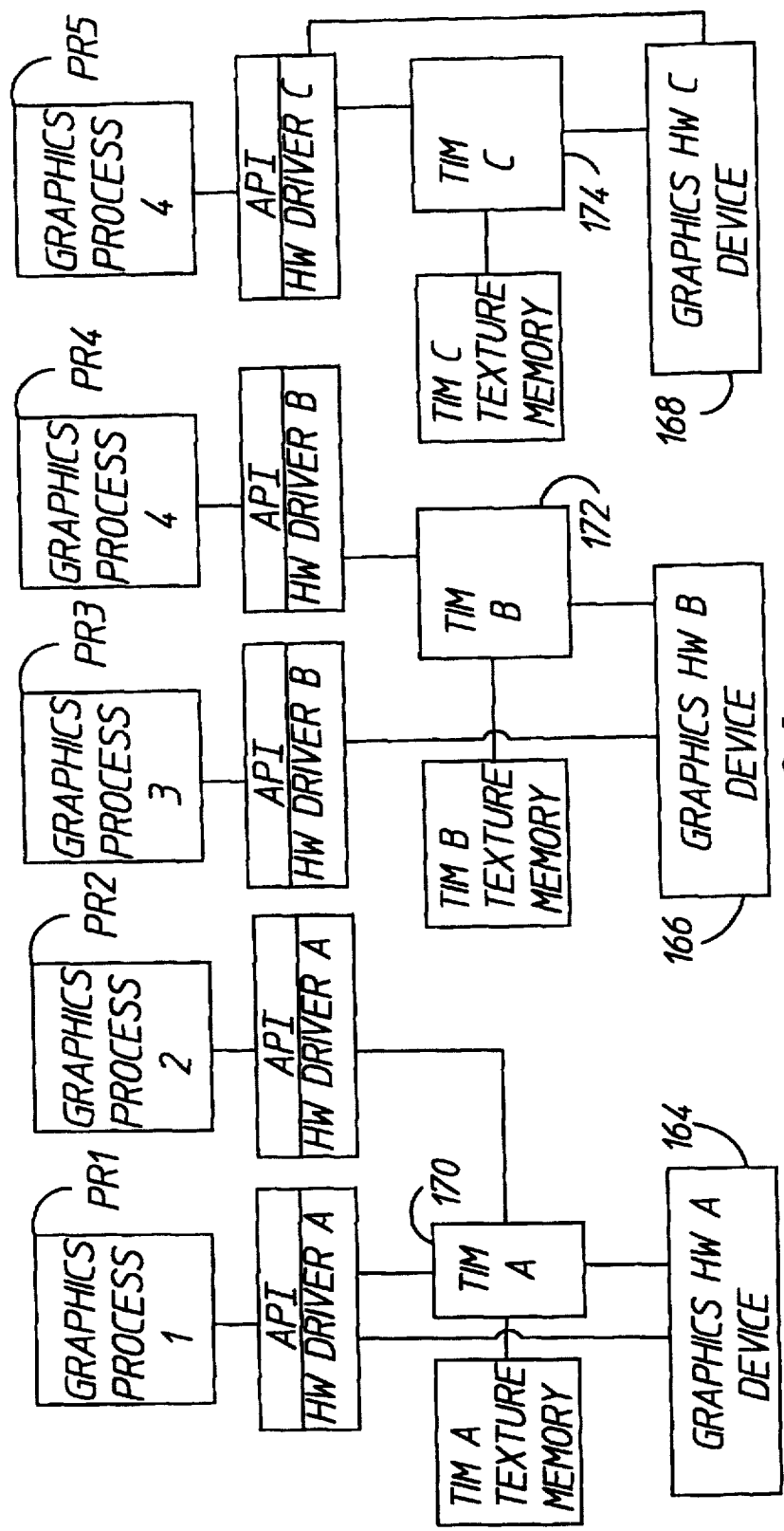
FIG. 3A is a part hardware, part software block diagram of an alternate embodiment computer graphics system according to the present invention.

FIG. 3A is a block diagram of an alternate embodiment of the present invention in which the system includes a single host computer that communicates with three separate graphics hardware devices 164, 166 and 168, also labeled A, B, and C. Each of these hardware devices may include different physical parameters and requirements. Three separate TIMs 170, 172 and 174 (also labeled A,B, and C) communicate with the graphics hardware devices 164, 166 and 168, respectively. Each TIM is responsible for managing the storage of texture data within the local memory of the graphics hardware device to which it is connected. Therefore, each TIM has knowledge of the physical parameters and requirements of the corresponding hardware device such as the storage capacity of the local memory, texture format requirements, bus widths, buffer sizes, register sizes, etc.

Each TIM includes a shared memory software location in which textures created within each process are stored and shared between TIM, the graphics API and the hardware driver of that process. As explained in greater detail below, each of TIM, the graphics API and the hardware driver stores a pointer to the shared memory location to access the textures. The shared memory scheme can save tremendous system memory space. Each TIM also includes its own dedicated system memory area that stores copies of textures or texture portions. Those memory areas are shown in FIG. 3A.

In the system of FIG. 3A, TIM A 170 manages the textures required by the processes PR1 and PR2 for which images are rendered by the hardware device A 164. Similarly, TIM B 172 manages the textures required by the processes PR3 and PR4 and for which images are rendered by the hardware device B 166. Finally, TIM C 174 manages the textures for the process PR5 for which images are rendered by the hardware device 168.

Figure 3B:
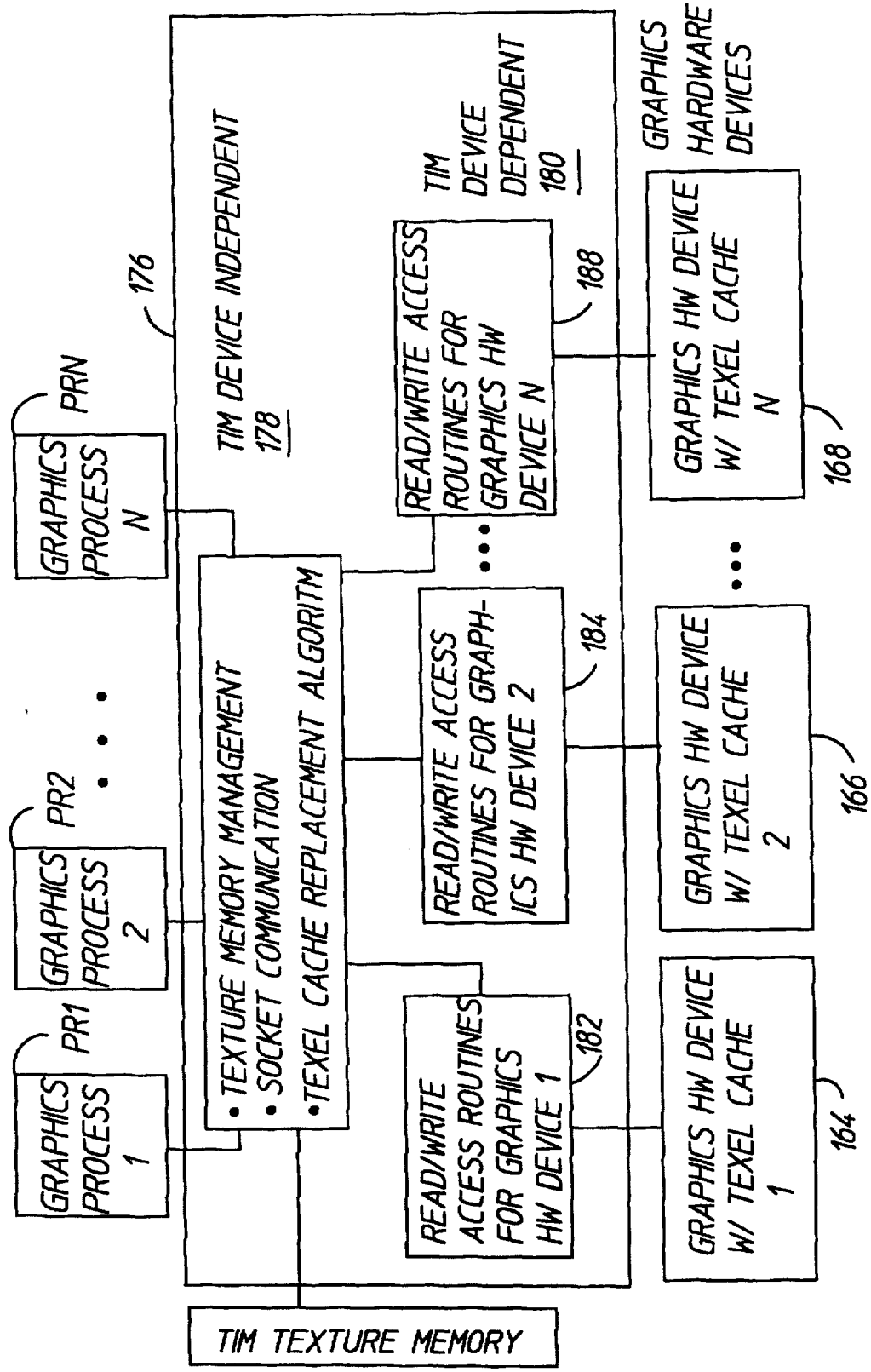
FIG. 3B is a part hardware, part software block diagram of an even further alternate embodiment computer graphics system according to the present invention.

Another alternate embodiment of the system of the invention is shown in FIG. 3B in which a single TIM 176 manages the texture data storage in the local memories of multiple underlying hardware devices 164, 166 and 168. The TIM 176 includes a device independent portion 178 and a device dependent portion 180. The device independent portion 178 of TIM 176 manages the texture memory, controls the socketed communication with each of the hardware drivers and, when hardware device interrupts occur, implements routines (which, in turn, call device dependent routines) to determine which blocks of texture data are needed by the hardware devices and which blocks of texture data within the local memories of the hardware devices should be overwritten. The device dependent portions 182, 184 and 188 of TIM 176 read from and write to the underlying hardware devices 164, 166 and 168, respectively. When an interrupt occurs within a particular hardware device, the corresponding device dependent portion of TIM would read data from the hardware device and communicate with the device independent portion of TIM. A routine would then be implemented to determine the texture data needed by the hardware device. Then, another routine would be implemented to determine which block of texture data within the local memory of that hardware device should be overwritten. Then a routine within the corresponding device dependent portion of TIM would write the new texture data to the appropriate location within the local memory of the hardware device to which it is connected.

An example of a particular textured mapping computer graphics system hardware device with which the software daemon (TIM) of the present invention can operate is described in detail below with reference to FIGS. 4-24. Following the description of the hardware device is a detailed description of the operation of the software daemon of the present invention. Examples of the operation of the software of the invention are provided which include device specific parameters relating to the hardware device of the example described below. Such device specific description is intended to be exemplary only and in no way is limiting as the software of the present invention can operate with numerous different hardware devices that include a local hardware memory for temporarily storing portions of texture maps required to render images. When the hardware device requires a texture or texture portion that is not, at that time, stored in the local hardware device memory, an interrupt occurs that is handled by the software daemon of the invention to download the required texture or portion thereof. The software of the invention runs on the system processor of the host computer and is stored on the system memory of the host computer, which host computer is connected to the graphics hardware device.

II. Hardware Device Example

A. Hardware Device System Overview

Figure 4:
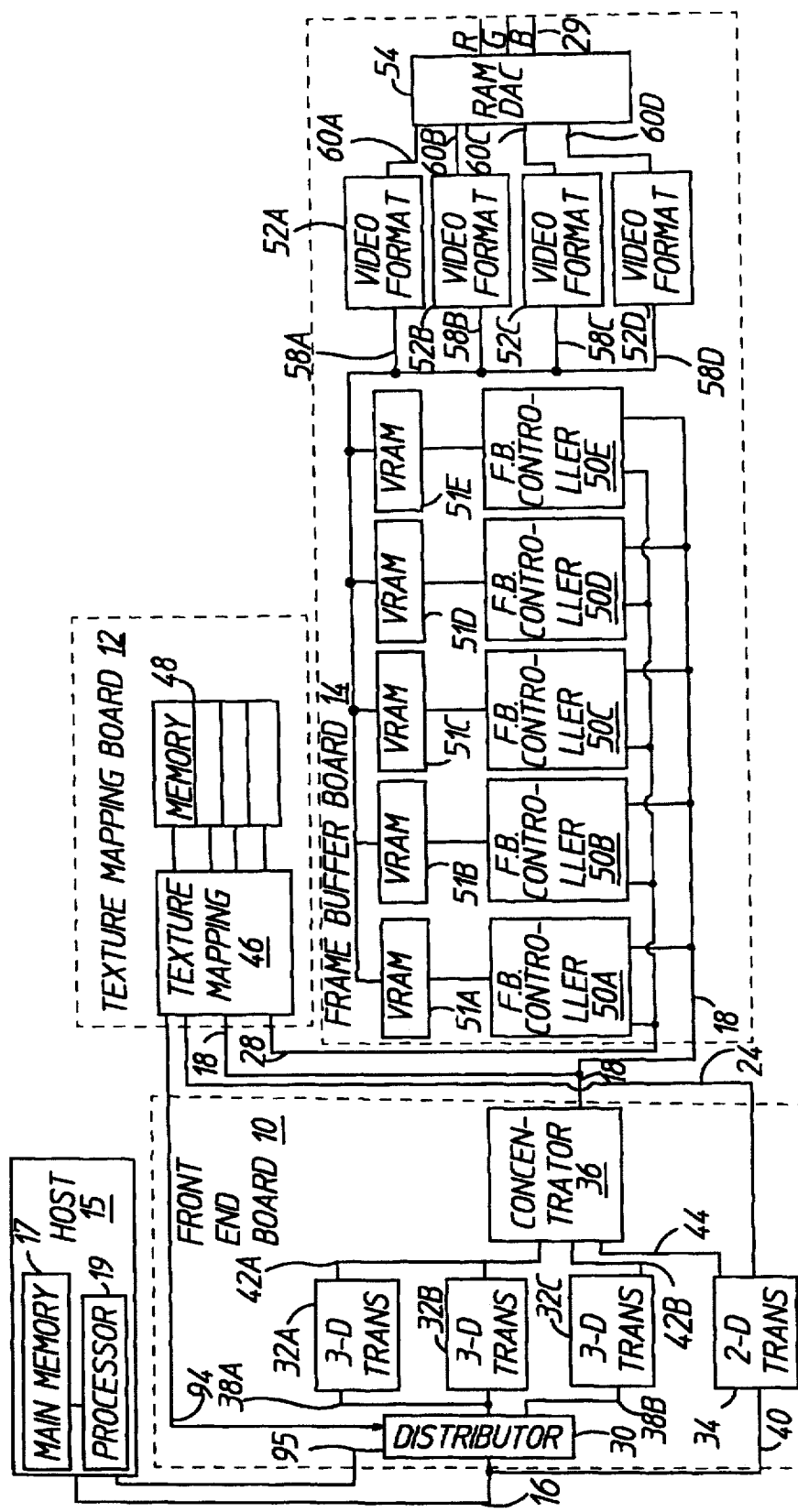
FIG. 4 is a block diagram of one embodiment of a computer graphics hardware device with which the software daemon of the present invention can be used.

FIG. 4 is a block diagram of one embodiment of a graphics system hardware device with which the software of the invention can be used. The device includes texture mapping hardware having a cache memory for storing texture data locally. It should be understood that the illustrative implementation shown is merely exemplary with respect to the number of boards and chips, the manner in which they are partitioned, the bus widths, and the data transfer rates. Numerous other implementations can be employed. As shown, the system includes a front end board 10, a texture mapping board 12, and a frame buffer board 14. The front end board communicates with a host computer 15 over a 52-bit bus 16. The front end board receives primitives to be rendered from the host computer over bus 16. The primitives are specified by x,y,z vector coordinate data, R,G,B color data and texture S,T coordinates for portions of the primitives, such as for the vertices when the primitive is a triangle. Data representing the primitives in three dimensions then is provided by the front end board 10 to the texture mapping board 12 and the frame buffer board 14 over 85-bit bus 18. The texture mapping board interpolates the primitive data received to compute the screen display pixels that will represent the primitive, and determines corresponding resultant texture data for each primitive pixel. The resultant texture data is provided to the frame buffer board over a five 55-bit buses 28, which is shown in FIG. 4 as a single bus to clarify the figure.

The frame buffer board 14 also interpolates the primitive data received from the front end board 10 to compute the pixels on the display screen that will represent each primitive, and to determine object color values for each pixel. The frame buffer board then combines, on a pixel by pixel basis, the object color values with the resultant texture data provided from the texture mapping board, to generate resulting image R,G,B values for each pixel. R,G,B color control signals for each pixel are respectively provided over R,G,B lines 29 to control the pixels of the display screen (not shown) to display a resulting image on the display screen that represents the texture mapped primitive.

The front end board 10, texture mapping board 12 and frame buffer board 14 each is pipelined and operates on multiple primitives simultaneously. While the texture mapping and frame buffer boards operate on primitives previously provided by the front end board, the front end board continues to operate upon and provide new primitives until the pipelines in the boards 12 and 14 become full.

The front end board 10 includes a distributor chip 30, three-dimensional (3-D) geometry accelerator chips 32A, 32B and 32C, a two-dimensional (2-D) geometry accelerator chip 34 and a concentrator chip 36. The distributor chip 30 receives the X,Y,Z coordinate and color primitive data over bus 16 from the host computer, and distributes 3-D primitive data evenly among the 3-D geometry accelerator chips 32A, 32B and 32C. In this manner, the system bandwidth is increased because three groups of primitives are operated upon simultaneously. Data is provided over 40-bit bus 38A to the 3-D geometry accelerator chips 32A and 32B, and over 40-bit bus 38B to chip 32C. Both buses 38A and 38B transfer data at a rate of 60 MHZ and provide sufficient bandwidth to support two 3-D geometry accelerator chips. 2-D primitive data is provided over a 44-bit bus 40 to the 2-D geometry accelerator chip 34 at a rate of 40 MHZ.

Each 3-D geometry accelerator chip transforms the x,y,z coordinates that define the primitives received into corresponding screen space coordinates, determines object R,G,B values and texture S,T values for the screen space coordinates, decomposes primitive quadrilaterals into triangles, and computes a triangle plane equation to define each triangle. Each 3-D geometry accelerator chip also performs view clipping operations to ensure an accurate screen display of the resulting image when multiple windows within the screen are displayed, or when a portion of a primitive extends beyond the view volume represented on the display screen. Output data from the 3-D geometry accelerator chips 32A, 32B and 32C respectively is provided over 44-bit buses 42A, 42B and 42C to concentrator chip 36 at a rate of 60 MHZ. Two-dimensional geometry accelerator chip 34 also provides output data to concentrator chip 36 over a 46-bit bus 44 at a rate of 45 MHZ. Concentrator chip 36 combines the 3-D primitive output data received from the 3-D geometry accelerator chips 32A–C, re-orders the primitives to the original order they had prior to distribution by the distributor chip 30, and provides the combined primitive output data over bus 18 to the texture mapping and frame buffer boards.

Texture mapping board 12 includes a texture mapping chip 46 and a local memory 48 which is preferably arranged as a cache memory. In a preferred embodiment, the cache memory is formed from a plurality of SDRAM (synchronous dynamic random access memory) chips for reasons discussed below. As described in greater detail below, the cache memory 48 stores texture MIP map data associated with the primitives being rendered in the frame buffer board. The texture MIP map data is downloaded from a main memory 17 of the host computer 15, over bus 40, through the 2-D geometry accelerator chip 34, and over 24-bit bus 24.

The texture mapping chip 46 successively receives primitive data over bus 18 representing the primitives to be rendered on the display screen. As discussed above, the 22 primitives provided from the 3-D geometry accelerator chips 32A–C include points, lines and triangles. The texture mapping board does not perform texture mapping of points or lines, and operates only upon triangle primitives. The data representing the triangle primitives includes the x,y,z object pixel coordinates for at least one vertex, the object color R,G,B values of the at least one vertex, the coordinates in S,T of the portions of the texture map that correspond to the at least one vertex, and the plane equation of the triangle.

The texture mapping chip 46 ignores the object pixel z coordinate and the object color R,G,B values. The chip 46 interpolates the x,y pixel coordinates and interpolates S and T coordinates that correspond to each x,y screen display pixel that represents the primitive. For each pixel, the texture mapping chip accesses the portion of the texture MIP map that corresponds thereto from the cache memory, and computes resultant texture data for the pixel, which may include a weighted average of multiple texels.

In one exemplary embodiment, the cache stores sixty-four blocks of 256×256 texels. Unlike the local memory employed in the texture mapping hardware of prior art systems, the cache memory of the present invention may not store the entire series of MIP maps of the texture that maps to the primitive being rendered, such as for large textures. Additionally, unlike in prior art systems, the cache memory may not store the series of MIP maps for multiple textures that map to the primitive being rendered. Rather, the cache memory stores at any one time only the particular portions of the series of MIP maps actually used in currently rendering the primitive. Therefore, for most applications, only a portion of the complete texture data for the image being rendered will be stored in the cache memory at any one time.

The complete series of MIP maps for each texture is arranged and stored in the main memory 17 of the host computer 15. The TIM of the present invention runs on the processor of the host computer. For each pixel of the primitive being rendered, the texture mapping chip 46 accesses a directory of the cache memory 48 to determine whether the corresponding texel or texels of the texture MIP maps are currently present in the cache. If the corresponding texels are stored in the cache memory at the time of the access, a cache hit occurs, and the texels are read from the cache and operated upon by the texture mapping chip 46 to compute the resultant texture data which is passed to the frame buffer board.

However, if the corresponding texels for the primitive pixel are not stored in the cache memory when accessed by the texture mapping chip 46, a cache miss occurs. When a cache miss occurs, the portion of the texture MIP map data needed to render the primitive is downloaded from the main memory 17 of the host computer 15 into the cache memory 48 using TIM, possibly replacing some data previously stored therein. However, unlike conventional texture mapping systems that download the entire series of MIP maps for any primitive being rendered, the TIM of the present invention downloads only the portion of the series of MIP maps actually needed to currently render the primitive or the currently rendered portion thereof. As is explained in greater detail below, when a cache miss occurs, an interrupt control signal is generated by the texture mapping chip 46 to initiate a texture interrupt manager in the host computer 15. The interrupt control signal is provided over line 94 to the distributor chip 30, which in turn provides an interrupt signal over line 95 to the host computer.

The requested texture data is retrieved by the TIM from its main memory and is downloaded to the texture mapping board 48 over bus 24, bypassing the 3-D primitive rendering pipeline through the front end board and the texture mapping chip. Thus, when a cache miss interrupt occurs, the front end board can continue to operate upon 3-D primitives and provide output primitive data over bus 18 to the texture mapping chip and the frame buffer board, while the texture data associated with a primitive that caused the cache miss is being downloaded from main memory 17. In contrast to conventional texture mapping systems, the downloading of texture data to the texture mapping hardware does not require a flushing of the 3-D primitive pipeline, thereby increasing the bandwidth and performance of the system.

The resultant texture data for each pixel is provided by the texture mapping chip 46 to the frame buffer board over five buses 28. The five buses 28 are respectively coupled to five frame buffer controller chips 50A, 50B, 50C, 50D and 50E provided on the frame buffer board, and provide resultant texture data to the frame buffer controller chips in parallel. The frame buffer controller chips 50A-E are respectively coupled to groups of associated VRAM (video random access memory) chips 51A-E. The frame buffer board further includes four video format chips, 52A, 52B, 52C and 52D, and a RAMDAC (random access memory digital-to-analog converter) 54. The frame buffer controller chips control different, non-overlapping segments of the display screen. Each frame buffer controller chip receives primitive data from the front end board over bus 18, and resultant texture mapping data from the texture mapping board over bus 28. The frame buffer controller chips interpolate the primitive data to compute the screen display pixel coordinates in their respective segments that represent the primitive, and the corresponding object R,G,B color values for each pixel coordinate. For those primitives (i.e., triangles) for which resultant texture data is provided from the texture mapping board, the frame buffer controller chips combine, on a pixel by pixel basis, the object color values and the resultant texture data to generate final R,G,B values for each pixel to be displayed on the display screen.

The manner in which the object and texture color values are combined can be controlled in a number of different ways. For example, in a replace mode, the object color values can be simply replaced by the texture color values, so that the texture color values are used in rendering the pixel. Alternatively, in a modulate mode, the object and texture color values can be multiplied together to generate the final R,G,B values for the pixel. Furthermore, a color control word can be stored for each texel that specifies a ratio defining the manner in which the corresponding texture color values are to be combined with the object color values. A resultant color control word can be determined for the resultant texel data corresponding to each pixel and provided to the frame buffer controller chips over bus 28 so that the controller chips can use the ratio specified by the corresponding resultant control word to determine the final R,G,B values for each pixel. The resulting image video data generated by the frame buffer controller chips 50A-E, including R,G,B values for each pixel, is stored in the corresponding VRAM chips 51A-E. Each group of VRAM chips 51A-E includes eight VRAM chips, such that forty VRAM chips are located on the frame buffer board. Each of video format chips 52A-D is connected to, and receives data from, a different set of ten VRAM chips. The video data is serially shifted out of the VRAM chips and is respectively provided over 64-bit buses 58A, 58B, 58C, and 58D to the four video format chips 52A, 52B, 52C and 52D at a rate of 33 MHZ. The video format chips format the video data so that it can be handled by the RAMDAC and provide the formatted data over 32-bit buses 60A, 60B, 60C and 60D to RAMDAC 54 at a rate of 33 MHZ. RAMDAC 54, in turn, converts the digital color data to analog R,G,B color control signals and provides the R,G,B control signals for each pixel to a screen display (not shown) along R,G,B control lines 29.

In one embodiment, hardware on the texture mapping board 12 and the frame buffer board 14 is replicated so that certain primitive rendering tasks can be performed on multiple primitives in parallel, thereby increasing the bandwidth of the system. An example of such an alternate embodiment of a hardware device is shown in FIG. 4A, which is a block diagram of a computer graphics hardware device with which the TIM of the invention can be used. The particular hardware device has certain hardware replicated. The system of FIG. 4A includes four 3-D geometry accelerator chips 32A, 32B, 32C and 32D, two texture mapping chips 46A and 46B respectively associated with cache memories 48A and 48B, and ten frame buffer chips 50A-50J, each with an associated group of VRAM chips. The operation of the system of FIG. 4A is similar to that of the system of FIG. 4, described above. The replication of the hardware in the embodiment of FIG. 4A allows for increased system bandwidth because certain primitive rendering operations can be performed in parallel on multiple primitives.

B. Texture Mapping Chip Overview

Figure 5:
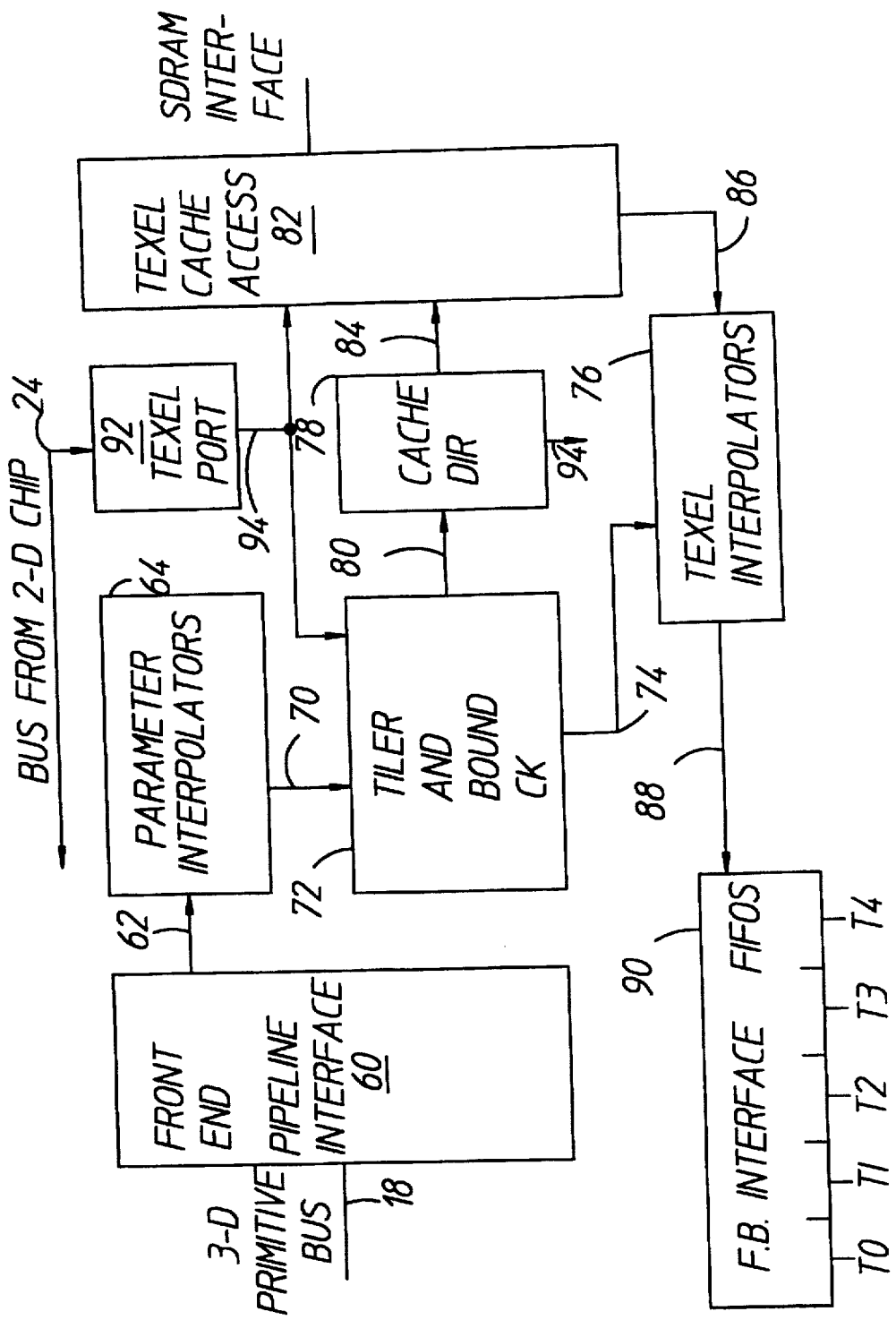
FIG. 5 is a block diagram of the texture mapping hardware chip of the hardware device of FIGS. 4 or 4A.
Figure 6:
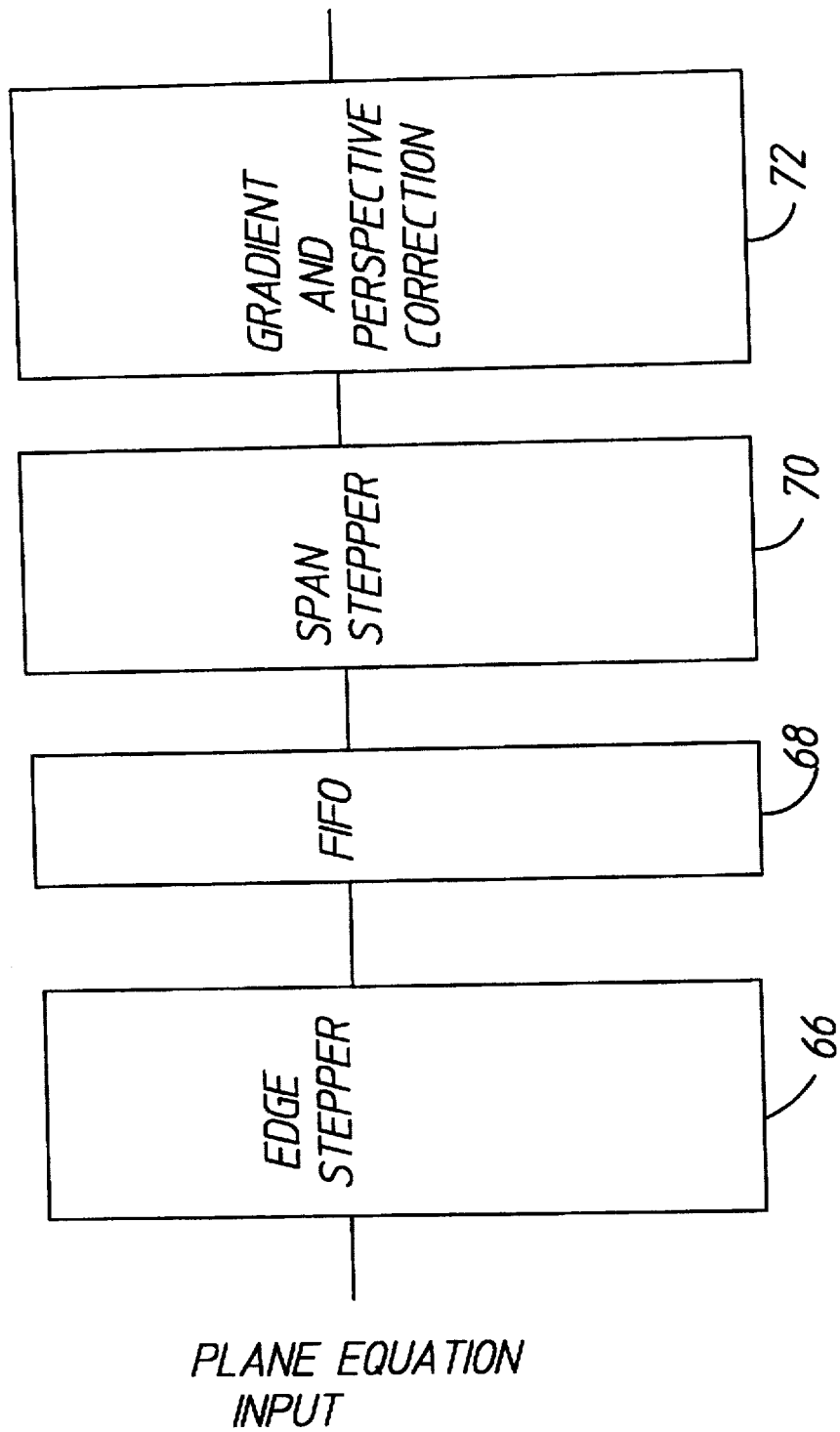
FIG. 6 is a more detailed block diagram of the parameter interpolator element of the texture mapping hardware.

A block diagram of the texture mapping chip 46 is shown in FIG. 5. The chip 46 includes a front end pipeline interface 60 that receives object and texture primitive data from the front end board over 64-bit bus 18. The triangle primitives operated upon the texture mapping chip are defined by up to fifty-two 32-bit digital words but may be defined by words of different lengths. The pipeline interface includes a set of master registers and a set of corresponding slave registers. During rendering, the master registers are filled sequentially with the fifty-two digital words of data that define the primitive. Then, upon receipt of an appropriate rendering command, the data is shifted into the slave registers in the pipeline interface, allowing, in a pipelined fashion, the master registers to be filled with data representing another primitive. The primitive data provided over bus 18 includes the x,y,z vector coordinate data, the S,T texture coordinates and the R,G,B object color data for at least one triangle vertex, as well as data representing the triangle plane equation. As discussed above, the texture mapping chip ignores the object pixel z coordinate and the object color R,G,B values, and stores only the other data in the front end pipeline interface 60.

The slave registers of the pipeline interface 60 transfer the primitive data over bus 62 to a parameter interpolator circuit 64. Parameter interpolator circuit 64 interpolates each primitive triangle to determine, for each display screen pixel coordinate that represents the triangle, the S,T texture map coordinates for the texture map that maps to the pixel, and an S and T gradient value ($\Delta S$, $\Delta T$). The S and T gradients respectively equal changes in the S and T coordinates between adjacent pixels, and are computed in a manner discussed below. The parameter interpolator circuit 64, shown in more detail in FIG. 6, includes an edge stepper 66, a FIFO ("first-in, first-out") buffer 68, a span stepper 70 and a gradient and perspective correction circuit 72, all connected in series. The edge stepper starts at the x,y pixel coordinate of one of the triangle vertices, and utilizing the triangle plane equation, steps the edges of the triangle to determine the pixel coordinates that define the triangle edges. For each pixel coordinate, texture map S and T coordinates are determined, based on the S,T values of the triangle vertices, to identify which texels in the texture map correspond to each display screen pixel coordinate. The pixel and texel coordinates temporarily are stored in the FIFO buffer and then are provided to the span stepper. At each x,y pixel location along an edge of the triangle, the span stepper steps across the corresponding span of the triangle to determine the S,T texel coordinates for each pixel location along the span Each S and T coordinate for a display screen pixel may have an integer portion and a fractional portion if the pixel does not map directly (in one-to-one correspondence) to a single texel in one of the series of MIP maps for the texture. As explained above, when mapped to the texture map, each display screen pixel may lie between multiple texels in one of the series of MIP maps for the texture, and furthermore, may lie between adjacent (in size) MIP maps in the series.

The gradient and perspective correction circuit 72 determines the gradient values of S and ($\Delta S$, $\Delta T$) for each display screen pixel. In one embodiment, gradient $\Delta S$ is selected to be the larger of gradient $\Delta Sx$ and gradient $\Delta Sy$, wherein gradient $\Delta Sx$ is the change in the S coordinate in the texture map as coordinate x changes between adjacent pixels on the display screen, and gradient $\Delta Sy$ is the change in the S coordinate as coordinate y changes between adjacent pixels. Gradient $\Delta T$ is similarly computed. The gradients $\Delta S$, $\Delta T$ for a display screen pixel indicate the rate of change in coordinate position within the texture map for a change of one pixel on the display screen in the corresponding S,T dimension, and are used to determine which MIP map or maps should be accessed to provide the resultant texture data for the pixel. For example, a gradient equal to two for a display screen pixel indicates that the pixel maps to four (i.e., $2^2$ as discussed below) texels, so that the MIP map reduced in size by two from the base map (e.g., the map 102 in FIG. 1) should be accessed to provide the resultant texture data for the pixel. Thus, as the gradient increases, the size of the MIP map that is accessed to provide the resultant texture data for the pixel is reduced.

In one embodiment, a single gradient, equal to the larger of $\Delta S$ and $\Delta T$, is used to select the appropriate MIP map for each pixel, such that the gradient equals the largest of $\Delta Sx$, $\Delta Sy$, $\Delta Tx$, and $\Delta Ty$ for the pixel. However, it should be understood that the gradient can alternatively be selected in a different fashion, such as by selecting the smallest of those values, an average of those values, or some other combination. Since a single gradient is selected that indicates the rate of change in only one of the S,T coordinates, the square of the gradient represents the number of texels that map to the corresponding pixel.

From the gradient, the parameter interpolator determines the closest map to which the pixel maps and the distance from that map. That information is provided as a whole map number of the closest map and in map fractional value, the fractional value indicating the distance of the pixel from the closest map.

Referring again to the block diagram of the texture mapping chip in FIG. 5, the texel data output from the parameter interpolator circuit 64 is provided over line 70 to a tiler and boundary checker 72, which determines the address of the four texels that are closest to the position in each of the texture maps specified by the texel data, and checks to determine whether each is within the boundary of the texture. The texel data includes the interpolated S, T coordinates (integer and fractional values) as well as the map number and map fraction. The tiler uses the integer portion of the S and T coordinates computed by the parameter interpolator 64, and adds one to the integer portion of each to generate the addresses of the four closest texels. The boundary checker then determines whether the S,T coordinates for any of these four texels falls outside the boundary of the texture map. If a display screen pixel maps to an S,T coordinate position that falls outside the boundary of the texture map, one of several texture mapping schemes is implemented to determine whether any resultant texture data is to be generated for that pixel, and how that data is to be generated. Examples of such schemes include wrapping (a repeat of the texture), mirroring (a repeat of the mirror image of the texture), turning off texture mapping outside the boundary, and displaying a solid color outside the boundary.

The capability of allowing a pixel to map to a location in a texture map that is beyond its boundary provides flexibility in the manner in which textures can be mapped to object primitives. For example, it may be desirable to map a texture to an object in a repeating fashion, such that the texture is mapped to multiple portions of the object. For example, if a texture is defined having S,T coordinates ranging from [0, 0] inclusive through (10, 10) non-inclusive, a user could specify certain portions of the object to map to S,T coordinates [10, 10] inclusive, through (20, 20) non-inclusive. The notation of the bracketed inclusive coordinates indicates that those coordinates are included in the portion of the texture mapped to the object, whereas the object maps to only the S,T coordinates up to but not including the non-inclusive coordinates in parentheses. If the wrapping feature is selected for S,T coordinates falling outside the boundary of the texture, pixels having S,T coordinates [10, 10] through (20, 20) would respectively map to the texels at S,T coordinates [0, 0] through (10, 10).

As discussed above, the resultant texture data from a two-dimensional texture map for a single pixel may be the result of a combination of as many as eight texels, i.e., the four closest texels in the two closest MIP maps. There are a number of ways in which the eight texels can be combined to generate the resultant texel data. For example, the single closest texel in the closest map can be selected, so that no averaging is required. Alternatively, the single closest texel in each of the two closest maps can be averaged together based on the value of the gradient. Such schemes do not map the texture as accurately as when the eight closest texels are averaged.

In one embodiment of the hardware device, trilinear interpolation is supported wherein the resultant texture data for a single pixel may be calculated as a weighted average of as many as eight texels. The gradient representing rates of change of S,T is used to identify the two closest MIP maps from which to access texture data, and the four closest texels within each map are accessed. The average of the four texels within each map is weighted based on which texels are closest to the S,T coordinates of the position in the MIP map that the display screen pixel maps to. The fractional portion of the S and T coordinates for the pixel are used to perform this weighting. The average value from each of the two closest MIP maps is then weighted based upon the value of the gradient. A fractional value is computed from the gradient for use in this weighting process. For example, a gradient of three is half-way between the MIP maps that respectively correspond to gradients of two and four.

The texel interpolation process is performed by the texel interpolators 76. The fractional portions of the S and T coordinates for each display screen pixel are provided from the parameter interpolators, through the tiler/boundary checker, to texel interpolator 76 over lines 74. The fractional portions are used by the texel interpolator to determine the weight afforded each texel during interpolation of the multiple texels when computing resultant texel data.

Figure 8:
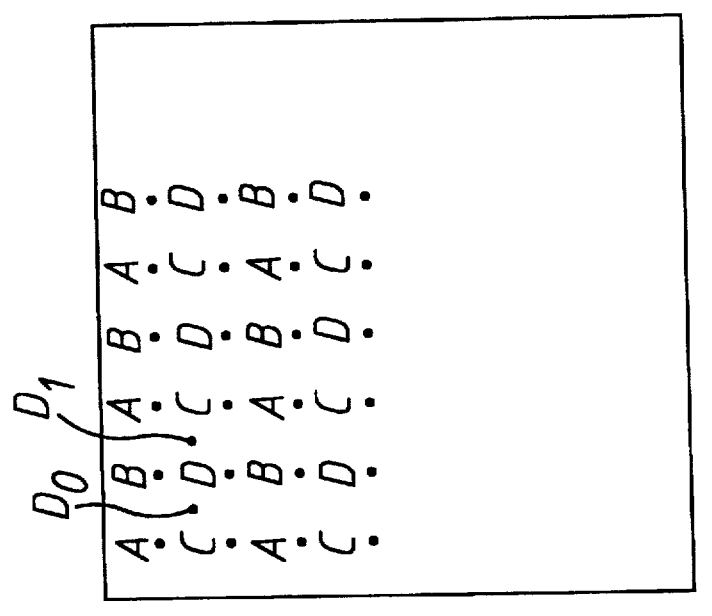

As discussed above, texture MIP maps associated with a primitive being rendered are stored locally in the cache memory 48 (FIG. 8). In one embodiment, the cache is fully associative. The cache includes eight SDRAM chips divided into four interleaves, with two SDRAM chips in each interleave. Four separate controllers are provided, with one corresponding to each interleave so that the SDRAM chips within each interleave can be accessed simultaneously. Each SDRAM chip includes two distinct banks of memory in which different pages of memory can be accessed in consecutive read cycles without incurring repaging penalties commonly associated with accessing data from two different pages (i.e., from two different row addresses) in a conventional DRAM.

The texture data (i.e., the MIP maps) is divided into 256×256 texel blocks of data. The cache memory can store as many as sixty-four blocks of data at one time. Each block has an associated block tag that uniquely identifies the block. The cache includes a cache directory 78 that stores the block tags that correspond to the blocks of data currently stored in the cache. As described in greater detail below, each block tag includes a texture identifier (texture ID) that identifies the particular texture that the block of data represents, a map number that identifies the particular MIP map within the texture's series of maps that the block of data represents, and high-order S and T coordinates that identify the location of the block of data within the particular map. The physical location of the block tag within the cache directory represents the location of the corresponding block of data within the cache memory.

MIP maps from more than one texture may be stored in the cache memory simultaneously, with the texture identifier distinguishing between the different textures. Some MIP maps contain fewer than 256×256 texels, and therefore, do not consume an entire block of data. For example, the smaller maps in a series of MIP maps or even the larger maps for small textures may not exceed 256×256 texels. To efficiently utilize memory space, portions of multiple maps may be stored in a single block of texture data, with each map portion being assigned to a sub-block within the block. Each of the multiple maps stored within a single block has an associated sub-texture identifier (ID) that identifies the location of the map within the block.

During rendering, the tiler/boundary checker 72 generates a read cache tag for the block of texture data that maps to the pixel to be rendered. The manner in which the cache block tag and the read cache tag are generated is explained in more detail below. The tags are 23-bit fields that include eight bits representing the texture ID of the texture data, a bit used in determining the map number of the texture data, and the seven high-order S and T coordinates of the texture data. The cache directory 78 compares the read cache tag provided from the tiler/boundary with the block tags stored in the directory to determine whether the block of texture data to be used in rendering is in the cache memory. If the block tag of the texture data that maps to the primitive to be rendered is stored in (i.e., hits) the cache directory, then the cache directory generates a block index that indicates the physical location of the block of texture data in the cache that corresponds to the hit tag. The computation of the block index is discussed in greater detail below. A texel address is also generated by the tiler/boundary checker 72 for each texel to be read from the cache and indicates the location of the texel within the block. The texel address includes low-order address bits of the interpolated S,T coordinates for larger size maps, and is computed based on an algorithm described below for smaller size maps. The block index and texel address together comprise the cache address which indicates the location of the texel within the cache. As is described in greater detail below, the LSBs of the S and T coordinates are decoded to determine in which of four cache interleaves the texel is stored, and the remaining bits of the cache address are provided to the texel cache access circuit 82 along with a command over line 84 to read the texel data stored at the addressed location in the cache.

If the read cache tag does not match any of the block tags stored in the cache directory 78, a miss occurs and the cache directory 78 generates an interrupt control signal over line 94 (FIG. 4) to the distributor chip 30 on the front end board, which generates an interrupt over line 95 to the host computer 15. In response to the interrupt, TIM, discussed in more detail below, which reads the missed block tag from the cache directory and downloads the corresponding block of texture data into the cache memory in a manner that bypasses the 3-D primitive pipeline in the front end board 10 and the texture mapping chip 46. The texture data downloaded from TIM is provided over bus 24, through the texel port 92 (FIG. 5) to the texel cache access circuit 82, which writes the data to the SDRAMs that form the cache memory.

When a cache miss occurs, the texture mapping chip waits for the new texture data to be downloaded before proceeding with processing the primitive on which the miss occurred. However, the stages of the pipeline that follow the cache read continue to process those primitives received prior to the miss primitive. Similarly, the stages of the pipeline that precede the cache read also continue to process primitives unless and until the pipeline fills up behind the cache read operation while awaiting the downloading of the new texture data.

During rendering, the later stages of the pipeline in the frame buffer board 14 do not proceed with processing a primitive until the texture data corresponding to the primitive is received from the texture mapping board. Therefore, when a cache miss occurs and the texture mapping chip waits for the new texture data to be downloaded, the frame buffer board 14 similarly waits for the resultant texture data to be provided from the texture mapping chip. As with the texture mapping chip, the stages of the pipeline that follow the stage that receives the texture mapping data continue to process those primitives received prior to the miss primitive, and the stages of the pipeline that precede the stage that receives texture mapping data also continue to process primitives unless and until the pipeline fills up.

It should be understood that when the pipeline of either the texture mapping board or the frame buffer board backs up when waiting for new texture data in response to a cache miss, the pipeline in the front end board 10 will similarly back up. Because cache misses will occur and will result in an access to the host computer main memory and a downloading of texture data that will take several cycles to complete, it is desirable to ensure that the pipeline in the texture mapping chip never has to wait because the pipeline in the frame buffer board has become backed up. Therefore, in one embodiment, the frame buffer board is provided with a deeper primitive pipeline than the texture mapping board, so that the texture mapping pipeline should not be delayed by waiting for the frame buffer pipeline to become available.

In one embodiment, the capability is provided to turn off texture mapping. This is accomplished by TIM operating on the processor 19 of the host computer to set a register in both the texture mapping board 12 and the frame buffer board 14. When set to turn off texture mapping, these registers respectively inhibit the texture mapping chip 46 from providing texture data to the frame buffer board 14, and instruct the frame buffer board to proceed with rendering primitives without waiting for texture data from the texture mapping board.

As described above, for each display screen pixel that is rendered with texture data from a two-dimensional texture map, as many as four texels from one MIP map (bilinear interpolation) or eight texels from two adjacent MIP maps (trilinear interpolation) may be accessed from the cache memory to determine the resultant texture data for the pixel. The texels read from the cache are provided over bus 86 (FIG. 5) to the texel interpolator 76, which interpolates the multiple texels to compute resultant texel data for each pixel. The interpolation can vary depending upon a mode established for the system. When a point sampling interpolation mode is established, the resultant texel data equals the single texel that is closest to the location defined by the pixel's S,T coordinates in the texture map. Alternatively, when bilinear or trilinear interpolation is employed, the resultant texel data is respectively a weighted average of the four or eight closest texels in the one or two closest maps. The weight given to each of the multiple texels is determined based upon the value of the gradient and the factional components of the S and T coordinates provided to the texel interpolator 76 from the tiler/boundary checker.

The resultant texel data for the display screen pixels is sequentially provided over bus 88 to a frame buffer interface FIFO buffer 90. The frame buffer interface FIFO buffer 90 can store up to sixty four resultant texels.

Each resultant texel is a 32-bit word including eight bits to represent each of R,G,B and α. The α byte indicates to the frame buffer board 14 (FIG. 4) the manner in which the R,G,B values of the resultant texture data should be combined with the R,G,B values of the object data generated by the frame buffer board in computing final display screen R,G,B values for any pixel that maps to the texel. The frame buffer interface FIFO buffer outputs T0–T4 are provided to the frame buffer board 14 (FIG. 4) over bus 28. The frame buffer board combines the R,G,B values of the resultant texel data with the object R,G,B values in the manner specified by ?a? to generate final R,G,B values for each display screen pixel.

C. Cache Memory Organization

Figure 7:
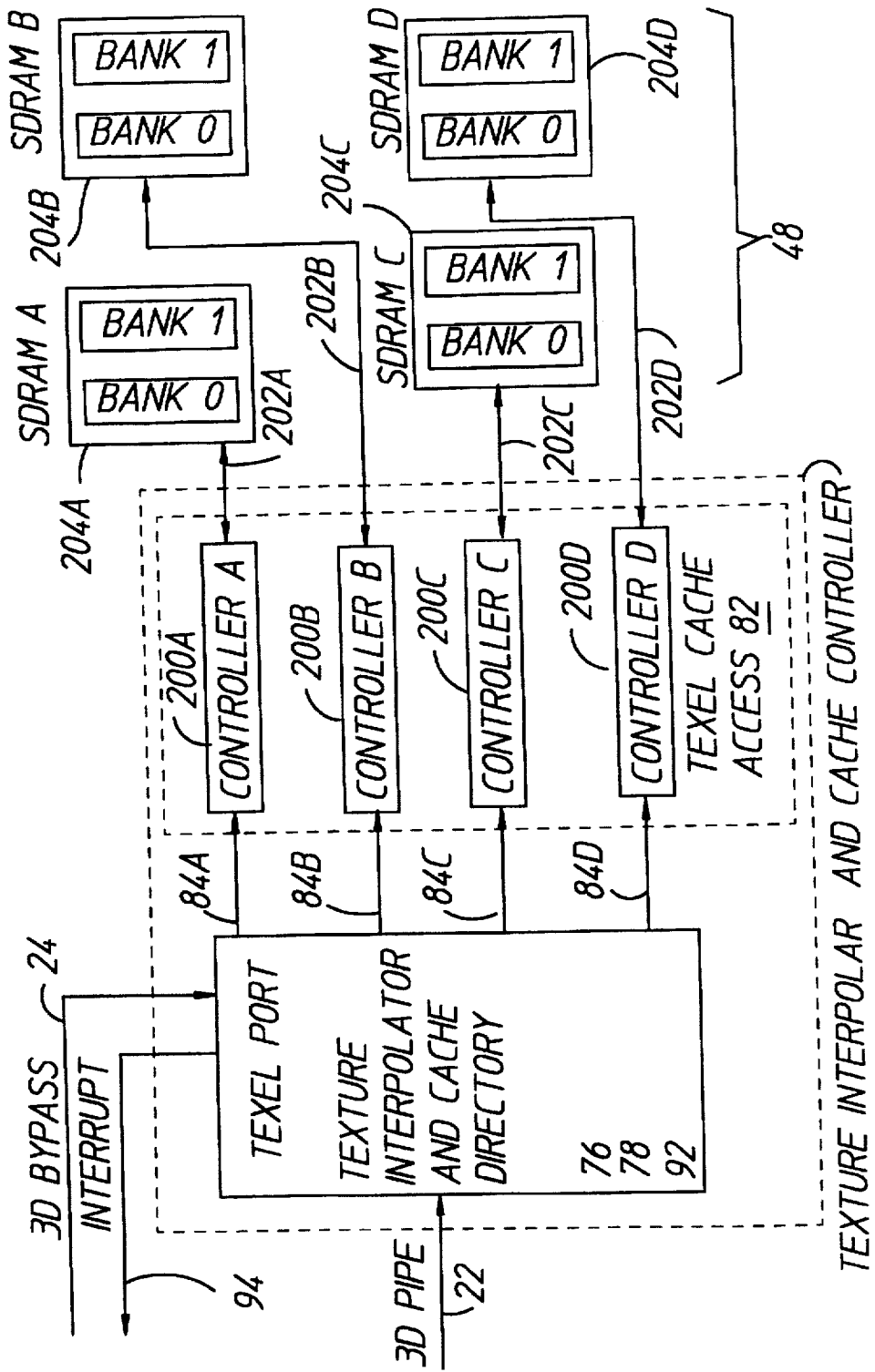
FIG. 7 is a block diagram of the cache memory and a portion of the texture mapping hardware.

FIG. 7 is a block diagram of a cache memory implementation according to one illustrative embodiment, coupled to portions of the texture mapping chip including the texel port 92, texture interpolator 76, cache directory 78 and the texel cache access circuit 82. In this illustrative embodiment, the cache memory 48 includes four interleaves 204A, 204B, 204C and 204D. Each interleave includes two SDRAM chips (not shown) that can be accessed simultaneously, with each providing eights bits of data during a read cycle. Therefore, each interleave provides sixteen bits of texel data during a single read cycle. Each 32-bit word of texel data is stored in the cache in a single interleave, with eight bits being stored in each of two consecutive locations in each SDRAM in the interleave. Thus, to read a texel from the cache, two read cycles are performed on consecutive locations in the appropriate interleave to provide the thirty-two bits of texel data. As explained below, only one address word (including row and column data) needs to be provided to the SDRAMs within each interleave to yield a burst of data on two consecutive cycles. The burst includes sixteen bits provided on a first cycle from the given address, and sixteen bits provided on a second cycle from an address having the same row and a column that is incremented by one.

The texel cache access circuit 82 includes four separate controllers labeled controller A (200A), controller B (200B), controller C (200C) and controller D (200D). The four controllers A, B, C and D can simultaneously access data from the four interleaves 204A, 204B, 204C and 204D through parallel buses 202A, 202B, 202C and 202D. The controllers read texel data from the memory 48 in response to commands and at addresses respectively received over buses 84A, 84B, 84C and 84D.

As described above, each pixel can potentially map to four texels from one MIP map, or eight texels from multiple MIP maps. As discussed in more detail below, texel data downloaded to the cache is organized in the main memory of the host computer by TIM so that any four adjacent texels in each MIP map are located in separate interleaves so that they can be accessed in parallel. Thus, any four adjacent texels in a MIP map that may be needed to generate resultant texel data through bilinear interpolation can be read in a single read operation. When trilinear interpolation is employed, the two sets of four texels from adjacent MIP maps can be read in two read operations.

FIG. 8 illustrates an example of the manner in which blocks of texture data (only some texels are shown) are organized to take advantage of the four interleave implementation of the cache memory to allow any four adjacent texels in a MIP map to be read simultaneously. Each texel is labeled A, B, C or D to identify the interleave in the cache memory where the texel is stored. The pattern of the A–D labels repeats so that any location in the map falls between four texels labeled A, B, C and D. Thus, for a pixel that maps to any location within the map, the four closest texels will be in separate interleaves A–D so that they can be can be accessed simultaneously by the four independent controllers 200A–D. For example, pixel P0 maps to a location between four texels labeled A, B, C and D, and pixel P1 maps to a location between four texels labeled B, A, D and C.

It should be understood that the above-described cache implementation is provided merely for illustrative purposes, and that alternate implementations can be employed. For example, the cache can be implemented in eight separate interleaves, with eight separate controllers so that when trilinear interpolation is employed, the eight texels can be accessed simultaneously from the cache in a single read operation.

Each SDRAM chip in the cache memory is divided internally into two equally-sized banks that can simultaneously maintain separate active pages (i.e., groups of memory locations having a common row address). Thus, data can be accessed on consecutive read cycles from different pages within the two banks of an SDRAM chip without incurring the re-paging penalty commonly associated with consecutively reading data from different pages in a conventional DRAM.

As is explained in greater detail below, the texture data is organized in the cache memory to take advantage of this feature of the SDRAMs to minimize page crossing penalties when trilinear interpolation is performed. The eight texels required for trilinear interpolation include sets of four texels from two MIP maps. Each set of four adjacent texels in a single map is arranged so that one is stored in each of interleaves A, B, C and D in the manner described above so that the four texels can be accessed simultaneously. Furthermore, common data from adjacent MIP maps in the series of maps for any texture are stored in the cache in different SDRAM banks. When trilinear interpolation is being performed, four texels from one MIP map are simultaneously read from one of the SDRAM banks of interleaves A–D during the two read cycles of a first burst, and four texels from an adjacent MIP map are read from the other SDRAM bank during the two read cycles of a subsequent burst. Because both banks of the SDRAMs can be simultaneously row-active, the two sets of four texels can be accessed in back-to-back bursts without incurring a re-paging penalty. It should be understood that when pixels of an object are being rendered, adjacent pixels will frequently map to the same two MIP maps for the texture, requiring that reads to the cache continuously switch between the cache blocks that store the common data in the two maps. This cache organization that allows two pages to remain active within each SDRAM is advantageous because it allows trilinear interpolation to be performed without incurring a re-paging penalty every cycle when switching between two adjacent MIP maps during rendering of display screen pixels.

Figure 9:
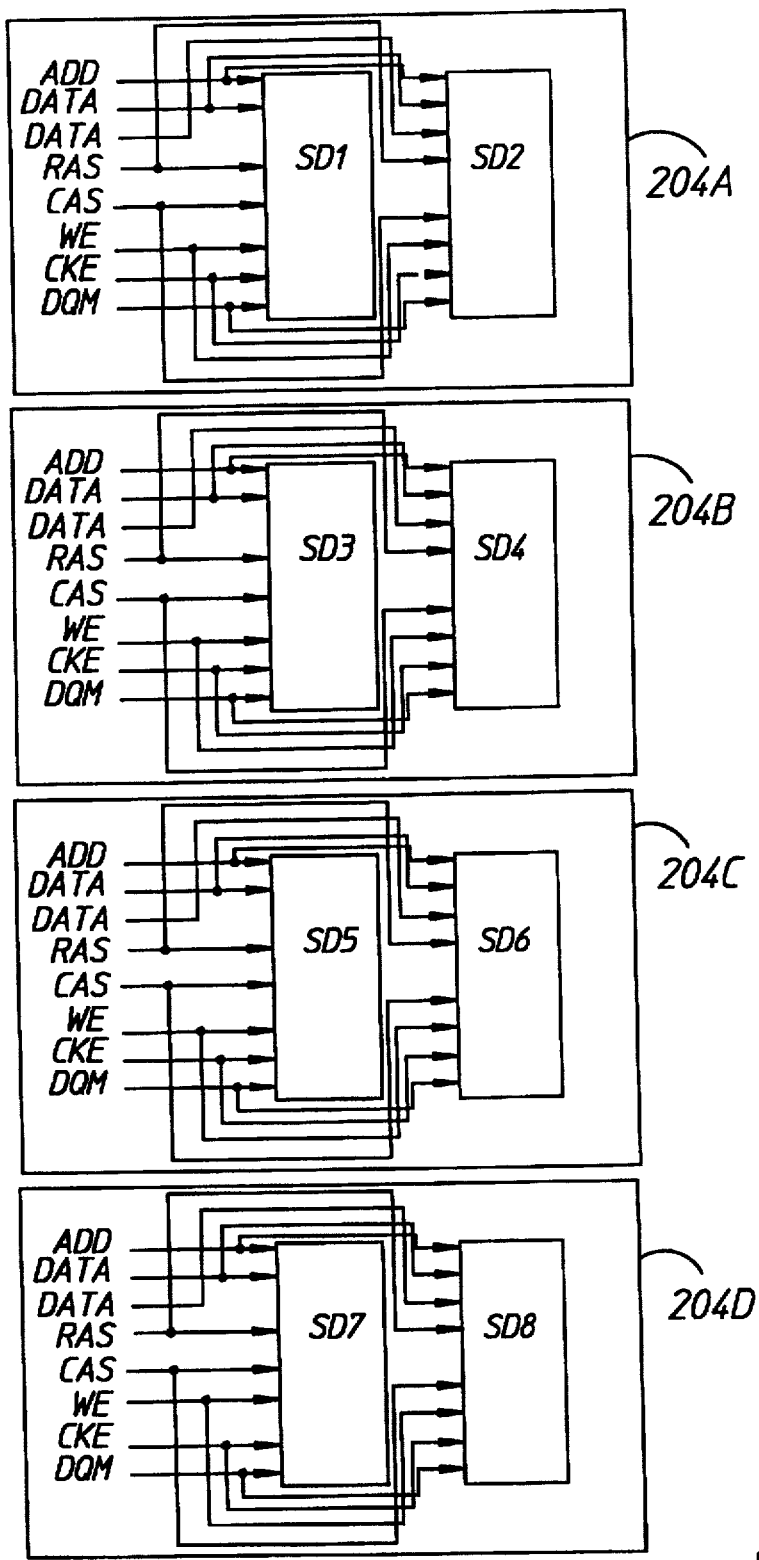
FIG. 9 is a detailed block diagram of the organization of the memory chips that form the cache memory.

FIG. 9 is a more detailed block diagram of the above-described illustrative implementation of the cache memory. The cache includes eight SDRAM chips labeled SD1–SD8 divided evenly among the four interleaves 204A–204D, with each interleave including two SDRAM chips. The two SDRAMs in each interleave share the following common lines: an address line (ADD), row and column address strobes (RAS and CAS), a write enable (WE), a clock enable (CKE) and a data input/output mask (DQM). The SDRAMs within each interleave are coupled to eight separate data lines through which eight bits of data are respectively read or written during each read or write cycle. Each SDRAM chip includes two banks of memory with each bank storing as many as 1,048,576 8-bit words of texture data.

The two SDRAMs in each interleave can be simultaneously accessed and together provide sixteen bits of data, with one of the SDRAMs providing data bits [15:08] and the other providing data bits [07:00]. As discussed above, two consecutive read cycles of a single burst yield a full 32-bit texel of data from each interleave, with a separate 8-bit word representing each of the R, G, B and ca values for the texel.

The SDRAM chips receive twenty address bits multiplexed on line ADD to decode the 1,048,576 8-bit words within each bank. As explained in detail below, a 6-bit block index and a 16-bit texel address are computed for each texel to be accessed from the cache. The block index indicates in which of the sixty-four blocks of data the texel is located and the texel address indicates the precise S,T coordinate address of the texel within the block. Eight S bits and eight T bits comprise the texel address assuming a square block of 256×256 texels. A cache address is a twenty-two bit word including the combination of the block index (six MSBs) and texel address (sixteen LSBs). The cache address indicates the precise location of the texel within the cache.

During rendering, the tiler/boundary checker decodes the LSB S bit and LSB T bit of the texel address (i.e., the LSB S coordinate and the LSB T coordinate) to determine in which of the four interleaves of the cache the texel is stored. The remaining 20 greater address bits of the cache address are provided along the address line ADD to the two SDRAM chips within the appropriate interleave. Of the twenty address bits provided to the two SDRAMs, nine bits are used to select the column and eleven bits are used to select the row within the SDRAMs to access the texel data. As should be understood by those skilled in the art, the column and row address bits are separately latched into the SDRAMs on different cycles and the RAS and CAS strobes are used conventionally to access the data.

During a two-cycle burst, sixteen bits from the addressed location of the two SDRAMs within the same interleave are provided during the first cycle and then, without providing another address, sixteen bits from another location of the two SDRAMs are provided during the second cycle. The other address includes the same row address and a column address that is incremented by one. It also should be understood that once a page (particular row address) is activated, it remains activated until a different row address is provided. Therefore, if consecutive texels to be accessed from the same interleave are in the same page (include the same row address), then the row address needs to be provided only once during the first of the consecutive bursts.

In addition, the RAS, CAS, and WE lines are used to address and write data to the SDRAM chip in a conventional manner. When the clock enable signal CKE signal is deasserted, the internal clock is suspended. The SDRAMs respond to this signal by holding data intact, rendering both banks idle. The data input/output mask DQM signal functions as an output enable during a read cycle, and an input data mask during a write cycle.

Conventional SDRAM use includes determining from which future page subsequent data will be accessed while accessing present data from a current page and activating that future page before the present data read cycle is completed. Because SDRAMs enable two different pages to be simultaneously active, the conventional SDRAM use avoids repaging penalties commonly associated with accessing data from different pages in conventional DRAMs. Conventional SDRAM use does not provide that advantage, however, when data to be read on many consecutive read cycles is located in different pages because more than one cycle is required to look ahead and activate a future page. The texture data storage method described herein provides an advantage over conventional SDRAM use by enabling multiple consecutive SDRAM read cycles from different pages to occur without incurring a penalty. Particularly, by storing common data from adjacent MIP maps of a texture (that require accessing during consecutive read cycles when executing trilinear interpolation) in separate banks of the SDRAMs, the data from the separate banks can be accessed in consecutive read cycles without penalty. While the method described herein of data storage allocation for improving SDRAM performance has been shown and described with respect to the storage of texture mapping data, it should be understood that the method is not so limited. Particularly, the method is applicable to allocate any type of data in which multiple consecutive read cycles must access data from different memory locations.

D. Cache Control FIFOs

Figure 10:
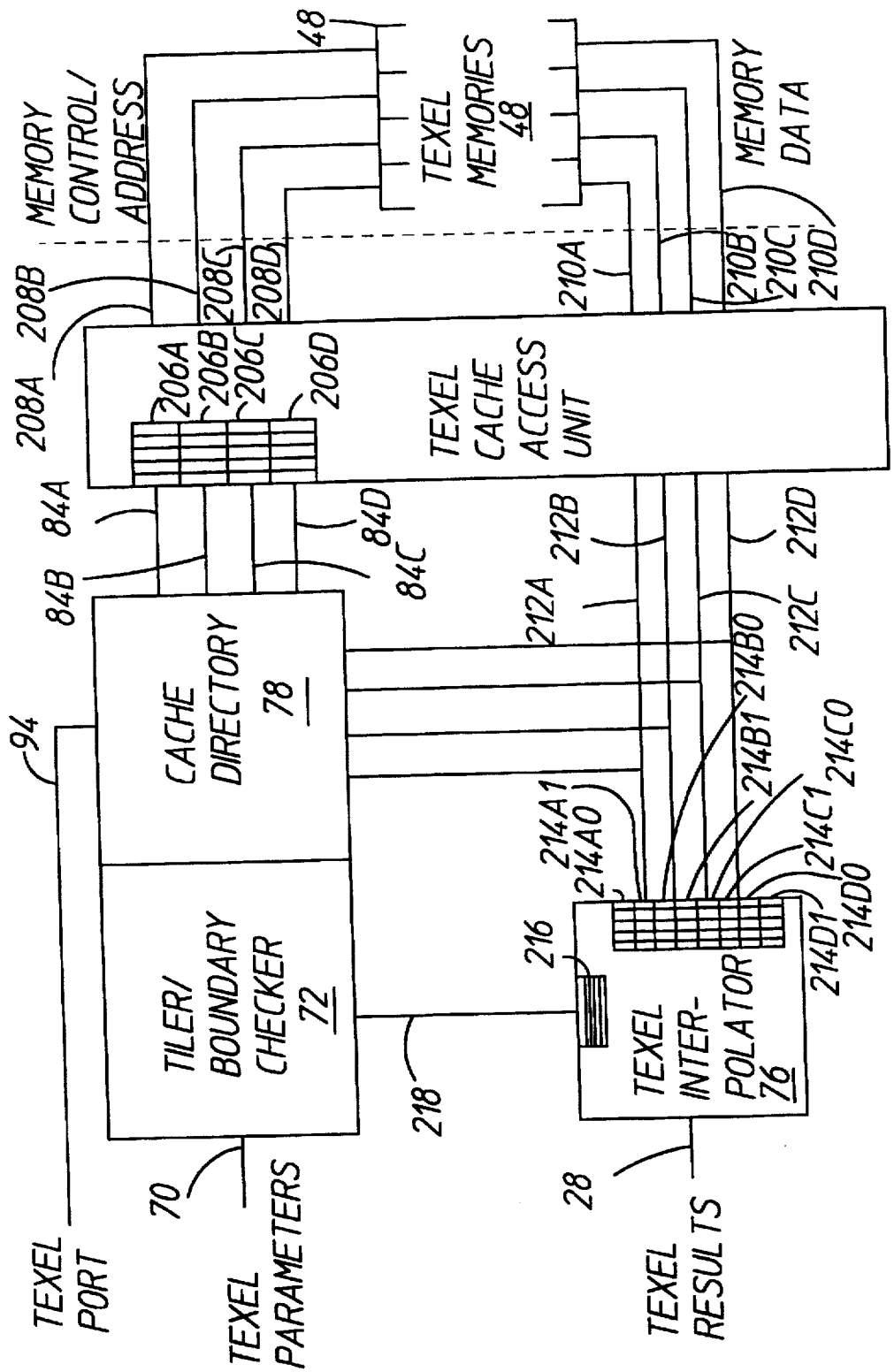
FIG. 10 is a detailed block diagram of a portion of the texture mapping hardware.

FIG. 10 is a more detailed block diagram of a portion of the texture mapping chip that includes the boundary checker 72, the cache directory 78, the cache access circuit 82, the cache memory 48 and the texel interpolator 76. The texel cache access unit 82 includes four cache access command FIFOs 206A, 206B, 206C and 206D. The cache access command FIFOs 206A–D store cache access commands respectively received from the boundary checker over buses 16-bit buses 84A, 84B, 84C and 84D. The cache access command FIFOs 206A–D respectively correspond to the controllers 200A–D shown in FIG. 7. For example, commands in FIFO 206A invoke a cache access of the SDRAMs within interleave 204A. In this embodiment, each cache access command FIFO is capable of temporarily storing eight 16-bit commands. Thus, to enhance the pipelining capability of the system, eight commands can be stored in each of the cache access command FIFOs before the cache access unit acts.

As discussed above, during rendering, identifies boundary checker 72 compares the read cache tag for each block of texture data that maps to the pixel being operated upon with each of the block tags stored in the cache directory 78 to determine whether the texel is in the cache. If a hit occurs, the block index is generated that represents the location of the corresponding block of texture data within the cache. The tiler/boundary checker simultaneously implements a routine to determine the texel address from the interpolated S,T coordinates, the texture ID and the sub-texture ID of the particular texel, as well as the map number of the map from which the texel is to be accessed and the size of the base map of the texture, as explained in detail below. From the block index and texel address (which together comprise the cache address), the optimizer then determines the particular interleave of the cache in which the texel is stored and the column and row address bits of the SDRAM chips of that interleave, as explained above. The address information is provided to the corresponding cache access command FIFO, along with a command to read the cache.

The texel interpolator 76 includes eight texel data FIFOs labeled 214A0, 214A1, 214B0, 214B1, 214C0, 214C1, 214D0 and 214D1. Texel data FIFOs 214A0 and 214A1 correspond to interleave 204A of the cache memory, FIFOs 214B0 and 214B1 correspond to interleave 204B, FIFOs 214C0 and 214C1 correspond to interleave 204C, and FIFOs 214D0 and 214D1 correspond to interleave 204D.

As described above, each of the four interleaves of the cache memory can be accessed simultaneously through separate cache access paths. During rendering, when the texel cache access unit 82 accesses texel data from the cache memory 48, texel access control words are provided over buses 208A, 208B, 208C and 208D to the cache memory 48. Four texels are accessed simultaneously from the four interleaves during two back-to-back 16-bit read cycles. The four texels are respectively provided over buses 210A, 210B, 210C and 210D to one of the texel data A FIFOs (214A0 or 214A1), one of the texel data B FIFOs (214B0 or 214B), one of the texel data C FIFOs (214C0 or 214C1) and one of the texel data D FIFOs (214D0 or 214D1). The pair of texel data FIFOs (i.e., zero and one) corresponding to each interleave A–D are loaded in alternating fashion. For example, a first texel read from interleave A is stored in texel data FIFO 214A0, a second texel read from interleave A is stored in FIFO 214A1, a third texel from interleave A is stored in FIFO 214A0, etc. This alternating scheme is employed for reasons that are discussed below.

Each of the texel data FIFOs is thirty-two bits wide, and eight stages deep. In combination, the eight FIFOs 214 store eight pipelined stages, each stage including the eight texels used to determine resultant texel data during trilinear interpolation. Buses 210A, 210B, 210C and 210D are 16-bits wide. Each SDRAM pair in each interleave provides sixteen bits of data during each read cycle. During each burst, the first sixteen bits are provided from each SDRAM pair into a first 16-bit register (not shown) and the next sixteen bits are provided from each SDRAM pair into a second 16-bit register (also not shown). At the end of the second cycle of the burst, the data from both registers is provided onto the corresponding 32-bit bus 212A, 212B, 212C or 212D. To determine the resultant texel data for any pixel, the texel interpolator 76 accesses the FIFOs to read the next stage of eight texels, and interpolates those texels in the manner described above. The resultant texel data is then provided over bus 28 to the frame buffer board 14 (FIG. 4) where it is used in the rendering the display screen pixel in the manner discussed above.

When trilinear interpolation is performed, the resultant texel data for any pixel is interpolated from four texels in one MIP map and four texels in an adjacent MIP map. Adjacent display screen pixels are generally rendered in succession. Often, adjacent display screen pixels will map adjacent locations in a texture MIP map. As a result, it is common that some common texel data may be used in interpolating resultant texel data for consecutively rendered primitives. In one embodiment, when common texel data is accessed multiple times within a number of closely spaced read cycles, the cache is only accessed for the first read, saving cache read cycles for each successive read. The most recently read texels are stored within the texel data FIFOs. Thus, subsequent accesses to those texels are done so from the FIFOs rather than the cache. This reduces the number of cache accesses required, thereby increasing system bandwidth.

For each of the texel data paths A, B, C and D, if the texel data most recently written to one of the texel data FIFOs 0 or 1 for a previous pixel matches the texel data for a pixel currently in the pipeline position for accessing the cache, then a cache access command is not provided to the corresponding cache access FIFO 206A, B, C or D. Instead, a command is sent to the texel interpolator to indicate that the texel data is stored in the most recently written location of the corresponding texel data FIFO 214A, B, C or D. For any of paths A, B, C and D wherein the texel data corresponding to the pixel currently in the pipeline position for accessing the cache does not match that data in the most recently written location of the corresponding texel data FIFO, a texel cache access command is provided to the corresponding texel cache access command FIFO to read that texel data from the cache memory 48.

It should be understood that a different result may occur for some of the interleaves A–D for any pixel currently in the pipeline position for which a cache access must be considered. For example, common texel data for consecutive pixels may exist for interleave A but not for interleaves B–D. In such a circumstance, texel data will be read from interleaves B–D for the second of the consecutive pixels when in the pipeline position for accessing texel data from the cache, but the texel data from interleave A for that second pixel will be read from the same location of one of the texel data FIFOs 214A0 or 214A1. The present scheme provides bandwidth savings when texels are re-read from the texel data FIFOs for multiple pixels without accessing the cache..

The texel interpolator 76 includes a texel interpolator command FIFO 216 that receives 53-bit commands from the boundary checker 72 over 53-bit bus 218. The texel interpolator command FIFO can store up to 16 commands that indicate to the interpolator which texel data FIFO locations contain the texel data to be used in interpolating the resultant texel data during each cycle. The interpolator commands also indicate the mode of interpolation (i.e., point sampling, bilinear or trilinear), and include the gradient and fractional values of the S and T coordinates, which specify the manner in which each texel should be weighted in the interpolation. The commands include data indicating from which texel data FIFOs 214A0, A1, B0, B1, C0, C1, D0, or D1 each of the four (bilinear) or eight (trilinear) texels are to be read, and whether the texel data is new or old. Texel data is new when it is different from the texel data stored in the most recently written to location of either texel data FIFO of that path. When new, a cache read is required. Texel data is old when it is the same as that stored in the most recently written location of either texel data FIFO. When old, a cache read is not required. When the texel data is new, the FIFO read pointer must be moved to a next location within the FIFO, whereas when the texel data is old, the same data is read from the same FIFO location and the read pointer need not be moved.

Figure 11:
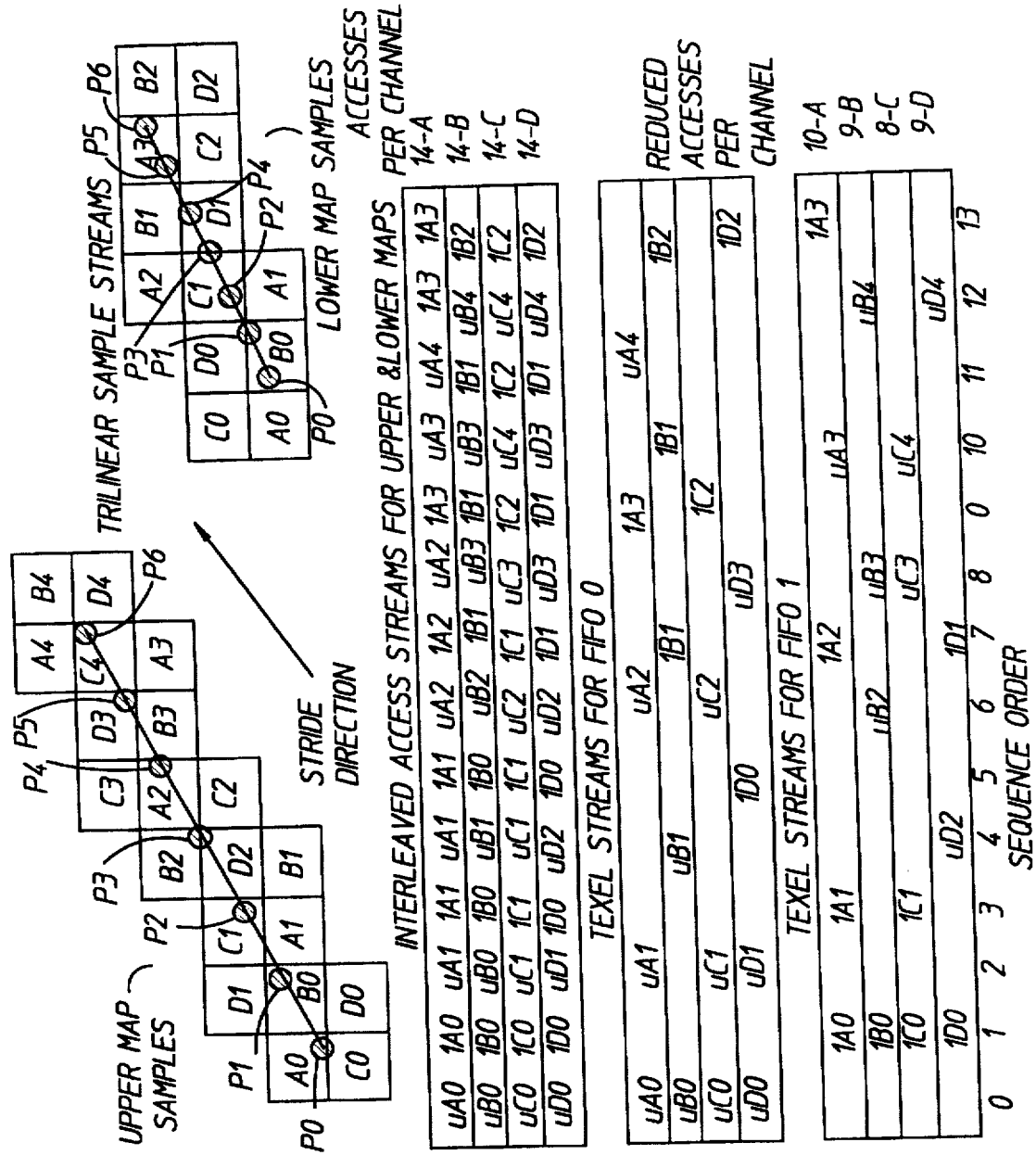
FIG. 11 is a diagram and chart illustrating an example of texels accessed from adjacent MIP maps for each of a stream of pixels according to a texture mapping scheme.

The following example explained with reference to FIGS. 11 and 12 further illustrates the operation of the texel access circuit shown in FIG. 10. FIG. 11 shows multiple texels of an upper MIP map and multiple texels of a lower (smaller in size) MIP map. The texels are labeled An, Bn, Cn and Dn (wherein n represents an integer) in accordance with the labeling scheme previously described with respect to FIG. 8. Seven pixels to be rendered are labeled P0, P1, . . . P6. As shown, the pixels to be rendered do not map directly to the texels of the MIP maps. In this example, trilinear interpolation is performed such that four texels from the upper map and four texels from the lower map are to be accessed and interpolated for each pixel. The stride direction is the direction of rendering and corresponds to the numeric numbering of the pixels.

Figure 12:
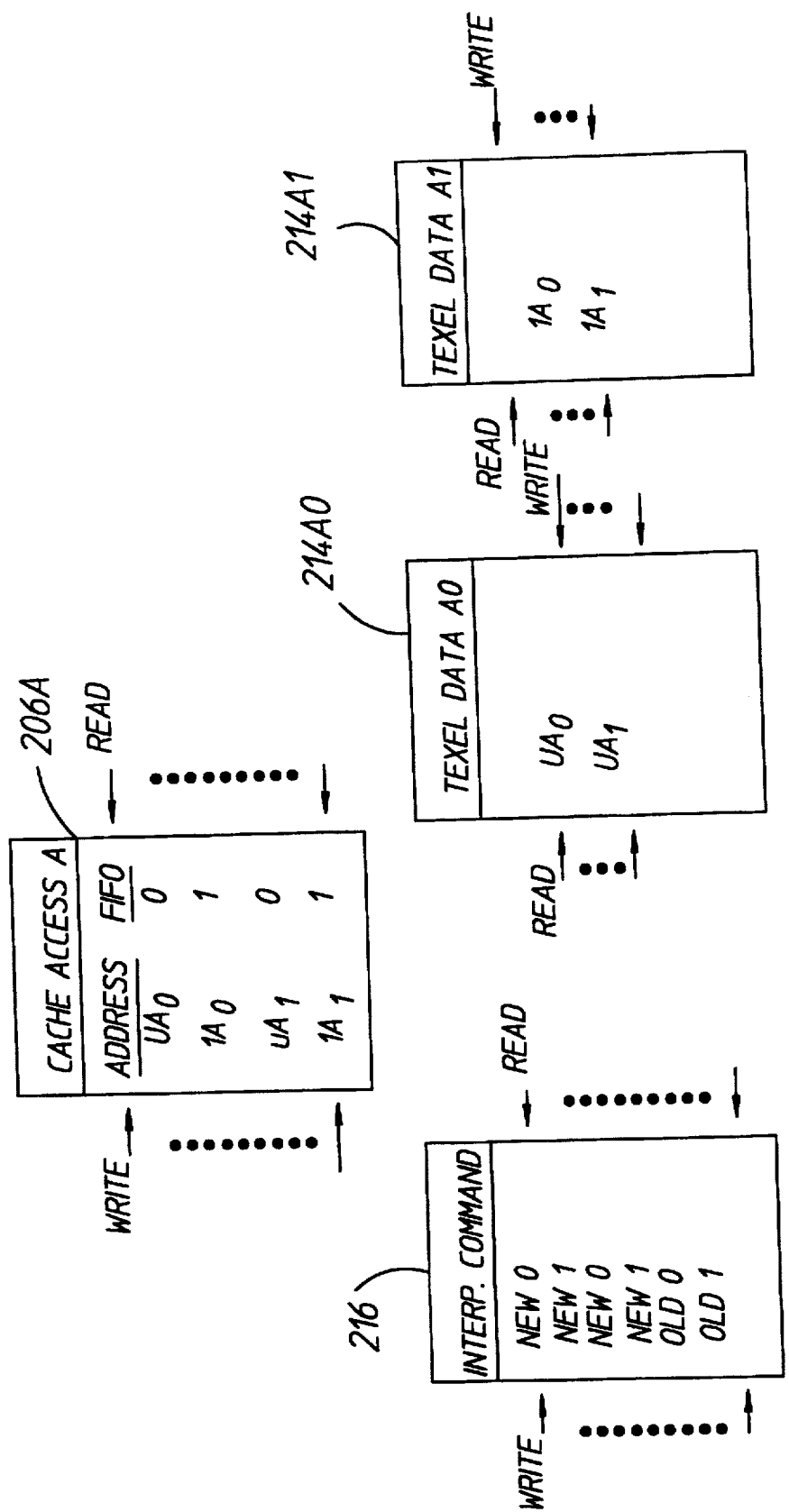
FIG. 12 is a diagram of texture mapping hardware buffers and associated data entries according to the example of FIG. 11;.

FIG. 12 illustrates the cache access command FIFO (206A), the texel data FIFO A0 (214A0), texel data FIFO A1 (214A1) and the texel interpolator command FIFO 216. Only the FIFOs associated with the texel data A path are shown for convenience because the FIFOs for each of the other texel data paths B, C and D operate in the same manner. Each FIFO buffer includes a write pointer and a read pointer that respectively point to single locations within the FIFO to which data should be written and from which data should be read. The pointers can move one location at a time in this illustrative embodiment.

Pixel P0 maps to texels A0, B0, C0 and D0 in the upper map and texels A0, B0, C0 and D0 in the lower map, so these eight texels are interpolated to generate the resultant texel data for pixel P0. For pixel P0, the address of texel A0 in the upper map (i.e., uA0) is written to a first location in the cache access command FIFO 206A, along with an address indicating that texel data FIFO 214A0 should be written with the texel data read from the cache at that address. Next, the write pointer of cache access command FIFO 206A is moved by one location, and the address of texel A0 in the lower map (i.e., 1A0) is written to that FIFO next location, along with an address indicating that texel data FIFO 214A1 should be written with the texel data read from the cache at that address. In this manner, the texel data FIFOs 0 and 1 are alternated for the reasons discussed above. The cache access command FIFOs 206B–D are updated in a similar manner relating to texels B0, C0 and D0 in the upper and lower maps.

For pixel P1, texels A1 in the upper and lower maps, respectively stored at addresses uA1 and 1A1, need to be interpolated. Since texels A1 in the upper and lower maps are new texels and do not correspond to texels from the previous pixel P0, they will be accessed from the cache. Thus, the texel addresses for these texels are added to the next two locations of the cache access command FIFO 206A, along with the corresponding addresses respectively indicating that the texel data read from those addresses is to be stored in texel data FIFOs 214A0 and 214A1. FIG. 12 represents the cache access command FIFO 206A after having been updated with this information.

Because there are no common A addressed texels for the first two pixels P0 and P1, the cache memory will be accessed to retrieve the texel data for both. The first command is read from the cache access command FIFO 206A, causing the texel data at address uA0 to be read from the cache memory and written to the first location of the texel data FIFO 214A0. Then, the next command is read from the cache access command FIFO and texel data at address 1A0 is accessed from the cache and written to the first location of the texel data FIFO 214A1. The next command then is read from the cache access command FIFO and texel data at address uA1 is accessed from the cache and written to the next location in the texel data FIFO 214A0. Finally, the fourth command is read from the cache access command FIFO and the texel data at address 1A1 is accessed from the cache and written to the next location of the texel data FIFO 214A1

For the next pixel P2 to be rendered, texels at addresses uA1 and 1A1 need to be interpolated. Because these texels were accessed for previously rendered pixel P1, they are respectively stored in the most recently written entries in texel data FIFOs 214A0 and 214A1. Thus, no new cache access commands for those texels are provided to the cache access command FIFO 206A. Rather, after the resultant texel data for pixel P1 is interpolated, the texel data stored at addresses uA1 and 1A1 can respectively be accessed by the texel interpolator from the most recently read locations of the texel data FIFOs 214A0 and 214A1, without having to access the cache. Reading data directly from a FIFO buffer is less time consuming than accessing data from a cache memory. Therefore, the FIFO buffers that reduce cache accesses increase system bandwidth.

As discussed above, the texel data FIFOs 214 corresponding to each of interleaves A–D includes separately controlled FIFOs zero and one. The FIFOs are divided in this manner to efficiently implement trilinear interpolation. As should be appreciated from the foregoing, in the above-described embodiment, the texel data FIFOs 214 each provides access to its most recently read entry by maintaining its read pointer to point to the same entry for consecutive reads. Thus, although each interleave alternates between reads of two maps during consecutive read cycles, the separate FIFOs can perform consecutive reads within a single map, allowing the read pointer to point to the same texel data in consecutive accesses to the FIFO. As each pixel is being operated upon by the tiler/boundary checker 72 and commands are being provided to the cache access command FIFO, commands also are written to the texel interpolator command FIFO 216. For example, when the command to access the texel at address uAO is provided to the cache access command FIFO for pixel P0, the command New0 is provided to the first location of the texel interpolator command FIFO 216. The command New0 indicates to the texel interpolator that the next texel data from interleave A will be accessed from the cache and provided to the texel data FIFO 214A0, indicating that in order to read the texel data from the FIFO, the texel interpolator should move the FIFO read pointer by one location from the location most recently read.

For the next command provided to the cache access command FIFO that corresponds to texel address 1A0, the command New1 is provided to the next location of the texel interpolator command FIFO. The command New1 indicates to the texel interpolator that the next texel data from interleave A is also new and should be read from texel data interpolator 214A1. Similarly, for the commands associated with texel addresses uA1 and 1A1 that correspond to pixel P1, the commands New0 and New1 are respectively written to the next two locations of the texel interpolator command FIFO 216.

For pixel P2, since the texel data at addresses uA1 and 1A1 is identical to data written to the FIFOs for the previous pixel P1, the commands written to the next two locations of the texel interpolator command FIFO 216 are Old0 and Old1, respectively indicating to the texel interpolator that the next texel data should be re-read from the most recently read locations of the texel data FIFOs 214A0 and 214A1. The Old0 and Old1 commands indicate that in order to read the next texel data from the FIFOs, the texel interpolator should not move the FIFO read pointer from the location most recently read.

FIG. 11 lists three tables: the first table indicating the texels that need to be interpolated for each of the pixels, the second table listing the separate texel data values that need to be stored in the texel data FIFOs A0, B0, C0 and D0; and the third table listing the separate texel data values that need to be stored in the texel data FIFOs A1,B1,C1 and D1. The blank spaces indicate shared texel data previously read from the cache that need not be again read from the cache, and that instead can be accessed from FIFOs. As this chart indicates, when resultant texel data for multiple pixels is interpolated, a large number of cache accesses can be saved by the FIFO scheme, resulting in an increase in system bandwidth.

Figure 13:
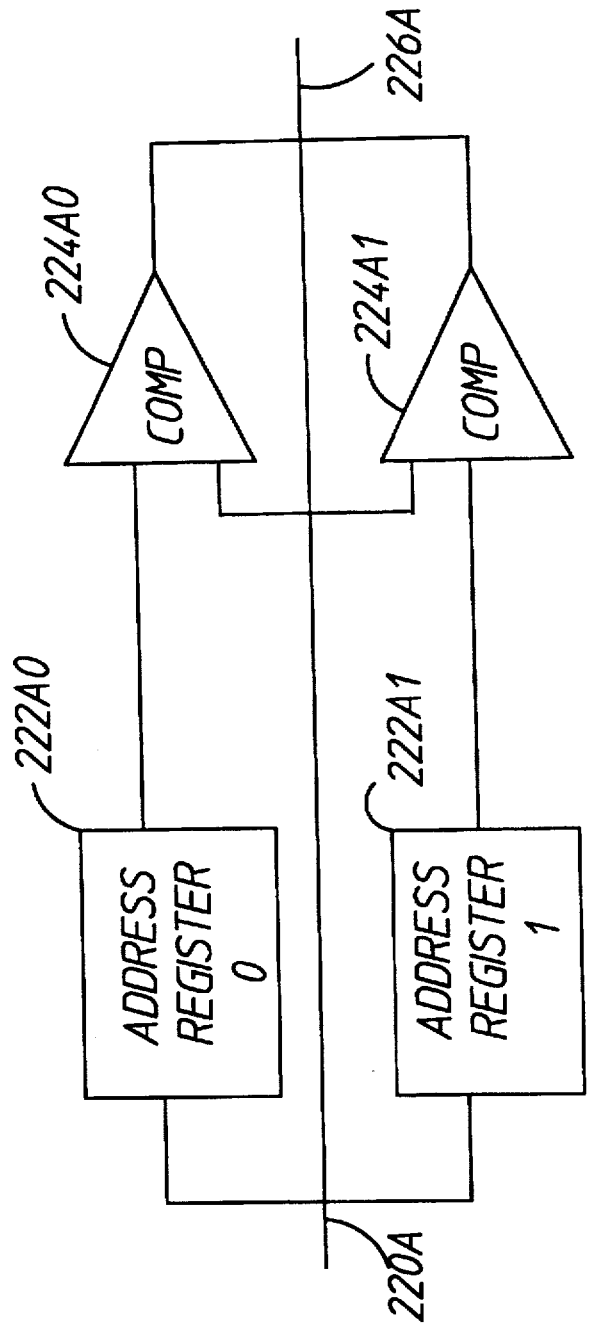
FIG. 13 is a block diagram of a circuit employed by the texture mapping hardware.

FIG. 13 is a block diagram of a circuit used by the texture mapping chip to determine whether, in each interleave, texel data to be read for a pixel was read for the most recently rendered pixel. This circuit is used to determine whether to write a new command to one of the cache access command FIFOs to cause new data to be read from the cache or to write a command to the texel interpolator command FIFO indicating that the texel data is old and should be read from one of the texel data FIFOs. FIG. 13 shows only a single circuit that corresponds to interleave A. However, similar circuits are also provided for interleaves B, C and D. The circuit is located within the optimizer element of the tiler/boundary checker. From the interpolated S,T value received by the tiler/boundary checker for each texel to be interpolated, the optimizer provides a texel address (including the block tag and texel address) on bus 220A. The address of the most recently processed texels assigned to texel data FIFOs 214A0 and 214A1 are respectively stored in address registers 222A0 and 222A1. The current texel address is respectively compared with the texel addresses stored in registers 222A0 and 222A1 by comparators 224A1 and 224A1.

When the present texel address does not match either of the addresses stored in registers 222A0 and 222A1, texel data corresponding to that texel address needs to be accessed from the cache memory, and the appropriate command is written to the cache access command FIFO. However, when the texel address matches the address stored in address register 222A0 or 222A1s, the texel data will be respectively stored in texel data FIFO 212A0 or 212A1 in the location that will be read by the texel interpolator immediately before accessing the texel data corresponding to the address. Therefore, no cache access command is written to the cache access command FIFO, and a command is written to the corresponding texel interpolator command FIFO indicating that the texel data is old, and should be accessed from the most recently read FIFO location without moving the read pointer.

E. Organization of Blocks of Texture Data

Figure 1:
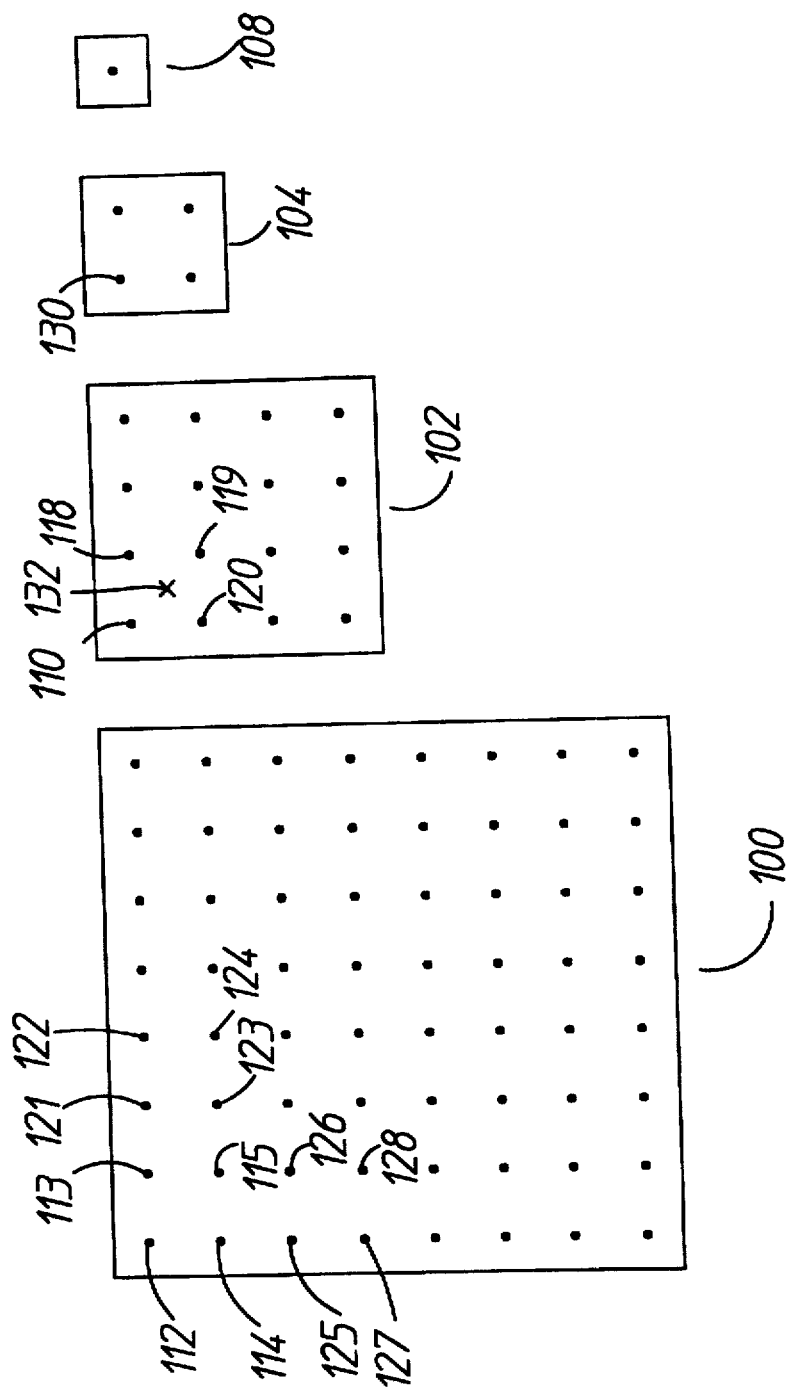
FIG. 1 is a graphical illustration of a set of texture MIP maps.

FIG. 1 shows a series of square texture MIP maps that includes a base map 100 of 8×8 texels. From the base map, each successive map is filtered in size to a smallest size map 108 (i.e., including only one texel). The smallest size map 108 is assigned a map number of zero, and the map number for each successively larger map is incremented by one so that the base map 100 in this example has a map number of three. The map number is used in determining the block tag for each block of texture data in a manner that is described below. According to this map numbering scheme, assuming a square texture base map, a map number of ten corresponds to a map of 1024×1024 texels a map number of nine represents a 512×512 texel map, a map number of eight represents a 256×256 texel map, and so on. If the texture base map is not square, then a map number 10 corresponds to a map having a larger dimension of 1024 texels. While this discussion assumes a square texture base map, rectangular maps also are possible. If rectangular, the map number is determined by the number of texels of the longer dimension of the map. For example, a rectangular map having a map number of ten has a longer dimension with 1024 texels. It also should be understood that other map numbering schemes can alternatively be used.

A 1024×1024 texel map that has a map number of ten requires ten bits of S coordinates S[9:0] and ten bits of T coordinates T 9:0 to uniquely identify the location of each texel within the map. Similarly, a map having a map number of nine requires nine bits of both S and T coordinates to identify the location of each texel, a map having a map number of eight requires eight bits of both S and T coordinates to identify the location of each texel, and so on. The S and T coordinates that uniquely identify the location of a texel in a MIP map that correspond to any pixel are interpolated in the manner described above. As described in greater detail below, texture data is stored in the main memory 17 of the host computer 15 (FIG. 4) in blocks of 256×256 texels. When a cache miss occurs, a read cache tag identifying the block of texture data that missed in the cache is read TIM, and that block of texture data is then downloaded to the cache memory 48 of the texture mapping board. Sixty-four blocks of texture data can be stored in the cache memory at any one time. These sixty-four blocks of texture data can include data from multiple MIP maps of one or more textures. Each block has an associated block tag that uniquely identifies it. MIP maps having a map number of nine or larger include greater than 256×256 texels, and therefore are stored in multiple blocks. The high-order S,T coordinates for any map that is stored in multiple blocks are included in the block tag for the blocks of data that store the map.

For example, MIP maps having a map number of nine have one dimension equal to 512 texels and, if square, are 512×512 texels in size. The map is divided into four blocks of 256×256 texels (assuming a square texture map). Therefore, the block tag for each of those blocks includes one high-order S coordinate bit and one high-order T coordinate bit (i.e., S[8] and T[8]) that identify the location of the block within the map. Similarly, MIP maps having a map number of ten are 1024×1024 texels in size, and are divided into sixteen blocks of data. Therefore, the block tags for each of those blocks includes two high-order S coordinate bits and two high-order T coordinate bits (i.e., S[9:8] and T[9:8]) that identify the location of the block within the map.

As described below, in order to reduce system bandwidth during trilinear interpolation, the texture MIP maps are subdivided and stored in memory so that the same portions of adjacent MIP maps are stored in opposite SDRAM banks. In addition, to provide for efficient use of memory space within the cache memory, multiple maps smaller than 256×256 texels can be stored in a single block of cache memory.

Figure 14:
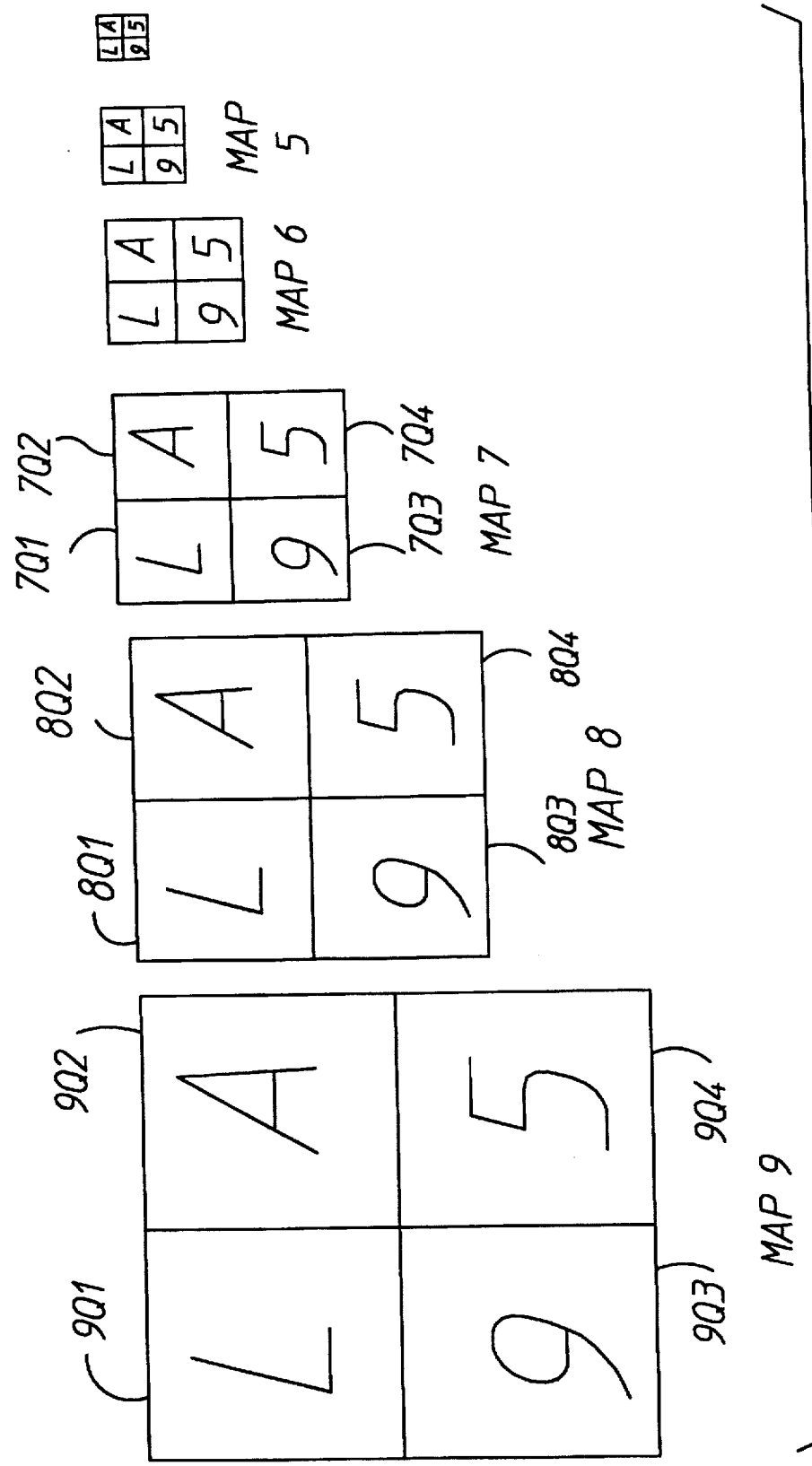
FIG. 14 is a diagram of an example of a set of texture MIP maps.

FIG. 14 shows a set of texture MIP maps for a particular texture including the surface image:

As shown in FIG. 14, each MIP map in the series of MIP maps for a texture is divided into four quadrants that are of equal size for a square texture map. In the example shown in FIG. 14, the base map has a map number of nine, and is divided into quadrants 9Q1 (including image L), 9Q2 (including image A), 9Q3 (including image 9) and 9Q4 (including image 5). Similarly, map number eight is divided into quadrants 8Q1, 8Q2, 8Q3, 8Q4, respectively including images L,A, 9 and 5. Likewise, map number seven is divided into quadrants 7Q1, 7Q2, 7Q3, 7Q4 respectively including images L,A, 9 and 5. The smaller maps are similarly subdivided into quadrants.

Figure 15:
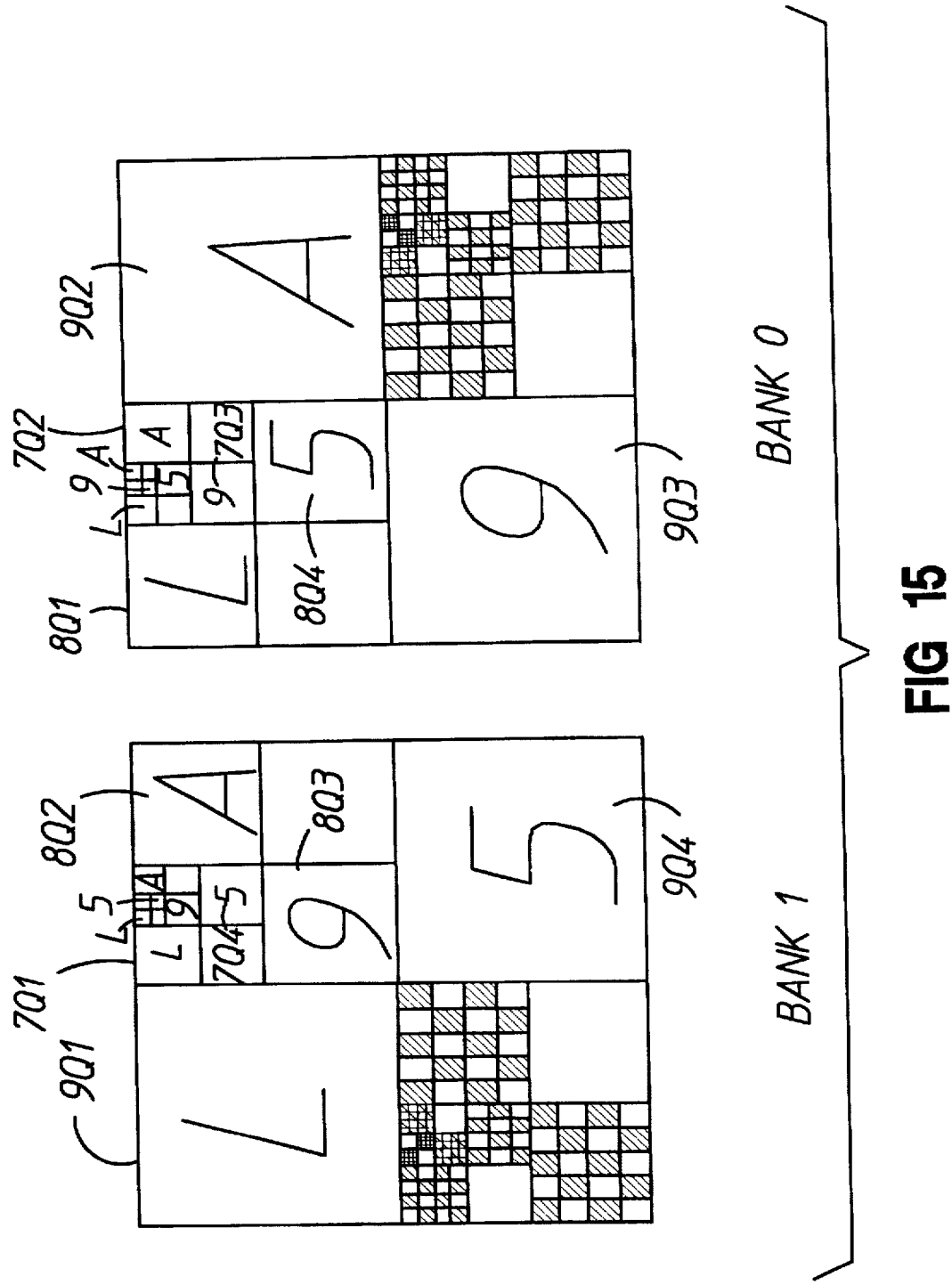
FIG. 15 is a diagram illustrating how the MIP maps of the example of FIG. 12 are stored in memory according to a memory storage scheme.

Two quadrants of each MIP map are stored in one bank of the SDRAMs that form the cache, while the other two quadrants are stored in the opposite bank. According to a texture data allocation scheme, for textures having a base map with a number greater than or equal to eight (being greater than or equal to 256×256 texels in size), the memory locations within the blocks of memory space for all of the quadrants of all of the MIP maps of that texture are predefined. For example, quadrants 9Q1 and 9Q4 of map number nine 9 are stored in separate blocks within cache bank one, and quadrants 9Q2 and 9Q3 are stored within separate blocks of cache bank zero, as shown in FIG. 15. The corresponding quadrants of adjacent MIP maps are stored in blocks within opposite banks. Thus, in this example, quadrants 8Q1 and 8Q4, which respectively include the box filtered texture data of quadrants 9Q1 and 9Q4, are stored in the same block within cache bank zero. Similarly, quadrants 8Q2 and 8Q3, that respectively include the box filtered texture data of quadrants of 9Q2 and 9Q3, are stored in the same block within cache bank one. FIG. 15 is not drawn to scale with respect to FIG. 14. It should be understood that the map quadrants of FIG. 14 are the same size as those of FIG. 15 as they are identical.

Because of the respective sizes of the maps, each quadrant of map number nine occupy a complete block of 256×256 texels, whereas the quadrants of map number eight each occupy only ¼ of a block. Therefore, quadrants 8Q2 and 8Q3 together occupy ½ of the same block and quadrants 8Q1 and 8Q4 occupy ½ of another block within the opposite bank. To efficiently allocate the cache memory space, the unoccupied locations within each of those blocks is occupied by appropriate quadrants of maps having a map number of seven or less. Therefore, all of the maps having numbers zero to eight together occupy two blocks, each of the two blocks being in a separate bank.

The locations of the quadrants for the maps having map numbers of eight or less (given a base map having a map number of eight or greater) are predefined in the manner shown in FIG. 15. As shown, the upper right quadrant 8Q2 and lower left quadrant 8Q3 maintain the same physical relationship and respectively occupy the upper right and lower left quadrants of a first block, and the upper left quadrant 8Q1 and lower right quadrant 8Q4 also maintain the same physical relationship and respectively occupy the upper left and lower right quadrants of a second block that is in a different bank from the first block. Also, quadrants 7Q1 and 7Q4 maintain the same physical relationship and respectively occupy the upper left quadrant of the first block, and quadrants 7Q2 and 7Q3 maintain the same physical relationship and respectively occupy the upper right quadrant of the second block.

During trilinear interpolation, if a pixel maps to a position in the texture map that is between four texels in one MIP map and four texels in an adjacent MIP map, then all eight texels are accessed from the cache. The texels accessed from both MIP maps include common texture data, with the data from the smaller map being a filtered version of the data from the larger map. As discussed above, when pixels of an object are being rendered, adjacent pixels will frequently map to the same two MIP maps for the texture, requiring that reads to the cache continuously switch between the cache blocks that store the two maps. By storing common data from adjacent MIP maps in different banks of the cache SDRAM chips, re-paging penalties are not incurred when cache reads switch between the two MIP maps during consecutive read cycles. This provides for efficient implementation of trilinear interpolation.

As should be appreciated from the foregoing, when a texture includes a base map having a map number of eight or greater, the allocation of the MIP maps among the blocks for that texture is predefined in accordance with the described illustrative embodiment. This is so because two quadrants of a map having a map number eight occupy certain predefined locations of a first block within one of the banks, and the other two quadrants of the map having a map number eight occupy certain opposite predefined locations within another block of the opposite bank, as discussed above and shown in FIG. 15. However, for textures having a base map with a map number of seven or less, multiple locations within the two blocks of memory (one block in each bank) are available to store the maps, and are selected by TIM. When portions of multiple maps share a single block of data, a sub-texture identification (ID) is assigned in a manner described below to identify the location of each map within the shared block.

In addition to the organization of the series of MIP maps of FIG. 14, FIG. 15 also shows the manner in which a second series of MIP maps from a different texture (i.e., a checkerboard pattern) is allocated among the memory blocks. The MIP maps of this second texture are subdivided and stored in separate blocks of data in the same manner as the first texture. Although the organization of FIG. 15 shows the MIP maps of the different textures as being organized in separate blocks, it should be understood that texture data from two different textures can be stored within the same block.

As discussed above, in one illustrative embodiment, the cache memory can store up to sixty-four blocks of texture mapping data, with each block including 256×256 texels. The cache memory is divided into two banks, with blocks 0–31 lying in bank zero, and blocks 32–63 lying in bank one. The cache directory includes up to sixty-four block tag entries that correspond to the blocks in the cache. The physical location of each block tag within the cache directory identifies the physical location of the corresponding block of texture data within the cache memory. A block index is generated from the block tag that indicates the location of the block. The cache address for any texel in the cache is formed from the block index for the block, and the texel address within the block. The texel address includes the low-order interpolated S,T coordinates for the texel, and may also include bits from the sub-texture ID as discussed below.

FIG. 16 shows an example of a texture MIP map having a map number of nine that is subdivided into quadrants. The MIP map is 512×512 texels in size, and therefore, each quadrant is 256×256 texels in size and corresponds to a single block of memory. In accordance with one embodiment of the present invention, a simple scheme is implemented by TIM to determine the bank in the cache to which each quadrant of the MIP map should be assigned. As explained below, for each MIP map quadrant, the results of a logical exclusive OR operation on the values of the most significant bits of the S and T coordinates for the quadrant dictate the SDRAM bank in the cache to which the quadrant is assigned.

For a map of 512×512 texels, nine S coordinate bits S[8:0] and nine T coordinate bits T[8:0] specify the location of each texel within the map. The quadrant boundaries are established at the halfway point of the map in both the S and T dimensions, represented by the most significant S and T coordinate bits S[8] and T[8]. Therefore, to determine the cache banks for each of the four quadrants of a MIP map having a map number of nine, an exclusive OR operation is performed for each quadrant on the values of its corresponding most significant S and T coordinate bits S[8] and T[8]. Similarly, for a MIP map having a map number of ten, the cache bank for each quadrant is determined by an exclusive OR operation on the corresponding values of its most significant S and T coordinate bits S[9] and T[9]. For MIP maps having an odd map number, the result of the exclusive OR operation is inverted so that common data from adjacent maps are stored in different banks.

In the example shown in FIG. 16, the blocks labeled block1–block4 correspond respectively to the upper left quadrant, the upper right quadrant, the lower left quadrant and the lower right quadrant of the 512×512 texel map. For block1–block4, bits S[8], T[8] are respectively equal to [0,0], [1,0], [0,1] and [1,1]. Therefore, for block1 the result of the XOR operation S[8] XOR T[8] equals zero. Because the map has an odd map number (i.e., nine), the inverse of this result (equaling one) is used to indicate that block1 is to be stored in bank one of the cache. For block2, the inverse of the result of the XOR operation S[8] XOR T[8] equals zero, indicating that block2 is to be stored in bank zero in the cache. For each of block3 and block4, the inverse of the result of the XOR operation S[8] XOR T[8] respectively equals one and zero indicating that block3 is to be stored in bank one and block4 is to be stored in bank zero.

For a map having a map number of ten for the same texture as shown in the example of FIG. 16, the map would be split into sixteen blocks of 256×256 texels each, because the map is 1024×1024 texels in size. For each block, the results of S[9] XOR T[9] would indicate the bank number for that particular block. Note that the result of the XOR operations for each block of the map having a map number of ten are not inverted as they were for the adjacent map having a map number nine, so that the corresponding quadrants in the two maps are stored in different cache banks.

Depending on the size of the map, the block tag for blocks of texture data that represent the map may include at least one high-order S coordinate bit and one high-order T coordinate bit that indicates the location of the block within the particular MIP map. For a 512×512 texel MIP map having a map number of nine, only one S coordinate bit and one T coordinate bit would be required in the block tag to indicate the location of each block within the MIP map. For a 1024×1024 texel MIP map having a map number often and including sixteen blocks of data, two S coordinate bits and two T coordinate bits would be required in the block tag to indicate the location of each block within the MIP map. For maps having a map number of eight or smaller, no S and T bits are required in the block tag. When downloading texture MIP map data from the main memory of the host computer to the cache memory, TIM decodes the upper level S and T coordinate bits of the block tag using the above-discussed exclusive OR scheme to determine the particular bank to which each block of data should be written.

To allocate texture data so that unused memory space is minimized, each block of data can be further subdivided into sixteen sub-blocks of 64×64 texels. Each sub-block of texture data includes a sub-texture ID that identifies the location of the particular sub-block within the block. The sub-texture ID includes two S bits S[1:0] and two T bits T[1:0]. Multiple sub-textures from one or more MIP maps of one or more textures can be stored in a single block.

FIG. 17 illustrates block1 and block2, respectively assigned to banks zero and one of the cache, each subdivided into sixteen sub-textures of 64×64 texels in size. The sub-textures of each block are labeled ST0–ST15, and are identified by a sub-texture ID that includes two S coordinate bits and two T coordinate bits. The sub-textures have consistent labeling but mirror locations within the two cache banks to be consistent with the memory allocation scheme described above. The size of the sub-textures of 64×64 texels is selected to be exemplary and can be altered. For example, a smaller sub-texture would enable more textures to be packed within the same blocks. It should be understood that the sub-texture ID would need to include more bits as the size of the sub-texture is decreased.

During rendering, for each stream of texels to be interpolated, the texture ID, sub-texture ID and 8-bit word representing the size of the base map for that texture associated with those texels is provided through the 3-D pipeline to the tiler/boundary checker which temporarily stores the data in a 20-bit register (not shown). When a texel to be interpolated has a different sub-texture ID or texture ID, the new data is provided to the tiler/boundary checker and stored in the register. The sub-texture ID may be used as part of the texel address, as explained below.

Whether the texel address includes S,T coordinate bits of a sub-texture ID depends on the size of the map being addressed and the size of the base map of that texture. If the map being addressed has a map size of seven or smaller and its corresponding base map is also of size seven or smaller, then certain upper address bits of the texel address include bits from the sub-texture ID to address the location of the sub-texture within the block, as explained in detail below. As explained above, when the base map has a map number of eight or greater, the locations of all of the MIP map quadrants for that texture within their respective blocks of data are predefined. Therefore, when a texel is accessed from one of the maps for that texture having a map number of seven or less, those predefined locations are known and are used to generate the upper bits of the texel address for each quadrant without using the sub-texture ID. However, when the base map of a texture has a map number of seven or less, the locations of the MIP map quadrants are not predefined, and the sub-texture ID bits are used as upper bits of the texel address to determine the location of the sub-texture.

As stated above, multiple maps from different textures can be stored within different sub-textures of a single block of data so long as the base map from that texture is small enough. When this occurs, the texture addresses for each map includes sub-texture ID bits. For example, if four different maps having map numbers of seven from four different textures are allocated among different sub-textures within a block, and the map number for the base map of each texture is seven, then one S coordinate bit and one T coordinate bit from the sub-texture ID would be part of the texel address to distinguish between the textures. The routine by which the tiler/boundary checker computes the texel address is described below with reference to FIG. 19.

In the illustrated embodiment, texture MIP map data is downloaded one block at a time. However, it should be appreciated that alternatively, a sub-texture ID can be included in the block tag so that sub-textures could be downloaded from the main memory. Also, the sizes of the blocks and sub-textures described in this embodiment are intended solely to be exemplary and can be altered to suit any application. In one embodiment of the invention, TIM can allocate the texture data as described below with reference to FIG. 32.

F. Cache Block Tag And Block Index

The cache directory includes a block tag for each of its sixty-four entries, and identifies a corresponding block index for each entry. The block index identifies the physical location in the cache where the beginning of the corresponding block of texture data is stored. The block tag is a 23-bit identifier that uniquely identifies each block of texture data in the manner shown in FIG. 18.

To uniquely identify any texel of texture data, the texture to which it corresponds must be identified. In one embodiment, the texture mapping hardware supports an 8-bit texture ID that uniquely identifies a texture. Additionally, for texture data from different textures stored within the same blocks, an additional 4-bit sub-texture ID is supported by the hardware to identify the textures. Thus, the texture mapping hardware supports $2^{12}$ or four thousand ninety-six unique textures that can be active at any one time.

As discussed above, each texture is represented by a series of MIP maps. As discussed above, each of the MIP maps is provided with a map number indicating its position in the series of MIP maps. Thus, any texel of data is identified not only by the texture ID, sub-texture ID, and size of the base map for that texture, but also by the map number of the MIP map to which it corresponds. Finally, the texel is uniquely identified within the MIP map by its S and T coordinates (i.e., its interpolated S,T value).

Other than the sub-texture ID and the texture map base size, the above-described parameters that uniquely identify a texel are used to generate the 23-bit block tag. With respect to the map number and the S and T coordinates, the hardware used to generate the S and T coordinates is limited to fifteen bits. Therefore, for this embodiment, the largest texture map supported by the hardware has a 15-bit S field [14:0] and a 15-bit T field [14:0], resulting in a maximum texture map that is 32K×32K texels in size. As discussed above, each block of texel data includes 256×256 texels. Thus, the low-order S and T bits (i.e., T[7:0] and S[7:0]) are used to identify a particular texel within a block of texel data. Only the high-order S and T bits (T[14:8] and S[14:8]) are used in the block tag to identify a particular block of texel data.

As stated above, each MIP map is assigned a map number uniquely identifying it within the series of maps for its corresponding texture. Irrespective of the number of MIP maps in the series of maps for a texture, the smallest MIP map in the series (i.e., one texel in size) is assigned to be map number zero. Since the largest series of MIP maps for a 32K×32K texture includes sixteen MIP maps, the largest map number supported is fifteen.

The manner in which the block tag is formed is shown in the table of FIG. 18. The high-order eight bits of the block tag [22:15] correspond to the texture ID of the texture represented by the block of texture data. The low-order bits of the block tag [13:00] correspond to the high-order T and S coordinates, T [14:08] and S [14:08]. Block tag [14] corresponds to a map bit that in conjunction with the values in the high-order T coordinate field, enables the identification of the map number. It should be understood that maps smaller than the maximum 32K×32K do not employ the full S and T address fields, such that the smaller the map, the more high-order S and T address bits that are unused. As shown in FIG. 18, for maps having a map number greater than eight, the block tag bit corresponding to the least significant unused T coordinate bit is set to logical "0", and the block tag bits corresponding to the remaining high-order T coordinate bits and the map bit are set to logical "1". For map number fifteen, which uses all of the T coordinate bits, the map bit is set to logical "0". By reading block tag bits [14:07] that correspond to the map bit and the high-order T coordinate bits [14:8], the position of the first logical "0" encountered reading left to right indicates the map number represented by the block tag. If a logical 1 is included in all of block tag bits [14:08], then map numbers eight and less are represented.

As described above, all of the maps of a particular texture having a map number of eight or less are stored within two blocks of data, each block being located within a different bank of the cache. Two quadrants, or one half, of each of the maps having map numbers of eight and less are stored within each of the two blocks. Block tag bit [07] represents in which of the two blocks each one-half portion of the maps having map numbers of eight and less is stored. Thus, for each of the maps having a map number of eight or less, the block tag bit [07] has a value of "0" for the one-half (two quadrants) of that map (that is stored in the bank zero block) and has a value of "1" for the other one-half (two quadrants) of that map (that is stored in the bank one block). It should be understood that because all of the maps from a particular texture having a map number of eight or less are stored within two blocks, then only one block tag bit is used to identify those two blocks. The particular map number for each of the maps having a number eight and lower therefore is not stored as part of the block tag field.59

The value of block tag bit [07] for each quadrant of each of the maps having a map number of eight or less is computed based on the scheme for determining the bank in which the quadrant should be stored. This scheme includes the logical exclusive OR operation of the values of the MSB bits for each quadrant of even numbered maps and the inverse of the operation for each quadrant of odd numbered maps.

As shown in FIG. 18, the block tag bits [6:0] that correspond to the high-order S address bits are set to logical "0" for small maps when the S address bits are unused, so that if any of these bits is detected as a logical "1" in conjunction with a map number indicating that they should be equal to a logical "0", it can be used to indicate that there is no valid data included in the cache directory entry.

As discussed above, for each MIP map quadrant, the results of a logical exclusive OR (XOR) operation on the values of the most significant S and T coordinates for the quadrant dictate the SDRAM bank in the cache to which the quadrant is assigned. The bank number is equal to this XOR operation for maps having an even map number, and is equal to the logical inverse of the XOR operation for maps having an odd map number. This is shown in the right-hand column of the table of FIG. 18, wherein the symbol "Λ" indicates and XOR operation, and the symbol "!" indicates a logical inverse. For maps having a map number of nine or greater, each quadrant consumes at least one full block of data, and each block is stored in the bank dictated by the XOR operation shown in the last column of the table of FIG. 18.

For maps having a map number of eight or less, all of those maps occupy two blocks of data, one block in each bank. The last two rows of the table of FIG. 18 correspond to different halves (two quadrants) of any map having a map number of eight or less. The block tag bit [07] represents in which of the bank zero block or bank one block the one half map is stored. The value of that bit [07] is computed based on the XOR operation described. For example, for a map having a map number eight, for each quadrant of the map, the block tag bit [07] would equal S[7] XOR T[7]. For each quadrant of a map having a map number seven, the block tag bit [07] would equal the inverse of S[6] XOR T[6]. The block tag bit [07] is similarly computed for each quadrant of smaller maps with the result of the XOR operation being inverted for odd numbered maps only. It should be appreciated from the foregoing that because two quadrants of each map (having a map number of eight or less) are stored in the same block, those two quadrants of each map would have the same block tag bit [07].

When a hit occurs between interpolated S,T coordinates (addressing a texel to be accessed) and one of the 23-bit block tags in the cache directory, the cache directory generates a block index indentifying the physical location in the cache memory where the cache block containing that texel is stored. The cache stores sixty-four blocks of texel data at any one time. Therefore, to identify a block address in the cache memory, because $2^6=64$, a 6-bit block index is provided which serve as the high-order address bits to the cache, as described above.

The texel address is a 16-bit word including bits S[7:0] and T[7:0] that indicates the location of the texel to be accessed within the 256×256 texel block. The texel address is computed from the interpolated S,T coordinates, the map number of the map to be accessed, the texture and sub-texture IDs, and the base map size of the texture, in accordance with a routine discussed below with reference to FIG. 19. As discussed above, the LSB S bit and LSB T bit of the texel address are decoded to determine the appropriate interleave in which the texel is stored. The remaining 14 bits of the texel address in conjunction with the 6 bits of the block index serve as the cache address (with the six bits of the block index being the six MSBs of the cache address) provided to the SDRAM pair within the decoded interleave of the cache.

G. Texel Address Computation

During rendering, the tiler/boundary checker element 72 receives from the parameter interpolator 64 the interpolated S,T value of the texel to be accessed as well as a 4-bit word that represents the map number of the map from which the texel should be accessed. Each of the interpolated S and T coordinate values received from the parameter interpolator includes sixteen integer bits and eight fractional bits. The 4-bit word representing the map number includes maps ranging from map number zero (one texel in size) to map number fifteen (32k×32k texels in size) and is computed from the gradient, as described above. A comparison of the interpolated S,T value with the block tag entries in the cache directory then is performed. If a hit occurs with one of the block tags, then the block index is generated. At the same time as the cache directory search is being performed, the texel address is computed in accordance with the routine described below with reference to the flow chart of FIG. 19.

The texel address is computed by the tiler/boundary checker based on the texture ID, sub-texture ID, map number, base map number and interpolated S,T coordinates of the texel. The tiler boundary checker has all of this information. For each unique texel to be accessed, the tiler/boundary checker receives from the parameter interpolator the interpolated S,T coordinates (including sixteen integer and eight fractional bits for each of S and T) as well as a 4-bit word representing the map number from which the texel is to be accessed. In addition, through the 3-D pipeline (which also comes through the parameter interpolator) is received a command including the 8-bit texture ID, the 4-bit sub-texture ID and an 8-bit word representing the size of the base map for that texture. The 8-bit word that represents the size of the base map includes four S bits and four T bits which correspond to the map numbering scheme and respectively define the size of the S dimension and T dimension of the base map. For example, each of the 4-bit S and T words can have a value ranging from zero (which corresponds to a dimension of one texel) to fifteen (which corresponds to a dimension of 32k texels). The twenty bits of data including the texture ID, the sub-texture ID and base map number are temporarily stored in a 20-bit register (not shown) within the tiler/boundary checker until replaced with new and different data for a subsequent texel to be accessed from the cache. With this information, the tiler/boundary checker computes the texel address for each texel.

As explained above, for textures having a base map with a map number greater than or equal to eight (corresponding to a base map of 256×256 texels or greater), the quadrants of each map within that texture have a predefined location within the blocks of texture data and cache memory banks. Thus, each bit of the texel address for any texel of such a texture can be computed in accordance with this known predefined allocation scheme. For textures having a base map with a map number of seven or less (corresponding to a base map of 128×128 texels or smaller), however, a number of distinct memory locations are available for each quadrant of the maps of that texture and, therefore, certain upper level bits of the texel address will include some or all bits (or the inverse of those bits) of the sub-texture ID.

Figure 19:
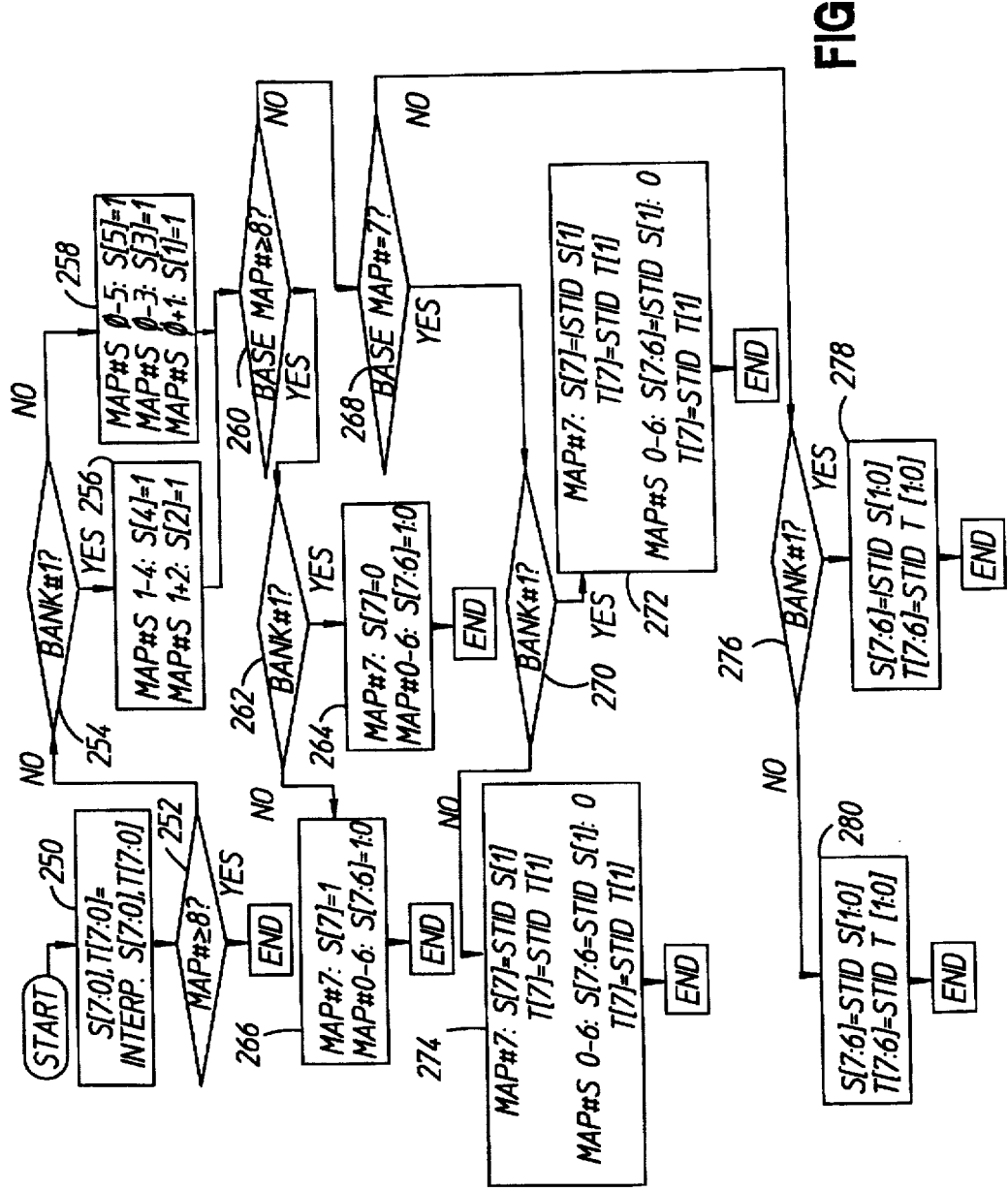
FIG. 19 is a flow chart illustrating a method for determining the texel address within a corresponding texture data block from interpolated texel data provided.

The routine implemented by the tiler/boundary checker to compute the texel address is illustrated by the flow chart of FIG. 19. The routine requires one cycle to complete. The routine is implemented by a set of logic gates (not shown) that form the boundary checker portion of the texture mapping chip. It should be appreciated by those skilled in the art how to implement the logic gates to perform the routine outlined by the FIG. 19 flow chart. For example the routine can be written in a software simulation language such as Verilog and then converted into a logic gate circuit by a synthesis tool such as Synopsys™. Such a synthesis tool operates on a general purpose processor. The routine alternatively can be written in software and performed by a computer processor.

The routine starts at step 250 where the texel address bits S[7:0], T[7:0] are preset to be equal to the interpolated S,T coordinate bits S[7:0], T[7:0]. Each of the bits of the texel address will remain as the value to which it is preset (equal to the corresponding S or T coordinate) in this step unless reset later in the routine. Then the routine proceeds to step 252 where it is determined whether the particular map within which the texel being interpolated is stored has a map number of greater than or equal to eight. If so, then the routine ends for such a texel and the bit values for the texel address remain as preset equal to the interpolated S,T coordinates.

If the map number is not greater than or equal to eight, then the routine proceeds to step 254 where it is determined whether the texel is stored in bank number one or bank number zero. As described above, it is known whether the texel is stored in bank number one or bank number zero by examining the value of block tag bit [07].

If the texel is stored in bank number one, then the routine proceeds to step 256 where certain texel address bits are reset from their preset values. For maps having map numbers one to four, texel address bit S[4]=1, and for maps having map numbers one and two, texel address bit S[2]=1. If the texel is stored in bank zero, then the routine proceeds to step 258 where, for maps having map numbers zero to five, texel address bit S[5]=1, for maps having map numbers zero to three, texel address bit S[3]=1, and for maps having map numbers zero and one, texel address bit S[1]=1.

From either of steps 256 and 258, the routine proceeds to step 260 where it is determined whether the base map has a map number that is greater than or equal to eight. If so, then the routine proceeds to step 262 where it is determined whether the texel is stored within bank zero or bank one. If the texel is stored in bank one, then the routine proceeds to step 264 where, for a map having a map number of seven, texel address bit S[7]=0 and, for maps having map numbers zero to six, texel address bits S[7:6]=0:1. The routine is then finished for such a texel. For a texel stored in bank zero, the routine proceeds to step 266 where, for a map having a map number of seven, texel address bit S[7]=1 and, for maps having map numbers zero to six, texel address bits S[7:6]= 1:0. The routine is then finished for such a texel.

If the base map does not have a map number greater than or equal to eight, then the routine proceeds to step 268 where it is determined whether the base map has a map number equal to seven. If so, then the routine proceeds to step 270 where it is determined whether the texel is stored in bank zero or one. If the texel is stored in bank one, then the routine proceeds to step 272 where, for map number seven, texel address bit S[7] equals the inverse of the subtexture ID bit S[1] and texel address bit T[7] equals subtexture ID bit T[1] and, for maps having map numbers zero to six, texel address bits S[7:6] equal the inverse of subtexture ID bit S[1] and 1, respectively, and texel address bit T[7] equals subtexture ID bit T[1]. The routine then ends for such a texel. If the texel is stored in bank zero, then the routine proceeds to step 274 where, for a map having a map number seven, texel address bit S[7] equals subtexture ID bit S[1] and texel address bit T[7] equals subtexture ID bit T[1] and, for maps having map numbers zero to six, texel address bits S[7:6] equal subtexture ID bit S[1] and 0, respectively, and texel address bit T[7] equals subtexture ID bit T[1]. The routine then ends for such a texel.

If the base map of the texture does not have a map number greater than or equal to eight (determined in step 260), nor is it equal to seven (determined in step 268), then it is of course known that the base map of the texture has a map number less than or equal to six and the routine proceeds to step 276 where it is determined whether the texel is stored in bank zero or bank one. If the texel is stored in bank one, then the routine proceeds to step 278 where the texel address bits S[7:6] equal the inverse of the subtexture ID bits S[1:0] and texel address bits T[7:6] equal the subtexture ID bits T[1:0]. The routine then is complete for such a texel. If the texel is stored in bank zero, then the routine proceeds to step 280 where the texel address bits S[7:6] equal the subtexture ID bits S[1:0] and texel address bits T[7:6] equal the subtexture ID bits T[1:0]. The routine is then complete for such a texel.

H. Texture Data Organization Examples

The following example describes the procedure by which the TIM organizes texture data in accordance with the above-described embodiment of the invention. For a particular application, a primitive A to be rendered may map to a texture A, and a primitive B may map to a texture B. One possibility would be for the TIM to organize texture A into a plurality of blocks of texture data, and then organize texture B into different sub-textures within the same blocks as texture A. The TIM would download the blocks of texture data including textures A and B into the cache memory before rendering primitives A and B.

Alternatively, the TIM can organize texture A into a plurality of blocks of texture data, and then download the blocks including texture A into the cache memory. The TIM could then organize texture B in the main memory within different sub-textures in the same blocks as texture A. In this situation, the TIM would issue a command to halt the operation of the texture mapping chip 46 (FIG. 4), and would download the newly organized blocks of texture data (including textures A and B in the same blocks) to the cache memory of the texture mapping system. As should be understood, if the HALT condition were not implemented and the newly organized data from the main memory were not downloaded into the cache memory of the texture mapping system, false texture mapping data could be accessed during the rendering of primitive B. This is so because when rendering primitive B, a hit would occur in the cache directory because the read cache tag for the block of data including texture B would match the block tag corresponding to the blocks of data in the cache that store texture A. However, the blocks of data in the cache store only texture data relating to texture A, not texture B.

I. Bypass Of Three-Dimensional Primitive Pipeline And Interrupt Scheme For Downloading Texture Maps As discussed above, one feature of the hardware device enables a MIP map for a new texture to be downloaded to the local memory in the texture mapping hardware through a data path that is separate from the pipeline for handling 3-D primitive data. Referring to the illustrative embodiment disclosed in the figures, the texture mapping board 12 (FIG. 4) and the texture mapping chip 46 (FIG. 5) each has separate ports for respectively receiving 3-D primitive data and texture data. The 3-D primitive data is received from the concentrator chip 36 via bus 18, whereas the texture data is received from the 2-D geometry accelerator chip 34 via bus 24. Therefore, when new texture data is downloaded from the host computer 15 by TIM to the texture mapping chip 46, the 3-D primitive pipeline through the front end board 10 and the texture mapping chip 46 need not be flushed, thereby providing increased bandwidth when compared with conventional texture mapping systems which require a flushing of the 3-D primitive pipeline whenever new texture data is downloaded to local memory in the texture mapping hardware.

The separate data path for downloading texture data that bypasses the 3-D primitive pipeline is particularly beneficial in connection with the above-described embodiment, the local memory on the texture mapping board 12 is implemented as a cache. As discussed above, when new texture data is downloaded to the cache, only the portion of the MIP map required is downloaded, rather than the entire series of MIP maps for the texture. Thus, the 3-D pipeline bypass enables cache misses to be handled without flushing the pipeline.

As discussed above, in one embodiment shown in FIG. 4A, portions of the graphics system are duplicated to increase system bandwidth. The texture mapping board 12 is provided with two texture mapping chips 46A and 46B, and two cache memories 48A and 48B. In this embodiment, both cache memories 48 maintain the same texture data at all times, because both the two texture mapping chips typically operate simultaneously on primitives using the same texture data. Therefore, by updating both caches anytime a miss is received from one, this embodiment conserves system bandwidth by ensuring that the same texture data need not be downloaded in separate operations to the two caches.

In the dual texture mapping chip embodiment of FIG. 4A, each cache memory is updated only with texture data downloaded from the host computer, and is not written locally from the texture mapping hardware. Therefore, consistency between the two cache memories is maintained by ensuring that whenever texture data is downloaded from the host computer in response to a miss from one of the caches, both caches are updated with the new texture data. Thus, when a cache miss occurs from one of the texture mapping chips 46 and an interrupt is generated, both texture mapping chips 46 are halted so that both cache memories can be updated with the downloaded texture data. Additionally, the hardware supports simultaneous cache misses from the two texture mapping chips 46 to different cache blocks, and responds by downloading both new blocks of texture data to both caches in response to the misses.

In the illustrative embodiment shown in FIG. 4, the bypassing of the 3-D primitive pipeline is accomplished by employing the 2-D primitive pipeline through the 2-D geometry accelerator chip 34 to download texture data. It should be understood that the data path for downloading texture data to the texture mapping chip 46 can be implemented in a number of alternative ways while still bypassing the 3-D primitive pipeline. For example, a dedicated data path can be provided from the host computer to the texture mapping board.

The host computer may employ an operating system, such as UNIX, that can have multiple processes operating simultaneously, and that provides some scheme for allowing a process to lock certain system resources, such that a process cannot be interrupted when locked. By using the locking scheme, a process that uses certain hardware resources can ensure that the process will not be swapped out until it unlocks those resources.

In one embodiment, two types of locks are provided for use by processes, i.e., fast lock and slow lock. When a fast lock is employed, a process being swapped in checks the appropriate hardware resources to determine whether it was the last process to use those resources. If it was, then the process simply continues without restoring the state of the hardware resources. However, if the process was not the last one to use the resources, then a slow lock is requested, which results in the restoration of the hardware resources to the state they were in when the process was last swapped out. It should be understood that a number alternative techniques can be employed to achieve the same results.

In the embodiment wherein the 2-D primitive pipeline is used to download texture data while rendering 3-D primitives, 2-D and 3-D processes are not operated simultaneously. This restriction is met by ensuring, through the use of the locking scheme provided by the operating system of the host computer, that no 2-D process begins unless the 3-D pipeline is empty, and that no 3-D process begins unless the 2-D pipeline is empty. When a 3-D process begins, it asserts a lock, and when the preceding process was a 2-D process, waits until the 2-D pipeline is empty before beginning. Similarly, when a 2-D process begins it asserts a lock, and when the preceding process was a 3-D process, waits until the 3-D pipeline is empty before beginning.

Some processes perform both 3-D and 2-D operations, and may switch between 3-D primitives and 2-D primitives without giving up the slow lock. Such processes also implement a scheme for ensuring that the 3-D pipeline is empty before downloading 2-D primitive data to the hardware, and similarly ensuring that the 2-D pipeline is empty before downloading 3-D primitive data. To accomplish this result, register status bits may be provided that indicate whether each of the 2-D and 3-D primitive pipelines is empty. Any process that employs both 2-D and 3-D primitive data reads this status register to ensure that the pipelines are empty before switching between 2-D and 3-D primitive data.

It should be understood that although the illustrative embodiment disclosed in the figures includes a local memory on the texture mapping board that is implemented as a cache, the embodiment is not so limited. The texture mapping system can alternatively be implemented so that the local memory on the texture mapping board is not a cache, and other techniques are employed to ensure that each block of texture mapping data needed to render a primitive is downloaded, through a path separate from the 3-D primitive pipeline, before the primitive is rendered, so that the texture mapping data is available from the local memory when the primitive is rendered.

Furthermore, it should be understood that the scheme for generating an interrupt to a host computer to update blocks of data in a local memory can be used with many other applications, and is not limited to use in a texture mapping hardware system. This scheme is useful in any data processing system that includes a host computer with a main memory that stores blocks of data to be processed, and data processing hardware having a local memory that stores blocks of data being processed.

J. Cache Block Replacement Scheme

As discussed above, when a miss occurs for a block of texel data that is not in the cache, the TIM downloads to the cache 48 (FIG. 4) the requested block of texture data. If the cache was full when the miss occurred, then one of the cache blocks is replaced by the newly downloaded block of texture data. In one embodiment of the invention, the software daemon determines which block to replace by considering which blocks were used least recently and which blocks have texture data of low priority. The routine for making the determination is discussed below. The texture mapping chip 46 includes two sets of registers that support the software in determining which cache block to replace. When a cache miss occurs, these registers are read by the TIM through the 3-D bypass data path and used in determining which cache block to replace.

The first set of registers includes two 32-bit most recently used registers MRU0 and MRU1 (collectively MRU), which respectively correspond to banks zero and one of the cache 48. Each bit in these registers corresponds to one of the thirty-two cache blocks contained within its corresponding cache bank. Each time a hit occurs to a block in the cache, the corresponding bit in MRU0 or MRU1 is set so that the most recently used registers accumulate hits for the cache.

The second set of registers includes two 32-bit currently used registers CU0 and CU1 (collectively CU), which also respectively correspond to banks zero and one of the cache. When a bit is set in either CU0 or CU1, it indicates that the corresponding cache block is currently in a mini-directory of the cache and should not be replaced. The cache mini-directory is described in detail below.

K. Disabling Cache Operation

In one embodiment, a capability is provided to disable the cache operation of the local memory 48 on the texture mapping board by disabling cache misses, so that texture data for any 3-D primitive is downloaded into the memory 48 before it is required during rendering of the primitive. Each texture mapping chip 46 includes a status bit indicating that operation of its local memory as a cache is enabled. When this status bit is asserted, cache misses result in an interrupt of the host computer, and a halting of the texture mapping chip. However, when the status bit is deasserted, the local memory 48 on the texture mapping board does not operate as a cache, and the texture data for any primitive is downloaded into the memory 48 before it is needed by the primitive so that misses to the memory do not occur. In one embodiment of the invention, when the operation of the local memory as a cache is disabled, texture data is downloaded by TIM to the local memory on the texture mapping board through the 3-D primitive pipeline to facilitate synchronization of the texture data with the corresponding 3-D primitive data.

L. Texel Port Registers That Support The Scheme For Downloading Texture Data In Response To A Cache Miss As discussed above, the texture mapping chip 46 (FIG. 4) includes a texel port 92 (FIG. 5) that is used to receive texture data downloaded by TIM. The texel port includes a number of registers that support the downloading of texture data. Some of these registers have been discussed above, including registers MRU and CU. The other texel port registers include a command register, a status register, a texel data register, a directory tag register, a cache address register and a pipe tag register, each of which performs functions discussed below.

Access is provided to the texel port registers to allow them to be written through the 3-D primitive pipeline. The texel port registers can be written even when the 3-D pipeline is busy, and the data for writing the registers is simply placed into the pipeline. Furthermore, the texel port registers may also be accessed through the 3-D pipeline bypass provided over 24-bit bus 24 (FIG. 4). When accessing the texel port registers, eight bits of bus 24 are used as a register address to specify which texel port register is to be read or written, and when data is being written to a texel port register, the other sixteen bits of the bus provide the data.

The organizations of the texel port registers are shown in FIG. 20. In one embodiment, each of the texel port registers includes 32-bits, even though a number of the bits in some of the registers is unused.

1. Texel Command Register

The texel command register includes a number of bits used by TIM, discussed in more detail below, that services cache misses. A halt bit 350 is set by TIM and instructs the texture mapping chip to halt its operation. As stated above, in the embodiment wherein two texture mapping chips are provided, both texture mapping chips are updated with the same texture data in response to a cache miss from either so that the caches remain consistent. Thus, when a miss is received from either texture mapping chip, both are halted by setting the halt bit 350 in their respective texel command registers. The halt bit is cleared by the software routine that handles the cache miss by writing to the command register to clear the bit after new texture data has been downloaded from the host computer by TIM in response to the cache miss.

An interrupt enabled bit 352, when asserted, enables interrupts from the texel port when a cache miss occurs. This bit is deasserted to provide the above-described capability of having the local memory 48 on the texture mapping board 12 (FIG. 4) not operate as a cache.

Write Loki0 and write Loki1 bits 354 and 356 are write enables for the texel port registers. Loki is a shorthand name used to identify the texture mapping chip 46. In the embodiment where two such chips are used, the chips are respectively referred to as Loki0 and Loki1. When only a single texture mapping chip is employed, it is identified as Loki0. When a command is received over the texel port bus 24 to write to any of the texel port registers, each texture mapping chip (i.e., Loki0 and Loki1) checks its command register to determine whether its write bit is enabled, and if it is, updates its texel port registers in accordance with the received write command. Thus, by controlling the values of the write Loki0 and write Loki1 bits 354 and 356, TIM can write to the texel port registers in the two texture mapping chips either separately, or in combination.

Loki re ad bit 358 enables reads of the texel port register s of one of the texture mapping chips. When a command is received over the texel bus 24 to read a texel port register, only one of the texture mapping chips responds at a time to provide the contents of its texel port register onto the bus. In the embodiment where in two texture mapping chips are provided, each may be provided with a pin that is hardwired to indicate whether the chip is Loki0 or Loki1. When the Loki read bit is set by software, it indicates that reads are enabled from Loki1, and when the read bit is deasserted, it indicates that reads are enabled for Loki0. It should be appreciated from the foregoing that the format of the texel command register allows it to be written to both texture mapping chips (Loki0 and Loki1) simultaneously with the same data, thereby requiring only a single write cycle to write both command registers.

2. Texel Status Register

The texel port status register includes a dual Loki bit 360 which, when asserted, indicates that the system includes two texture mapping chips. An interrupt enabled bit 362 is asserted whenever bit 352 is asserted in the command register, and indicates that the local memory in the texture mapping chip is operating as a cache that will generate misses that interrupt the host computer when texture data is needed that is not in the cache. This bit is included in the status register as well as the command register so that the status of the texel port can be read by simply reading t he status register.

An interrupt valid bit 364 is asserted when an interrupt has occurred from the texture mapping chip and the chip is waiting for new texture data to be downloaded. This bit is cleared when the cache directory tag register (discussed below) is written with a cache tag that matches the cache read tag stored in the pipe tag register (discussed below) which is the tag that missed in the cache.

The status register includes two bits that support the halting of the texture mapping chip when a cache miss occurs. Halt enabled bit 368 is set and cleared by TIM whenever the halt bit 350 is respecting set and cleared in the command register, and instructs the texture mapping chip to halt itself when the bit is asserted. This bit is provided in the status register as well as the command register so that the status of the texture mapping chip is stored in a single register. Interrupt valid 368 is set by hardware in the texture mapping chip when a cache miss has occurred and the cache directory is waiting for data to be downloaded. This bit is cleared when the cache directory tag register (discussed below) is written with a cache tag that matches the block address that missed in the cache.

3. Pipe Tag Register

The pipe tag register stores the last block tag that was indexed by the pipeline in the texture mapping chip. When a cache miss occurs, the pipe tag register stores the block tag 370 that missed in the cache. Thus, by reading the pipe tag register over the texel port bus 24, the software responding to the cache miss interrupt can determine the tag for the cache block that should be downloaded to the cache in response to the miss.

4. Texel Data Register

The texel data register is used to download texture data to the cache 48 when a cache miss occurs. As stated above, each texel is represented by thirty-two bits of data, with one byte 372 representing alpha, one byte 374 representing the red value, one byte 376 representing the green value and one byte 378 representing the blue value.

5. Texel Cache Address Register

The texel cache address register is used to write texel data to the cache and block tags to the cache directory. As discussed above, the cache stores sixty-four blocks of texture data, with each block including an array of 256×256 texels. The texel cache address register includes a 6-bit block index field 380 that identifies the particular one of the sixty-four blocks in the cache to be read or written. In addition, the register includes a 16-bit block address field 382 that identifies the particular texel address being read or written within the block identified in the block index field. When data is downloaded to the texture memory in response to a cache miss, the block index will be set by the software routine using the replacement scheme discussed below, and the block address field 382 will be initialized to zeros to write the first texel in the block. The cache address register automatically increments the block address field 382 whenever the texel data register is accessed. Thus, the block address field can be incremented through all of the block addresses within the cache block to write the new block of texel data into the cache.

6. Texel Directory Tag Register

The texel directory tag register includes a 23-bit block tag field 384 that represents the cache block tag, and is used to write the cache directory entry defined by the block index field 380 in the cache address register. As discussed above, the twenty-three bits of the cache block tag represent eight bits of texture ID, seven bits of S coordinates, seven bits of T coordinates, and an additional bit that identifies the map number in the series of MIP maps of the map represented by the block of texture data corresponding to the block tag. When a new block of texture data is downloaded by TIM in response to a cache miss, its block tag is loaded into the directory tag register over the texel bus 24. From the directory tag register, the block tag is written into the cache directory in the entry identified by the block index field 380 of the cache address register. As stated above, when a block tag is written into the directory tag register that matches the tag in the pipe tag register (which is the one whose read resulted in a cache miss) the cache miss interrupt is cleared.

M. Software Routine For Servicing Cache Miss Interrupts

Figure 21:
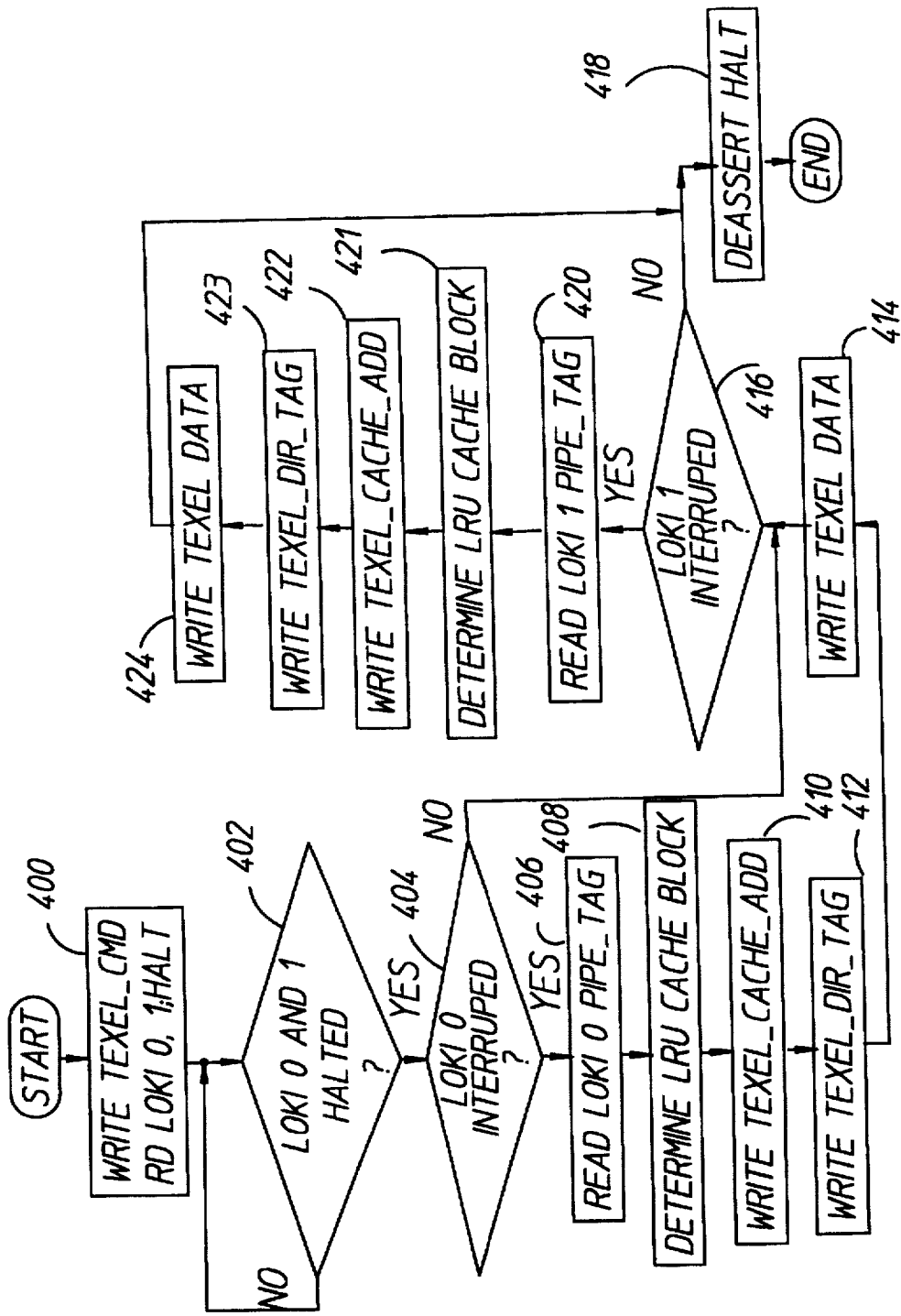
FIG. 21 is a flow chart illustrating a software routine implemented by the processor of the host computer for processing an interrupt and determining which block of data to download.

As should be appreciated from the foregoing, the texel port registers are used by a TIM, operating on the host computer 15, that services cache miss interrupts to download the necessary texture data. A flowchart of this TIM operation is shown in FIG. 21. In step 400, the texel command register for both Loki0 and Loki1 is written to set the halt bit 350 in both. The method then proceeds to step 402 to read the halted bit 368 in the texel status registers to determine whether both Lokis have halted. The method continually reads the status registers of Loki0 and Loki1 until it is determined that both have halted, and then proceeds to step 404. When the system includes only a single texture mapping chip 46 (i.e., Loki0), Loki0 also responds to requests to read the texel port registers of Loki1 by providing the contents of its registers on the texel bus 24. Thus, when the TIM checks in step 402 to determine whether both Lokis have halted, Loki0 responds to reads of Loki1, such that when Loki0 has halted, the method will proceed to step 404.

In step 404, interrupt valid bit 364 in the texel status register of Loki0 is read to determine whether Loki0 has interrupted to cause the cache miss, and when it has, the method proceeds to step 406 wherein the pipe tag register of Loki0 is read to identify the block tag of the block of texture data that missed in the cache. The TIM uses this block tag to access the corresponding block of texture data in the memory 17 (FIG. 4), and proceeds to step 408 to determine which block in the cache should be replaced with the new cache block to be downloaded. This determination is made using the lowest priority and least recently used scheme of the invention, as described below.

As stated above, when the system includes two texture mapping chips, the caches in each are maintained to have identical entries. Therefore, texture data downloaded from the host computer in response to a cache miss from one of the texture mapping chips is written to the caches in both chips. Thus, once the cache block to be replaced has been identified, the method proceeds to step 410 wherein the cache address register in Loki0 and Loki1 (if Loki1 exists) is written with the block index determined during step 408. In step 412, the directory tag register is written with the block tag of the block of texture data to be downloaded to the texture cache in response to the cache miss, and in step 414, the texture data is written to the texel data register. In this manner, the method responds to the cache miss by downloading the block of texture data missed in the cache and writing this block of data to the cache.

After the block of texture data is downloaded to Loki0 and Loki1 in steps 406–414, or if it is determined at step 404 that Loki0 did not interrupt, the method proceeds to step 416 wherein a determination is made as to whether the interrupt valid bit 364 in the Loki1 status register has been set, indicating that a cache miss occurred in Loki1. As discussed above, if the system includes only a single texture mapping chip, Loki0 responds to reads of the Loki1 texel port registers. When Loki0 responds to a read of the status register of Loki1, it masks its interrupt valid bit 364 so that the TIM will determine at step 416 that Loki1 did not interrupt. This masking is done so that the TIM will not re-process the interrupt from Loki0 by again downloading the block of texture data that was downloaded in steps 406–414. Therefore, in a system wherein only a single texture mapping chip is provided, the method will determine at step 416 that Loki1 did not interrupt, and will proceed to step 418 wherein the command register in Loki0 will be written to deassert the halt bit 350, enabling the texture mapping chip to proceed with processing the primitives in its pipeline.

When the system includes two texture mapping chips, the method will determine at step 416 whether Loki1 has interrupted, and if it has not, will also proceed directly to step 418 wherein the halt bit will be deasserted in both texture mapping chips, allowing them to proceed with processing primitives. However, when it is determined at step 416 that Loki1 has interrupted in response to a cache miss, the method proceeds through steps 420–424 to process the interrupt in the same manner as was discussed in connection with steps 406–414 for handling the interrupt from Loki0. The method then proceeds to step 418 wherein the halt bits in both texture mapping chips are deasserted.

It should be understood that in a system wherein two texture mapping chips are provided, both chips can generate a cache miss interrupt simultaneously for the same block tag, or for different block tags. When both texture mapping chips generate cache miss interrupts for the same block tag, the interrupt will be processed in steps 400–414. Therefore, in step 416, the method will not detect an interrupt from Loki1, because the interrupt from Loki1 will be cleared by the writing of the missed block tag to the directory tag register of both Lokis in step 412. Thus, the method shown in FIG. 21 is capable of responding to an interrupt from either texture mapping chip individually, or from both simultaneously.

N. Cache Mini-Directory and Main Directory

As stated above, in one embodiment, the cache includes sixty-four blocks of 256×256 texels of data, and a fully associative cache directory that includes sixty-four entries of 23-bit block tags. When the device is operating in trilinear interpolation mode, eight texel reads are performed to determine the resultant texel data for a pixel, with four texels in one map being simultaneously read in one read operation, and four texels in the other map being read simultaneously in a second read operation. If the pixel being operated upon maps to a location in a map that is adjacent to a cache block boundary, the four texels read from the cache to generate the resulting texel data within one map can each be in a different cache block. Thus, the simultaneous reading of four texels from the cache for each pixel could require four separate comparisons with the sixty-four block tag entries in the cache directory.

Conventional fully associative caches operate in one of two ways. First, some provide separate hardware comparators for each cache tag entry so that a read tag can be compared with every cache tag entry in a single cycle. Such a technique would incur a large hardware cost wherein four reads are done simultaneously, and would require two hundred fifty-six (i.e., 4×64) 23-bit comparators. A second technique employed by conventional fully associative caches uses a single cache tag comparator, and each cache entry is compared serially with the read tag. Such a technique would negatively impact system bandwidth, wherein potentially two hundred fifty-six read cycles would be required of the cache directory to determine whether each of the four texels read during a single read operation were present in the cache.

Figure 22:
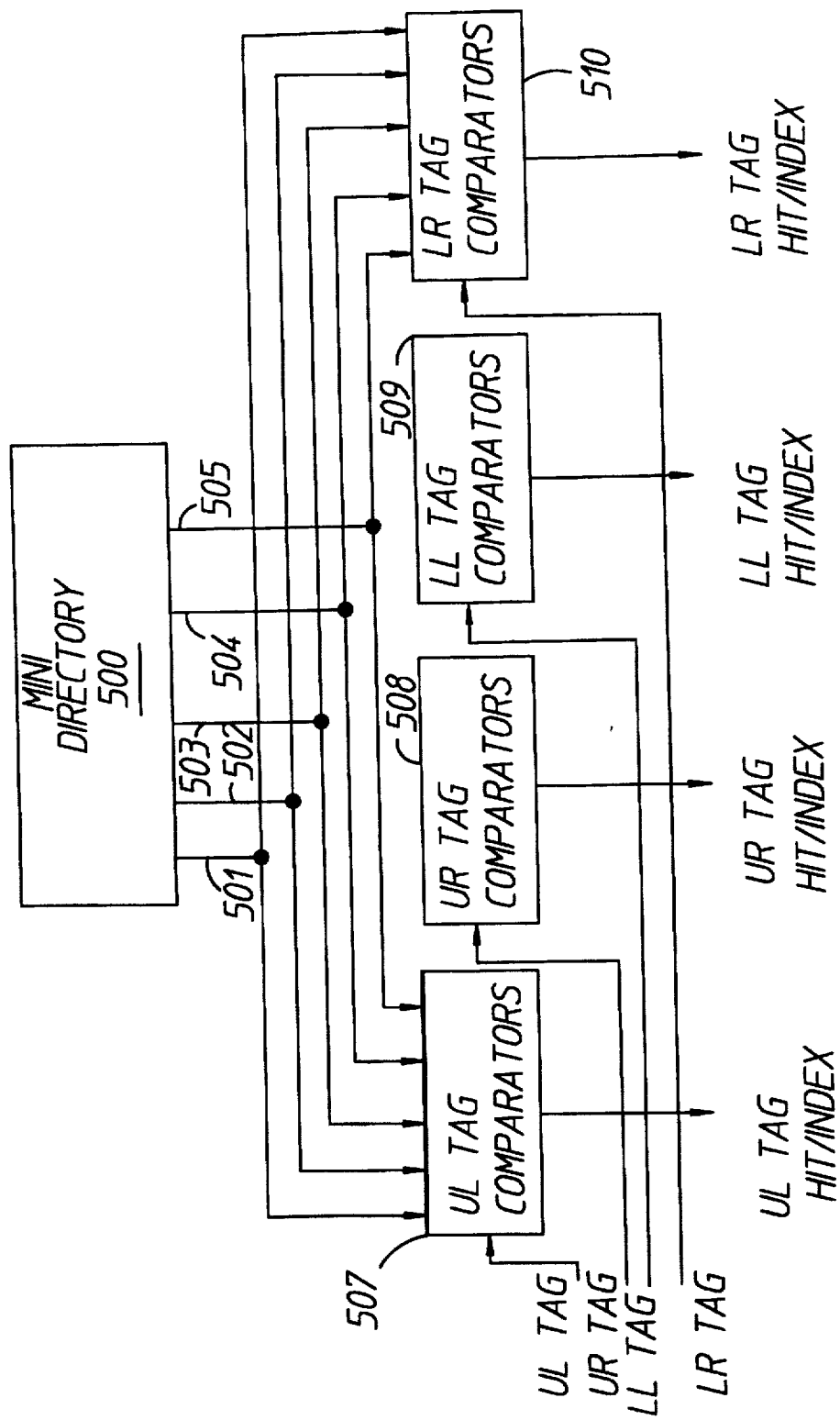
FIG. 22 is a block diagram of the cache mini-directory.
Figure 23:
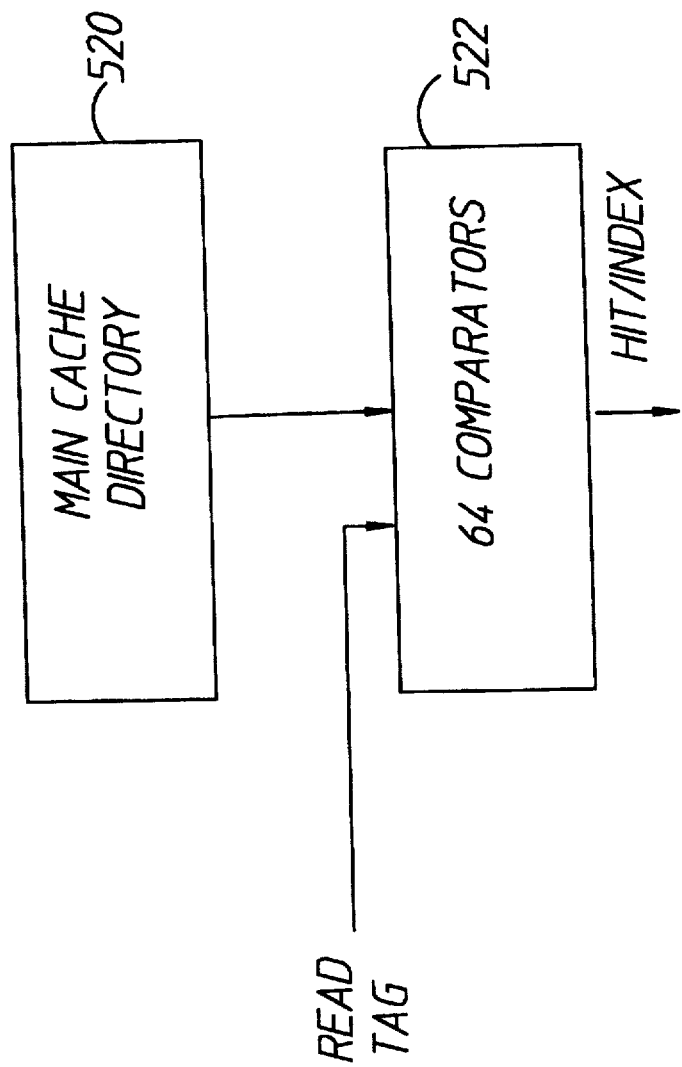
FIG. 23 is a block diagram of the cache main directory.

To overcome these problems, the cache system includes both a mini-directory (FIG. 22) and a main directory (FIG. 23). The mini-directory is fully associative and includes the five most recently read cache block tags, as well as a corresponding block index for each. As shown in FIG. 22, the mini-directory 500 includes five entries that are respectively output from the mini-directory over outputs 501–505, each of which is coupled to four groups of tag comparators 507–510. Each group of tag comparators 507–510 includes five 23-bit comparators (not shown), and corresponds to one of the four cache read tags performed in a single read operation when performing bilinear or trilinear interpolation. Thus, the fully associative nature of the mini-directory is implemented with twenty 23-bit comparators, equal to the number of tags simultaneously read, multiplied by the number of entries in the mini-directory.

The four cache read tags read simultaneously for a pixel identify the cache blocks that include the four texels that are closest to the location in the map that the pixel maps to, and are referred to as an upper left (UL) tag, an upper right (UR) tag, a lower left (LL) tag and a lower right (LR) tag. The cache read tags for the upper left, upper right, lower left and lower right texels are respectively connected to groups of upper left, upper right, lower left and lower right tag comparators 507–510. Each group of tag comparators 507–510 compares its corresponding cache read tag against the five block tags stored in the mini directory, and produces a hit output indicating whether the tag matches one of the mini-directory entries, and when it does, also outputs a block index indicating the location in the cache wherein the corresponding block of texel data is stored.

As should be appreciated from the foregoing, if each of the four cache read tags (UL, UR, LL, LR) is in the mini-directory, only a single directory access is required to determine the block indexes identifying the locations in the cache wherein the corresponding four blocks of texel data are stored. Access is made to the main cache directory only if one or more of the read tags is not in the mini-directory. The mini-directory 500 is updated each time a cache read tag misses in the mini-directory, so that at all times the mini-directory 500 includes the block tags of the five most recently accessed blocks of texture data.

If one or more of the four cache read tags does not hit in the mini-directory, access is made to the main cache directory 520 (FIG. 23). As stated above, the main directory includes sixty-four entries, each including a block tag. The main directory is provided with sixty-four 23-bit comparators 522 so that a cache read tag can be compared with the entire main directory in a single cycle. The comparators 522 provide a signal indicating whether the cache read tag has hit one of the entries in the main directory, and when it has, the location of the comparator that matched the read tag is also used to generate a block index identifying where the corresponding block of texel data resides in the cache. If the read tag does not match any of the entries in the main cache directory, a cache miss is generated, causing the host computer to be interrupted to download the requested block of texture data in the manner described above.

Figure 24:
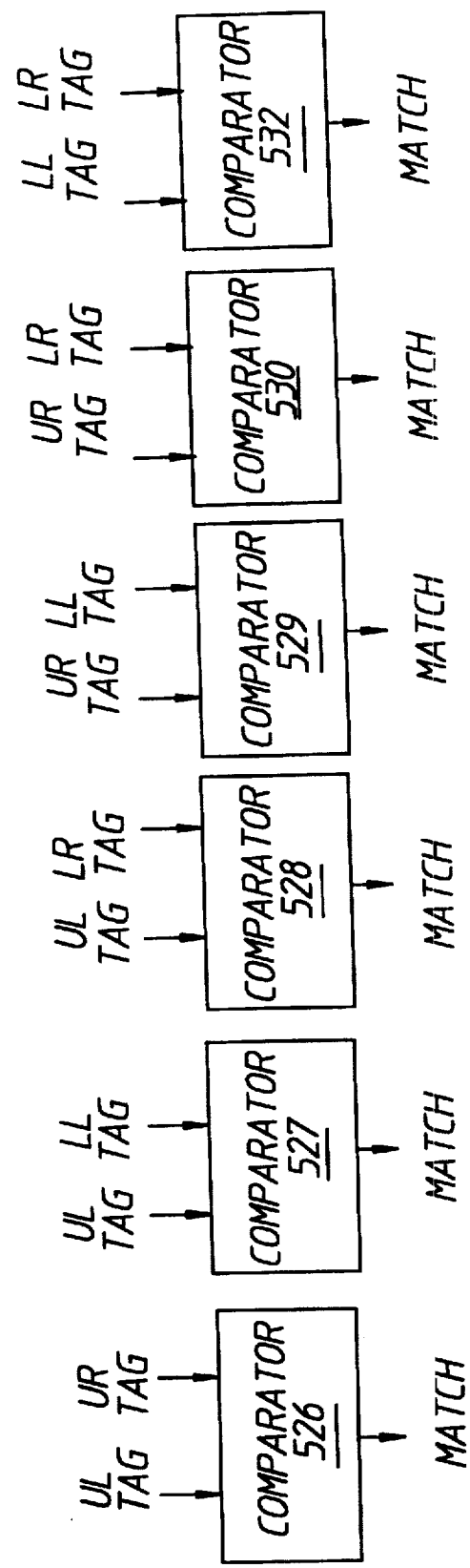
FIG. 24 is a block diagram of a series of comparators provided to reduce performance penalties when a cache read tag misses the mini-directory.

As stated above, the main cache directory 520 is only accessed when one or more of the four cache read tags (UL, UR, LL, LR) does not hit the mini-directory. If two or more of the cache read tags miss the mini-directory, it is desirable to reduce the performance penalty that would be incurred if the main directory needed to be accessed in separate cycles for each cache read tag. To achieve this result, a group of six additional comparators 526–530 is provided in one embodiment, as shown in FIG. 24. The six comparators compare each of the four cache read tags that are accessed simultaneously against the others to determine whether any are identical. The comparators include comparator 526 that compares the UL tag against the UR tag, comparator 527 that compares the UL and LL tags, comparator 528 that compares the UL and LR tags, comparator 529 that compares the UR and LL tags, comparator 530 that compares the UR and LR tags, and comparator 532 that compares the LL and LR tags.

The comparisons performed by comparators 526–532 can be performed in parallel with other comparisons so as to not incur any performance penalty. For example, these comparisons can be performed during the cycle when the cache read tags are compared to the mini-directory, or during the cycle when a first cache read tag that missed in the mini-directory is compared to the main directory. When it is determined that at least two cache read tags do not hit the main directory and are equal, the outputs of comparators 526–532 are used to indicate that the main directory need only be accessed once for these at least two cache read tags. In this manner, multiple cycles need not be incurred in accessing the main directory for tags that are identical, thereby minimizing the impact on system bandwidth when two or more cache read tags miss the mini-directory.

As should be appreciated from the foregoing, the embodiment that utilizes the cache mini-directory effectively balances the competing goals of employing a relatively small amount of hardware to implement the cache directory, while achieving high system bandwidth. The performance penalties incurred when two or more cache read tags miss the mini-directory are application dependent. Although it is possible that two unique sets of four cache read tags may be processed through the mini-directory every two cycles, it is believed that typically only one or two unique block tags will appear in each set of four cache read tags. As discussed above, when pixels of an object are being rendered and trilinear interpolation is employed, adjacent pixels will frequently map to the same two maps for the MIP map, requiring that reads to the cache continuously switch between the cache blocks that store the two maps. In the illustrative embodiment shown in FIG. 22, the mini-directory stores five block tags to ensure that even if four unique cache tags for a currently processed set of read tags is resident in the mini-cache, at least one tag accessed in the previous set of read tags will remain in the mini-directory. Thus, even when switching between two sets of four unique cache tags during trilinear interpolation, at least one of the read cache tags for each set will remain in the mini-directory so that four cache tags will not need to be compared against the main directory in a serial fashion.

During rendering of texels when trilinear interpolation is employed, consecutive reads to the cache will read a first set of four texels in one map, and a second set of four texels in another. As a primitive is rendered, adjacent texels within each of two maps will each be accessed every other cycle, and two or more of the texels will generally be located within a single cache block. Therefore, if only one or two unique tags appear in each set of four cache read tags, a large number of pixels can be rendered with each cache read tag hitting the mini-directory 500. If only one cache read tag in each set of four misses the mini-directory, no performance penalty is incurred because that tag can be compared against the main directory while the next set of four read tags is being compared to the mini-directory.

It should be understood that the cache directory, which includes both a main directory and a smaller mini-directory, can be used with many other applications, and is not limited to use in a texture mapping hardware system. The mini-cache directory scheme is particularly useful in implementing a fully associative cache and reducing the cost of directory tag comparisons when multiple cache tag reads are processed simultaneously, and when cache read tags are correlated to consecutively accessed previously used tags. For example, for a cache memory that stores X tags at any one time, and wherein N cache read tags are compared against the directory block tags simultaneously, it is sufficient to maintain a mini-directory including M tags, wherein M is greater than or equal to N. Each of the M mini-directory tags is compared against the N cache read tags in a single read operation. The main directory is accessed serially for any cache read tag that does not hit in the mini-directory. Such read tags are compared against the main directory tags in a single cycle. The hardware savings in terms of comparators from a system wherein each of the X tags in the main directory is compared against the N read tags in a single read operation is dependent on the ratio of $(X+M*N)/(X*N)$.

The performance penalty incurred to achieve this hardware savings is application dependent, based on the behavior of the sequence of tags accessed in consecutive read operations. If no more than one tag in each read set misses the mini-directory, no penalty is incurred as the missed tag can be compared against the main directory in parallel with the next set of read tags being compared against the mini-directory.

With respect to the above-described comparators 526–530 that are used to reduce performance penalties when two or more cache read tags miss in mini-directory, six are used because four read tags are accessed simultaneously. The number of comparators employed to compare each cache read tag against the others is dependent upon the number N of read tags accessed simultaneously, and is equal to (N−1) factorial.

Figure 25:
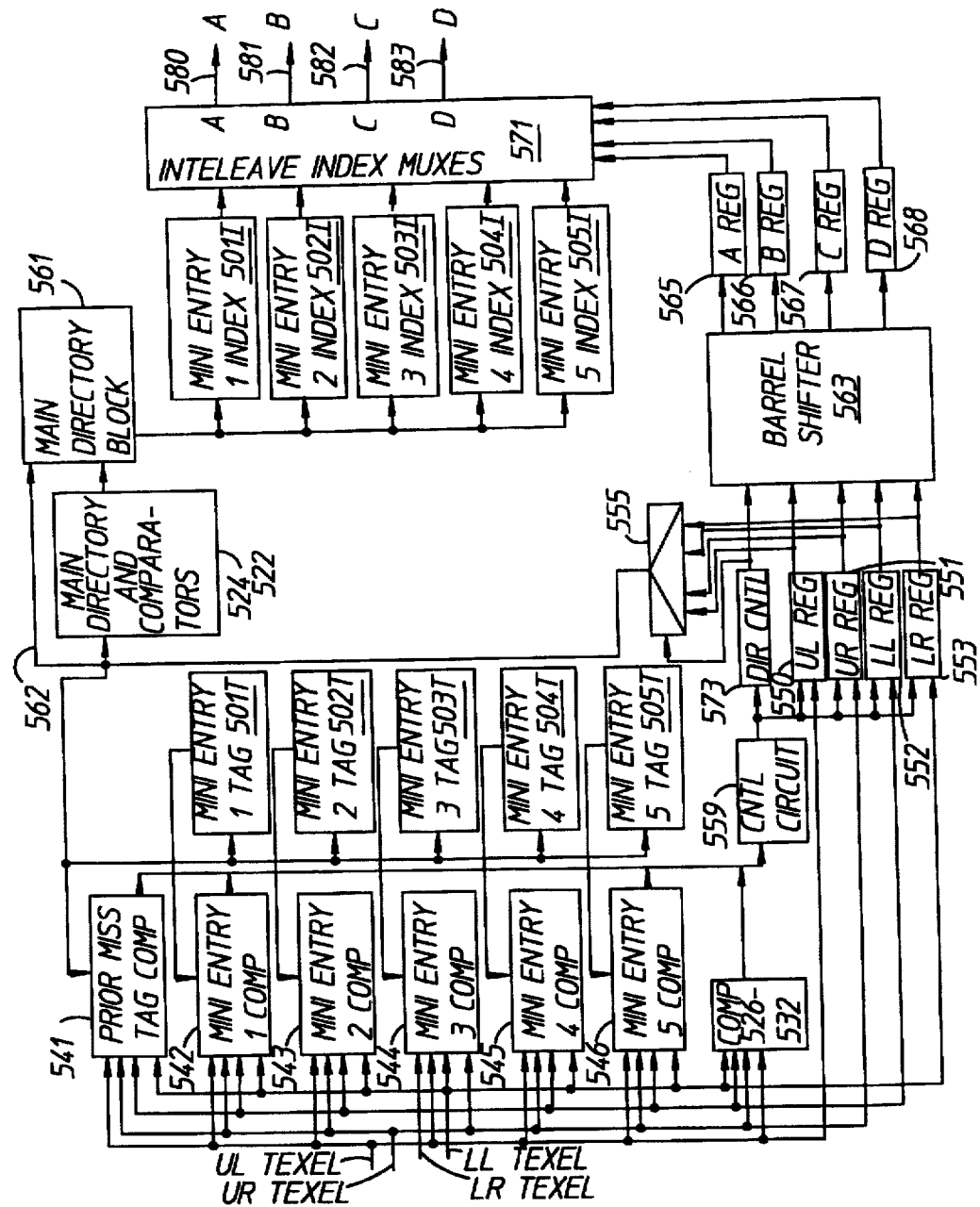
FIG. 25 is a block diagram of an illustrative implementation of the cache directory

One illustrative implementation of a cache directory that includes the mini-directory and the main directly of FIGS. 22–23 is shown in FIG. 25. It should be understood that the implementation shown in FIG. 25 is provided merely for illustrative purposes, and that other implementations can also be employed.

The mini-directory entries 501–505 (FIG. 22) are split into a tag component stored in tag registers 501T–505T, and an index component stored in index registers 501I–505I. As discussed above, the cache directory receives a set of four read cache tags that correspond to the four texels (i.e., UL, UR, LL and LR that are closest to the location in a MIP map that a pixel being operated upon maps to. Each of the four read tags is provided to six tag comparators 541–546. Five of the comparators (i.e., 542–546) are each also respectively coupled to one of the five mini-directory tag registers 501T–505T. For example, comparator 542 is coupled to the tag register 501T for mini-directory Entry1, and produces an output that indicates whether the tag in that entry of the mini-directory matches the tag of any of the read cache tags UL, UR, LL or LR. The comparators 543–546 operate in a similar manner, and respectively compare the read cache tags UL, UR, LL and LR against the tag registers 502T–505T that respectively store the tags for mini-directory Entry2–Entry5. Each new set of four read cache tags is compared against the mini-directory in a single cycle. At the end of that cycle, the four tags UL, UR, LL and LR are respectively stored in registers 550–553. As shown in FIG. 25, each of registers 550–553 is also coupled to a control circuit 559 that receives the outputs of the mini-directory tag comparators 542–546. At the end of the cycle wherein a new set of four read tags is compared against the mini-directory tags, each of isters 550–553 is also loaded with data identifying whether its corresponding tag (i.e., UL, UR, LL, LR) matched one of the mini-directory entries, and if so, which entry was matched.

As discussed above, if only a single cache read tag misses in the mini-directory, that tag is compared against the main directory while a next set of four texel read tags is compared against the mini-directory. When a miss occurs in the mini-directory, the mini-directory is updated to include the tag that missed so that the mini-directory always reflects the five most recently accessed cache tags. During the cycle wherein a read cache tag that missed in the mini-directory is compared against the main directory while a next set of four read tags is compared against the mini-directory, the mini-directory tag registers 501T–505T have not yet been updated to include the cache tag that missed the mini-directory in the previous cycle. Therefore, when the next set of read cache tags is compared against the mini-directory, a sixth comparator 541 is used to compare the four read tags (UL, UR, LL and LR) against the tag that missed in the mini-directory in the previous cycle and is being compared against the main directory.

If more than one unique tag in the set of four cache read tags (UL, UR, LL and LR) misses the mini-directory, the pipeline through the cache directory is halted because multiple comparisons will occur with the main directory. However, if only one unique tag misses the mini-directory, the pipeline continues in the following manner so that the cache directory receives a new set of four cache read tags each cycle.

As stated above, the read tags that were compared against the mini-directory in the previous cycle are stored in registers 550–553. The outputs of these registers are coupled to a four-to-one multiplexer 555, which selects one of those registers at a time to be compared against the main directory, and to be loaded into the mini-directory at the end of the cycle so that the mini-directory is updated with the most recently received read cache tags. The output of multiplexer 555 is also coupled to the sixth comparator 541, so that the cache read tag that missed the mini-directory in the preceding cycle is compared against each of the new set of read tags UL, UR, LL and LR. In combination with the comparators 542–546, comparator 541 ensures that mini-directory compares each set of four cache read tags received by the cache directory against the five most recently received read tags.

As stated above, the cache read tag output from the multiplexer 555 is also loaded into one of the mini-directory tag registers 501T–505T at the end of the cycle wherein it is compared against the main directory. Thus, the mini-directory is updated to include the most recently accessed cache tags. The determination of which entry is written with the new cache tag from multiplexer 555 is made by a replacement scheme discussed below.

The set of six comparators 526–532 discussed above in connection with FIG. 24 is shown as a single comparator block in FIG. 25 for convenience. The outputs of these comparators, as well as the outputs of comparators 541–546, each is provided to control circuit 559, which performs several functions. When a miss to the mini-directory occurs, the control circuit 559 determines which entry in the mini-directory is to be replaced with the new read cache tag. The control circuit 559 does not replace any entry that was hit by one of the four newly received read cache tags being compared against the mini-directory, or the last read cache tag compared against the main directory, and assigns these entries a highest priority for being maintained in the mini-directory. In addition, the control circuit 559 stores state information regarding which mini-directory entries where hit by the preceding set of four read tags, and assigns them the next highest priority for being maintained in the mini-directory. The remaining entries are assigned a lower priority.

The control circuit 559 selects an entry for replacement that is in the lowest priority group that includes at least one entry. Thus, if there is at least one entry in the lower priority group that was not hit by one of the four newly received read cache tags being compared against the mini-directory, was not the last read cache tag compared against the main directory, and was not in the preceding set of four read tags, one of the entries in the lower priority group is selected for replacement. However, if there are no entries in the lower priority group, a larger group of entries is selected that excludes only the highest priority entries (i.e., those hit by one of the four newly received read cache tags and the last read cache tag compared against the main directory), and an entry from that group is selected for replacement.

Once the group of lowest priority available mini-directory entries is identified, a determination of which entry in the group should be replaced in accordance with a replacement scheme that cycles through each of the five mini-directory entries each time one is replaced. This can be done in a number of ways. In one embodiment, the five mini-directory entries are labeled one through five. The entry to be replaced is selected from the lowest priority group by first identifying the highest number entry that is not in the group, and then selecting for replacement the next highest number entry that is in the group. When entry five is not in the group, the scheme wraps around so that entry one is treated as the next highest number entry. Through this replacement scheme, the control circuit 559 cycles through the mini-directory entries each time one must be replaced, and controls the loading of the selected mini-directory tag register 501T–505T.

The control circuit 559 also decodes the outputs of comparators 541–546 to generate data for each of the four read tags (UL, UR, LL and LR) indicating whether the read tag matched an entry in the mini-directory, and if so, which entry was matched. This data is stored in the corresponding registers 550–553 for each of the read tags UL, UR, LL and LR. For example, if the read tag UL matched mini-directory Entry3, the data decoded by the control circuit 559 would be stored in the UL register 550 to indicate that read tag matched mini-directory Entry3. As discussed below, that data is passed through the cache directory pipeline and indicates that the block index for the UL texel is stored in register 5031, which holds the block index for mini-directory Entry3.

When only one unique tag for the set of read tags UL, UR, LL and LR misses the mini-directory, each of the registers 550–553 that stores that read tag is loaded with data indicating that the block index for the corresponding texture data is not in the mini-directory. During the next cycle, the output of one of registers 550–553 that stores the missed tag is compared against the main directory 520, and the block index for the read tag is loaded from the main directory into a register 561 that stores the main directory block index. The data indicating that the block index does not correspond to any entry in the mini-directory is also stored in the register 561 from input 562 that is provided from the output of multiplexer 555.

As described above, the cache memory includes four interleaves A–D so that four texels can be accessed simultaneously. The set of four texel read tags UL, UR, LL and LR can correspond in any manner to interleaves A–D. The data stored in registers 550–553 that identifies which mini-directory entry stores the block index corresponding to each of texels UL, UR, LL and LR is passed through a barrel shifter 563, which is controlled to correlate each of texels UL, UR, LL and LR to its corresponding interleave A–D. The outputs of the barrel shifter are loaded into interleave index control registers 565–568, which respectively correspond to interleaves A–D, and which each identifies the mini-directory entry, if any, stores the block index for the interleave. When only a single unique read cache tag misses the mini-directory, the shifting of the outputs from registers 550–553 and the loading of registers 565–568 occurs in parallel with the access to the main directory 520.

As stated above, the data loaded into registers 565–568 identifies which, if any, mini-directory entry stores the block index for the corresponding interleave. This data is used to control a plurality of interleave index multiplexers, identified at 571, that select the corresponding block index for each interleave from one of mini-directory index registers 501I–505I and main directory block index register 561. The plurality of interleave index multiplexers 571 represents four independent six-to-one multiplexers. One multiplexer corresponds to each interleave and selects between the five mini-directory index registers 501I–505I and the main directory block index register 561. Each interleave index multiplexer is controlled by the one of registers 565–568 that corresponds to the same interleave and identifies which mini-directory entry stores the block index for the interleave. When this data indicates that the block index for an interleave is not found in any mini-directory entry, the corresponding multiplexer selects the index provided from the main directory block index register 561, which stores a block index read from the main directory following a miss to the mini-directory. The block index for each of interleaves A–D is provided over lines 580–583 and is used to address the cache SDRAMs in the manner described above.

As discussed above, when more than one of the set of read cache tags UL, UR, LL and LR misses the mini-directory but includes only a single unique cache tag, the main directory 520 is only accessed once to provide the block index for that read tag. This process is also controlled by control circuit 559, which uses the outputs of comparators 526–532 to identify whether any two of the four read tags match. If two or more of the set of four read tags miss the mini-directory but include the same cache tag, each of the corresponding registers 550–553 is set by control circuit 559 to indicate that the block index is not included in any mini-directory entry. Thus, when the data corresponding to those read tags is passed into interleave index registers 565–568, each will select the main directory block index control register 561 to be passed through its corresponding interleave index multiplexer 571.

The control circuit 559 also sets a directory control register 573 that controls which of read tag registers 550–553 is to be compared against the main directory. The register 573 controls the multiplexer 555 to select one of the registers 550–553 to be compared against the main directory at a time. If more than one of the read tags UL, UR, LL, LR misses the mini-directory but share a common tag, the control register 573 is set to indicate that only one of the registers should be compared against the main directory. In this manner, the main directory is accessed only once when the set of four read cache tags includes only a single unique tag that misses the mini-directory.

2. If the set of four read cache tags (UL, UR, LL, LR) includes more than one unique tag that misses the mini-directory, the above-described flow through the cache directory pipeline is altered, and the cache directory becomes busy and does not receive 3. a new set of read tags in the next cycle. The directory indicates that it is busy so that each of the registers 550–553 that includes a read tag that missed the mini-directory can be compared against the main directory and will not be overwritten with a new read tag. Furthermore, the flow through the directory pipeline is altered so that the main directory can be accessed for each read tag that missed the mini-directory, and the block index that corresponds to those can be loaded from the main directory into one of registers 501I–505I or 561. The pipeline is arranged to inhibit the data in any of registers 550–553 from being passed through the barrel shifter 563 until all of the block indexes for the set of read tags (UL, UR, LL, LR) have either been read from the main directory or are already present in the mini-directory. Thus, the set of texels UL, UR, LL and LR are correlated to their corresponding interleaves as a group.

When more than one unique tag in a set of read tags misses the mini-directory, the missed tags are processed serially. During the first cycle (i.e., when the set of tags is compared against the mini-directory), the control circuit 559 determines which entry in the mini-directory is to be replaced by a first missed read tag, and the corresponding register 550–553 is loaded with data indicating that its block index will be stored in that mini-directory entry. When the output of the register 550–553 that stores the first processed miss tag is compared against the main directory 520 during a second cycle, the main directory block index register 561 is updated with the data indicating which mini-directory index register 501I–505I is to be replaced. During a third cycle the corresponding block index is loaded from the register 561 into the register 501I–505I that corresponds to the mini-directory entry selected for replacement.

Each of the subsequently processed unique tags that missed the mini-directory is handled in the same manner until the last miss tag to be processed, which can be a second miss tag if only two unique tags missed the mini-directory, or can be a third or fourth miss tag. The last miss tag processed through the cache directory is handled as if it were the sole unique tag in the set of read tags to miss the mini-directory. When processing of the last miss tag begins, the directory deasserts the signal indicating that it is busy so that it can receive a new set of read tags.

For the last processed miss tag, the control circuit 559 loads its corresponding register 550–553 with data indicating that the block index for the tag is not stored in any mini-directory entry. This can be done during the first cycle wherein all the read tags are compared against the mini-directory, or in parallel with the processing of the other miss tags. During the cycle wherein the last miss tag is compared against the main directory, the data in registers 550–553 is passed through the barrel shifter 563 and loaded into interleave control registers 565–568, and the block index for the miss tag is loaded from the main directory into the main directory block index register 561. Finally, in the last pipeline stage of the directory, the outputs of the interleave index control registers 565–568 are used to control their corresponding interleave index multiplexers 571, so that the index for the last processed miss tag is provided from the main directory block index register 561, and the block index for each of the other read tags in the set is provided from its corresponding mini-directory index register 501I–505I. It should be understood that by accessing the block index for the last processed miss tag from the main directory block index register 561, a cycle is saved by not waiting for the block index for this tag to be loaded into its mini-directory index register.

III. TIM Software Daemon of the Present Invention

A. Overall Operation

Figure 26:
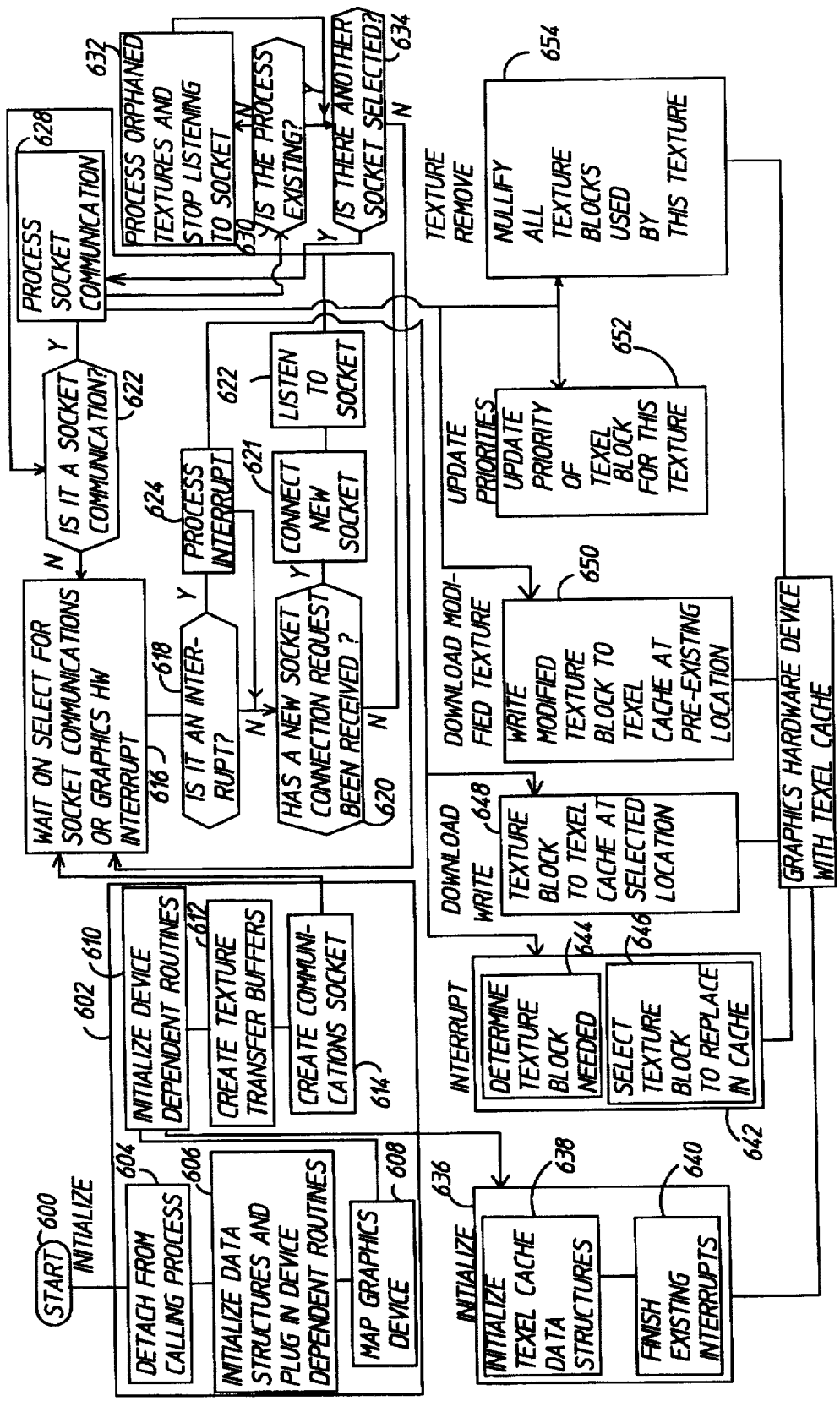
FIG. 26 is a flow diagram of the overall operation of the texture interrupt manager (TIM) software daemon of the present invention.

FIG. 26 is a flow chart illustrating the operation of the TIM software daemon of the present invention. Shown in the upper portion of the flow diagram are the steps of the device independent operation of TIM and shown in the lower portion of the flow diagram are the steps of the device dependent operation of TIM. Also shown, connected to the device dependent routines of TIM, is a graphics hardware device 660 that renders texture mapped images requested by a user of high level processes (described above). The graphics hardware device 660 could be any number of graphics hardware devices. For simplicity of illustration, it is assumed that the graphics hardware device includes a local cache memory that stores blocks of texture data and for which interrupts are processed. The hardware device may be identical or similar to that described above.

Operation begins in the device independent portion of TIM at step 600. The operation begins for the very first time when a first command to create a context is generated in one of the hardware drivers in response to a user command within the associated process. At that point, the routine proceeds to step 602 where all routines and data structures within TIM are initialized. The initializing step 602 includes step 604 in which TIM detaches from the particular process that called it so that it can run independently from that process as a daemon. In other words, the process within which the user created an image to be rendered calls TIM through the corresponding graphics API and graphics hardware driver and then, during initialization, TIM detaches from that calling process.

TIM then, in step 604, begins operation independently from that process. Operation proceeds to step 606 where TIM both initializes its data structures and in its device dependent routines so that they later can be called to operate from device independent routines. TIM includes a number of data structures that store data which TIM accesses during operation. These data structures are initialized during step 606. In other words, the memory locations in the system software memory allocated for such data structures are provided with some initial values such as binary zero.

The data structures include a texture memory data structure which is a device independent data structure of TIM that maintains copies of all of the textures (except those stored in the shared memory data structure) that are available for each context within a particular process and also stores the corresponding priorities and software texture IDs (explained below) of those textures. As will be explained in greater detail below, this texture memory data structure includes TIM's own software copy of the textures or a pointer to a shared memory location for copies of textures shared with the graphics API and graphics hardware driver.

This initialization occurs when the first context within the first process connected to TIM is opened. At that time, the hardware driver connected invokes TIM with a CRT ID and a device file as parameters of the invocation. The CRT ID is a 32-bit word (binary number) that represents the particular hardware device that is connected to that process and that will render the image of that context. Using the CRT ID, TIM initializes the device independent routines that require device dependent routines (that relate to that particular hardware device) so that the device independent routines are set up to call the device dependent routines. Particularly, TIM variables called function pointer within the device independent routines to point to the appropriate device dependent routines (that relate to the particular hardware device) so that the device independent routines will call on the correct device dependent routines. This device independent routine initialization also occurs in step 606.

The device file that the hardware driver sends to TIM when the first context within the first process is opened is a character string that represents the particular hardware device corresponding to that hardware driver. The particular hardware device is mapped via the device file to a consecutive block of memory within the system software memory. The file can be opened in order to map the graphics device. When the device file is opened, the system is told to describe the hardware device. In response, the system provides a hardware device ID. That hardware device ID is compared with the CRT ID provided to TIM by the hardware driver. If the device ID is identical to the CRT ID, then the hardware device is properly mapped. If identical, then the device file used to map that hardware device corresponds to the expected graphics hardware device identified by the CRT ID. When mapped, registers within the hardware device correspond to certain address memory locations within the host computer system. Thus, when data is written via the device dependent routines to the address locations within the system memory, the corresponding registers within the hardware device are written. The mapping occurs in step 608.

The initialization operation step 602 then proceeds to step 610 where the appropriate device dependent routines, that relate to the particular hardware device indicated (represented by the CRT ID), are initialized. Also, in step 610, the data structures relating to the device dependent routines also are initialized. One device dependent data structure includes the cache mirror data structure which stores, in its appropriated system software memory location, a record of all of the blocks of texture data presently stored in the local memory (such as a cache memory) of the underlying hardware device and the corresponding priorities of those textures.

The initialization routine then proceeds to step 612 where texture transfer buffers are created. As will be explained in greater detail below, a texture transfer buffer is one means by which a texture can be provided from a hardware driver to TIM so that TIM can store a copy of that texture in its own allocated texture memory data structure. The creation of the texture transfer buffers is done conventionally, as will be understood by those skilled in the art.

The initialization routine then proceeds to step 614 where the communications socket is created. As explained above, a virtual circuit connection for this socket exists between each hardware driver and TIM. As will be understood by those skilled in the art, a communications socket is a path through which two software routines can communicate. The creation of the socket includes creating buffers that read from the communication path and write to the communication path. In establishing communication over a socket, one routine requests to communicate via a virtual circuit connection to the socket. First the socket is created and bound to a name, then the creator of the socket starts listening on for virtual circuit connections. Thereafter, a communicating device can request to connect via a virtual circuit to the socket and start communicating over that new connection.

After the socket is created in step 614, the initialization routine of step 602 is completed and TIM sits idle as an independent daemon running on the processor in step 616. While TIM sits idle in step 616, it waits for one of three events to occur before it awakens from its idle state. Those events include a hardware interrupt, a virtual circuit connection or a socket communication. The routine proceeds from the idle state 616 to steps 618, 620 and 622 and then it loops back to the idle state in step 616.

In step 618, TIM determines whether a hardware interrupt has occurred. As described above in connection with the example of the particular hardware device, an interrupt occurs when a cache miss has occurred during rendering of a textured mapped polygon within the hardware device. When the cache miss occurs, an interrupt signal is provided from the hardware device to the host computer. If an interrupt has occurred, the routine proceeds to step 624 where the interrupt is processed with a device independent routine. That device independent routine of TIM for processing the interrupt is described in detail below with reference to the flow chart of FIG. 28.

In addition to the device independent routine for processing the interrupt, two device dependent routines are implemented for processing the interrupt. Those device dependent routines include the device dependent routines 642 for determining the texture block needed by the hardware device and selecting the block to replace in the cache memory, and the device dependent routine 648 for writing the needed block of texture data to the selected location within the local cache memory of the hardware device 660.

If a hardware interrupt has not occurred, as determined in step 618, or after the interrupt has been processed by the device independent routine of step 624, the device independent routine proceeds to step 620 where TIM determines whether a new socket connection request has been received. If a request for a new socket connection has been received, which occurs when the hardware driver wishes to open up a new socket for communicating information to TIM, then the routine proceeds to step 626 where the new socket is connected.

If a request for a new socket connection has not been received after the determination has occurred during step 620, or if a new socket has been connected in step 626, then the routine proceeds to step 622 where TIM determines whether a socket communication is occurring. If not, then the routine proceeds back to step 616 where TIM sits idle. If a socket communication is occurring, then the routine proceeds to step 628 where TIM processes the socket communication. In other words, TIM listens to the socket and receives the information communicated across the socket. That information could include a packet of data or a data stream.

From step 628, the routine proceeds to step 630 where TIM determines whether the process from which the communication originated is still in existence. The process may have been terminated by the user after creating certain contexts within that process. If the process has been terminated by the user, then the routine proceeds to step 632 where the textures associated with the terminated process, known as orphaned textures, are processed. In this step, the device independent routine erases TIM's copies of the orphaned textures from TIM's texture copies data structure. Additionally, in step 632, TIM stops listening to the socket over which the communication was sent. The device independent routine of step 632, when a process has been terminated, also calls the device dependent routine 654. As explained in greater detail below, the device dependent routine 654 nullifies the blocks presently stored in the cache memory of the hardware device that include texture data from the terminated texture. The device independent routine then proceeds back to step 634 (described above).

It should be understood from this discussion and the flow diagram of FIG. 26 that the device dependent routines are initialized and are called to operate by certain steps or routines of the overall device independent portion of TIM. For example, during step 608 of the device independent routine, during which device dependent routines are initialized, the initialization device dependent routine step 636 is called. This device dependent routine includes the device dependent routine of step 638 during which the texel cache data structure is initialized. As explained above, this structure records which blocks of texture data are presently stored in the cache memory of the hardware device 660. The device dependent routine 636 also includes the device dependent routine of step 640 during which any existing interrupts of the hardware device are processed until completion.

The device dependent routines of TIM have shared libraries that store data from multiple hardware devices. Thus, if an underlying graphics hardware device is added to the system, device-dependent data for that hardware device is stored in the shared libraries.

The device independent routine of step 624 for processing the interrupt calls the device dependent routine of step 642 for processing the interrupt. This device dependent routine for processing the interrupt of step 642 includes the routine of step 644 for determining the texture block needed by the hardware device 660 to render the current primitive. This routine is described in detail above with respect to the hardware device. As explained above, the routine includes reading the pipe tag of the missed block and decoding it to determine the particular block of texture data required. The device dependent routine of step 642 for processing the interrupt also includes the device dependent routine of step 646 for selecting the texture block to replace within the local cache memory of the hardware device 660. The routine of step 646 is described below with reference to FIG. 29.

The device independent routine of step 624 for processing the interrupt also calls the device dependent routine of step 648 for writing the texture block to the cache memory of the hardware device 660 at the selected block location. As explained in detail above, the block of texture data is written to the cache memory over a bus that avoids the 3-D rendering pipeline of the hardware memory.

When the device independent portion of TIM is processing a socket communication in step 628, that device independent routine calls any one of device dependent routines 650, 652 and 654. Device dependent routine 650 is called when a HALT condition has occurred. As explained in greater detail above, a HALT condition occurs when a block including a first texture is downloaded into the cache and then TIM packs a second texture into that same block. At that point, device dependent routine 650 is initiated and the operation of the hardware device is halted and the modified texture block is written to the preexisting location of the previous block within the cache memory.

The device dependent routine of step 652 is called when a block of texture data has been downloaded to the cache memory of the hardware device 660. The device dependent routine of step 652 updates the priority of the texture block in the cache data structure that was downloaded. The texture priorities are described in more detail below.

Figure 27:
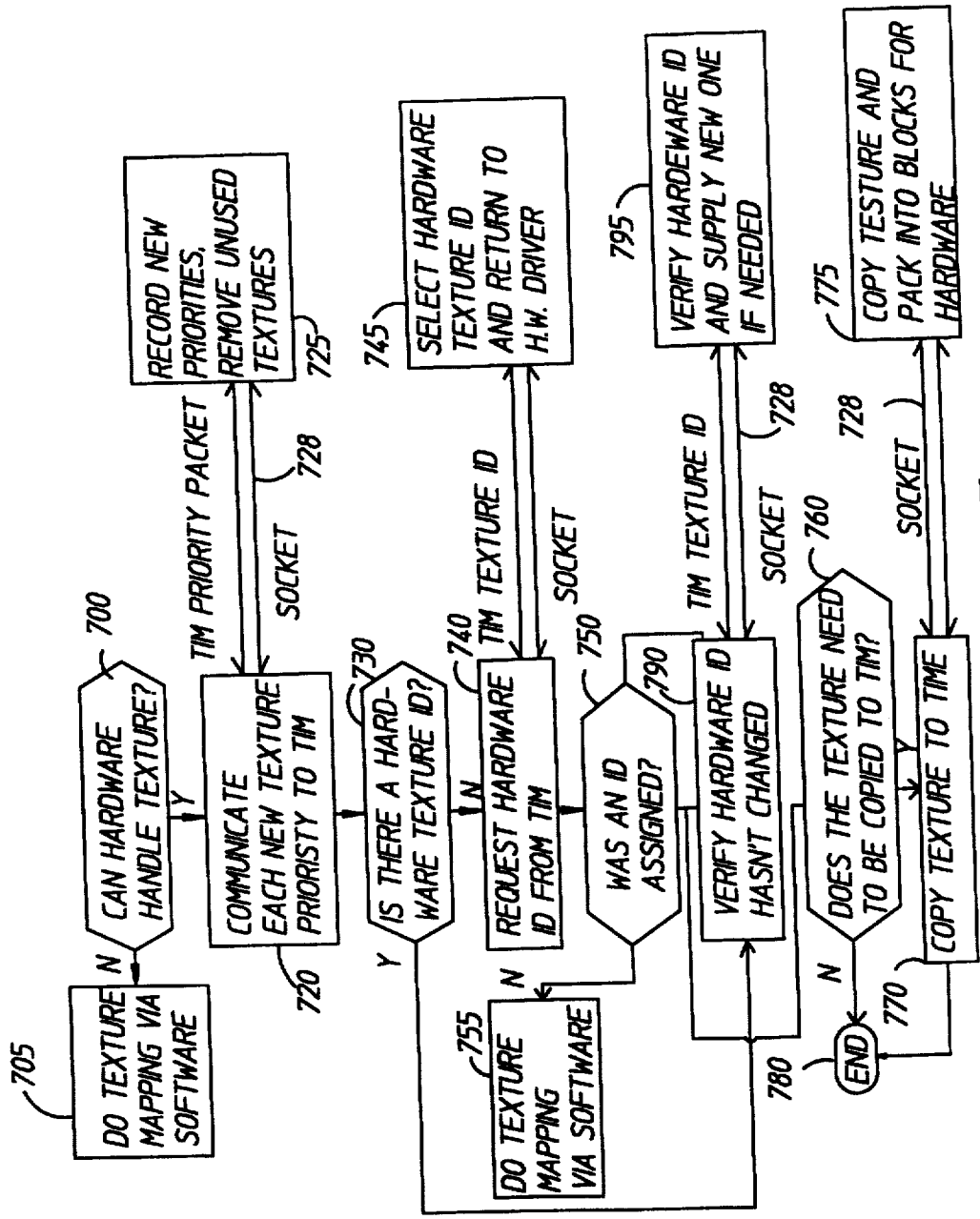
FIG. 27 is a part flow diagram, part functional block diagram of the operation of a hardware driver and TIM during communication between the two regarding textures.

FIG. 27 is a part functional block diagram, part flow chart illustrating operation of a hardware driver and TIM during communication between the two. The operational relationship between TIM and multiple hardware drivers is shown in the block diagram of FIG. 3. Each of the hardware drivers would communicate with TIM in accordance with the routine of FIG. 27. The routine of FIG. 27 is implemented by the hardware driver and TIM to carry out the three following functions: (1) communicating priorities of textures from the hardware driver to TIM; (2) having TIM assign a hardware texture ID to each new texture or verify that a preexisting hardware texture ID for that texture is correct; and (3) having TIM copy textures into its own system memory area that it does not already have. The flow chart illustrating operation of the graphics hardware driver is shown on the left side of FIG. 27, while TIM's functions in response to certain of the hardware driver's operations are shown on the right side of FIG. 27.

As discussed above, when the user creates a context within a high level process that requires texture mapping, a command is passed from the process to the graphics API and then to the hardware driver as well as a copy of the texture which is stored in the system software memory of the graphics API/hardware driver for that particular process. Additionally, the image of that context is broken down into image components such as polygons which are also provided to the graphics hardware driver. When that information is provided to the graphics hardware driver, the routine of FIG. 27 begins at step 700 where the graphics hardware driver determines whether the underlying graphics hardware device, to which the process is connected, can handle the selected texture. The graphics hardware driver makes this determination by examining attributes such as the size of the texture and determining whether such attributes can be supported by the underlying graphics hardware device. The underlying graphics hardware device may have physical limitations, such as register sizes, limited local texture memory capacity, buffer sizes, etc. that may be exceeded by attributes of the texture or the means by which it is applied to the polygon. As described above, the graphics hardware driver has knowledge of the physical limitations of the underlying graphics hardware device and, with that knowledge, makes the determination of step 700. Additionally, as will be understood by those skilled in the art, the underlying graphics hardware device may not be able to perform certain functions requested by the user. If, in step 700, the hardware driver determines that the underlying hardware device cannot physically handle the requested texture mapping function, then the routine proceeds to step 705 where the requested texture mapping function is performed by software, exclusive of the hardware device. Software texture mapping (texture mapping without use of a hardware device) should be understood by those skilled in the art and, therefore, will not be described herein.

Figure 31:
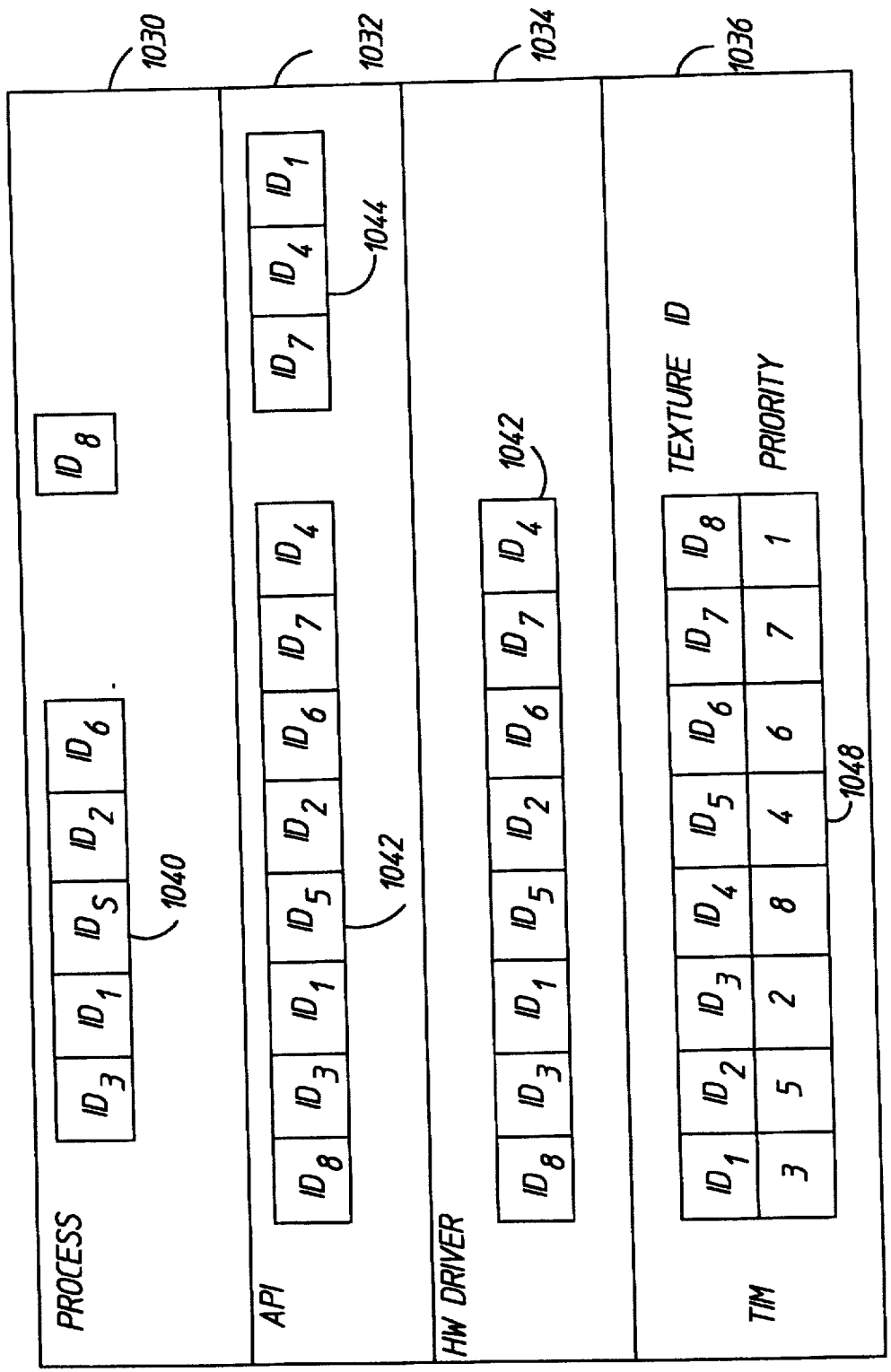
FIG. 31 is a functional block diagram showing the texture priority lists maintained by the software layers within the system and illustrating the scheme for determining ultimate system texture priority list.

If, during step 700, the graphics hardware driver alternatively determines that the underlying hardware device can handle the requested texture mapping function, then the routine proceeds to step 720 where the graphics hardware driver communicates each new texture priority to TIM. A texture priority list includes the software texture IDs for the currently available textures for the corresponding process in the order of priority. That list may be as small as one texture for the newly created texture. This priority list is stored in the software system memory in an allocated area. The priorities can include both user defined priorities and internal priorities. User defined priorities, which take precedence over internal priorities as described below with reference to FIG. 31, are prioritizations based on usersupplied knowledge of predicted usage of textures. Internally, the system gives highest priority to the most recently used textures. A newly created or currently active texture is given highest priority both over the user defined priorities and the most recently used internal priorities, as explained below.

In step 720, each new texture priority is communicated from the graphics hardware driver to TIM. Each time a new texture is added to the internal priority list, all of the priorities of the textures within that list will change. Thus, the new priorities are communicated from the hardware driver to TIM. The priorities are communicated via socket 728 in the form of a packet of information, each packet including the process ID of the process corresponding to that graphics hardware driver, the software texture IDs of each texture in the priority list, and the corresponding priorities of those textures. As above-described, both the process ID and the software texture ID are 32-bit digital words. The priority is communicated as an integer number. TIM previously has recorded the textures already sent to it for this particular process. Therefore, TIM may have already stored some of the textures in this priority list. TIM then modifies the priorities of the textures that it already has for that process.

If TIM does not have stored in its own allocated area of system memory one of the textures represented by the IDs sent in the packet, then TIM ignores that texture ID. The texture represented by that texture ID will later be provided from the hardware driver or it is not needed. In the special case when the user terminates use of a particular texture, then the priority for that texture is communicated to TIM as priority 0 and TIM removes that texture from its own allocated system software memory location, or from the shared memory location (described below), and TIM invokes a device dependent routine to remove that texture from the local texture memory of the hardware device. That device dependent routine is routine 654 of FIG. 26. For the particular hardware device described above, for example, the blocks of data stored in the local cache memory including that terminated texture will be removed by that device dependent routine. TIM's operations are shown at step 725.

The routine then proceeds to step 730 where the graphics hardware driver determines whether there exists a hardware texture ID for the newly requested texture. A data structure stored in an allocated memory area of the system software memory stores the software texture IDs and corresponding hardware texture IDs (when assigned) for each process. The hardware texture Ids and sub-texture IDs are (described herein) IDs recognizable by the underlying hardware device. In the example described above, the hardware texture ID is an 8-bit word which distinguishes textures from one another. The hardware driver determines whether a hardware texture ID has been assigned by looking within the data structure to the addressed location of the software texture ID and seeing if a corresponding hardware texture ID is listed.

If no hardware texture ID has been assigned, then the routine proceeds to step 740 where the hardware driver requests assignment of a hardware texture ID from TIM. This request is sent to TIM over socket 728 in a packet of information. The packet includes the process ID for the corresponding process, the software texture ID and a value for the hardware texture ID that indicates to TIM that no hardware texture ID has yet been assigned, as well as the size of the texture in terms of the S,T coordinate values of the base map. In step 745, TIM then assigns a hardware texture ID to that texture and returns that hardware texture ID via socket 728 to the graphics hardware driver.

In assigning the hardware texture ID, TIM checks the size of the base texture map by looking to the S,T coordinate values provided by the graphics hardware driver. If the texture base map is less than 128×128 texels in size, TIM then determines whether there is empty space in any of the blocks of texture data, for the corresponding process, stored in TIM's own allocated system memory area that could be occupied by the new texture. If empty space does exist, then the hardware texture ID assigned to that new texture is the same as that of the texture stored in the block having the empty space and the new texture is assigned a distinct sub-texture ID. This is explained above in the description of the hardware device and below with reference to FIG. 32. At the point where the new texture is packed into the same block with a previously existing texture within TIM's dedicated texture memory data structure, a HALT occurs and the corresponding device dependent routine for downloading that block or blocks to overwrite the blocks currently stored in the cache occurs. The occurrence of a HALT situation is discussed above in detail with respect to the hardware device. The device dependent routine for processing a HALT is shown in FIG. 26 at step 650.

This scheme for assigning texture IDs and sub-texture IDs is based on the particular texture allocation scheme described above with respect to the exemplary hardware device. It should be appreciated, however, that this particular scheme is intended only to be exemplary and is not limiting. As explained above, this is so because the TIM of the present invention can operate with different hardware devices having different texture memory allocation requirements than those of the embodiment described above.

If the new texture is greater than 128×128 texels in size, then TIM assigns a new hardware texture ID to the texture. At this time, in step 745, TIM also opens space within his own system memory area for storing a copy of that new texture. The newly assigned hardware texture ID is returned to the graphics hardware driver over socket 728 via a return packet. The hardware driver then stores the newly assigned hardware texture ID in the appropriate location in the texture ID data structure list.

The routine proceeds from step 740 to step 750 where the graphics hardware driver determines whether a hardware texture ID has been assigned. Because the hardware texture ID is an 8-bit word, only 256 distinct hardware texture IDs are available. It is possible, therefore, that all 256 distinct hardware texture IDs have been assigned. If so, then TIM determines whether any of the 256 textures have a priority that is lower than another. If so, then TIM may reassign one of the previously assigned hardware texture IDs for a lower priority texture to the new texture. In the case that all 256 textures are highest priority textures, then a new hardware texture ID will not be assigned and the routine proceeds to step 755 where the texture mapping is done in software.

If a hardware texture ID was assigned, then the routine proceeds from step 750 to step 760 where the graphics hardware driver determines whether the texture needs to be copied to TIM. In other words, the graphics hardware driver determines whether TIM already has a copy of the texture in the allocated system software texture data structure or whether that texture, or a portion thereof, is stored in the shared memory location. If TIM does not already have a copy of that texture stored, then that texture is copied to TIM in step 770 by the graphics hardware driver. Three distinct methods for copying the texture to TIM exist and are described herein in detail with reference to FIG. 30. Details of the size and other parameters of the texture are sent to TIM in a packet over the socket 728, as described in detail below with reference to FIG. 30. TIM, in step 775, then copies the texture, and for textures and portions thereof that are to be stored in TIM's own data structure, the textures are packed into blocks recognizable by the hardware device. The blocks then are stored in TIM's allocated data structure. As described in greater detail below, large textures and portions of large textures are stored in the shared memory area without first being packed into blocks recognizable by the hardware, and TIM stores a pointer to the texture in the shared memory area in TIM's own memory data structure. After step 770, the routine ends.

If, in step 730, it is determined that a hardware texture ID has already been assigned to the requested texture, then the routine proceeds to step 790 where the graphics hardware driver verifies that the previously assigned hardware texture ID has not changed. The graphics hardware driver performs this verification by communicating to TIM via the socket both the software texture ID and the previously assigned hardware texture ID. TIM in response, in step 795, looks at both the software texture ID and the corresponding hardware texture ID sent by the hardware driver and compares that with TIM's stored ID list. If the hardware texture ID has been changed, which may occur if TIM assigned the previously assigned hardware texture ID to another texture, then TIM will assign a new hardware texture ID if available. TIM, therefore, either verifies that the hardware ID has not changed or, if a new ID is assigned, then communicates the new ID to the hardware driver via the socket 728.

From step 790, the routine proceeds to step 750 where it is determined whether an ID has been assigned. Then the routine proceeds as outlined above.

If in step 760, the texture does not need to be copied because TIM already has a stored copy of that texture, then the routine is complete.

Figure 28:
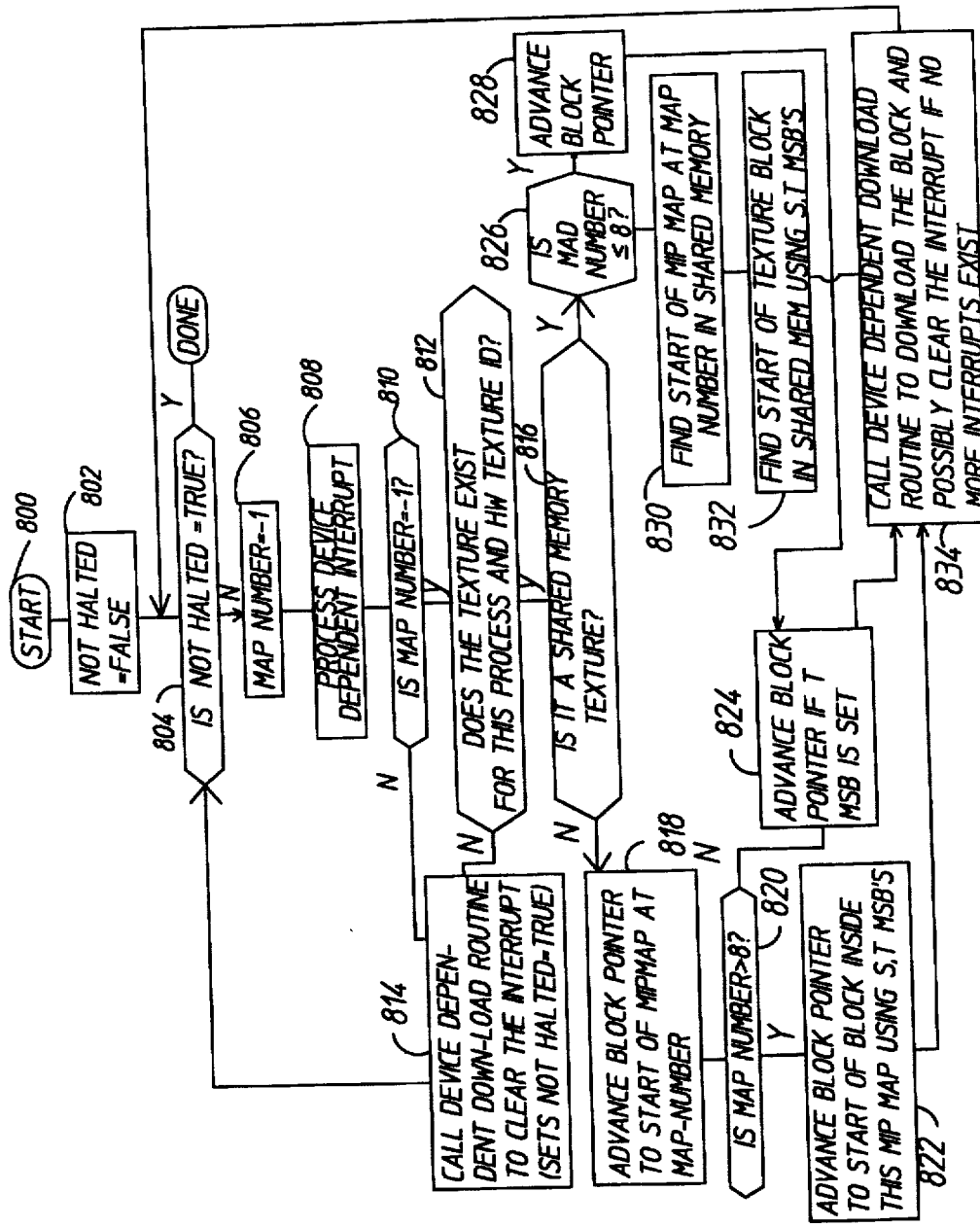
FIG. 28 is a flow diagram of the device independent routine of TIM for processing an interrupt.

FIG. 28 is a flow chart showing the steps of the device independent routine for processing an interrupt. This routine occurs at step 624 of FIG. 26. When an interrupt occurs in the hardware device, after a cache miss has occurred, an interrupt signal is provided from the hardware to the processor of the host computer which sets an interrupt flag. That flag is read by the processor and TIM is awakened at step 618 in FIG. 26.

The device independent routine for processing an interrupt begins then at step 800 and proceeds to step 802 where a software variable referred to as NOT-HALTED is set equal to false. The routine then proceeds to step 804 where TIM determines whether the variable NOT-HALTED is true. Because the routine has just begun and the variable NOT-HALTED has been set equal to false in step 802, the answer to the determination of step 804 is no and the routine proceeds to step 806. When the variable NOT-HALTED is false, the interrupt has not yet been processed.

In step 806, a variable called MAP-NUMBER is set equal to −1. The variable MAP-NUMBER represents the actual map number. Thus, when the variable MAP-NUMBER is not equal to −1, then a valid texture is associated with that interrupt.

The routine then proceeds to step 808 where the device dependent routine for processing the interrupt is called to run. This device dependent routine is routine 644 of FIG. 26. This routine includes halting the hardware device and determining the texture block needed by the hardware device to render that particular polygon. In determining the block needed, the pipe tag is read and from the pipe tag, the texture ID, MAP-NUMBER and S,T MSB coordinates are determined. This scheme is explained in detail above in the description of the hardware device. The device dependent routine then resets the variable MAP-NUMBER to the appropriate MIP map number of the block needed.

The routine then proceeds to step 810 where it is determined whether the variable MAP-NUMBER is not equal to −1. Because the device dependent interrupt routine of step 808 sets the variable MAP-NUMBER to the map-number of the block required by the hardware device, the answer to the determination of step 810 is yes.

The routine then proceeds to step 812 where TIM determines whether the texture represented by the hardware texture ID defined by the device dependent routine of step 808 exists for the present process. TIM determines whether the texture exists by searching the data structure for the texture associated with that texture ID. If that texture does not exist, then the routine proceeds to step 814. In step 814, the device independent routine calls the device dependent download routine which is shown at step 648 of FIG. 26. The device dependent routine is told to clear the interrupt and also sets the variable NOT-HALTED to true. The routine then proceeds to step 804 where TIM determines whether the variable NOT-HALTED is true. Because the variable NOT-HALTED was just set equal to true, the answer to that determination is yes and the routine is complete. In this situation, the texture may have been terminated or the process within which the texture was created may have been terminated by the user.

Alternatively, if the texture represented by the texture ID found by the device dependent interrupt routine of step 808 exists, then the routine proceeds to step 816. In step 816, TIM determines whether the texture needed is stored in the shared memory location. If the texture is not stored in the shared memory location, then the routine proceeds to step 818. In step 818, the block pointer of the data structure of TIM's own allocated system memory is advanced to the beginning address of a particular MIP map of that texture represented by the MAP-NUMBER variable. The block pointer of the data structure can point to any block stored within TIM's own system memory data structure. As explained in detail above with respect to the hardware device, for maps having a map number greater than eight, those maps being greater than 256×256 texels in size, each map takes up at least one block of data. For example, for a map having a map number nine, being 512×512 texels in size, four blocks of data (each block being 256×256 texels in size) would be required to store the data of that map. Similarly, sixteen blocks would be required to store all of the data for a map having a map number ten, being 1024×1024 texels in size, and so on. However, for maps having map numbers eight and less, all of the maps are packed into two blocks of data with one of those two blocks being stored in one bank of the cache memory and the other of those two blocks being stored in the other bank of the cache memory. This memory allocation scheme is described in detail above with respect to FIGS. 14–16.

The routine then proceeds to step 820 where TIM determines whether the map number is greater than eight. TIM determines whether the map number is greater than eight by looking at the variable MAP-NUMBER (which is equal to the map number). If the map number is greater than eight, then the routine proceeds to step 822 where the block pointer of the memory data structure is advanced to the start of the particular block that stores the data portion of the particular MIP map, required by the hardware device, using the S,T MSB coordinates. As discussed in detail above with respect to FIGS. 14–16, if the particular MIP map required is a map number nine, then four different blocks store the data from that map. Thus, one S MSB coordinate and one T MSB coordinate would be required to determine which of the four blocks store the texture data portion of the map nine required by the hardware device. Accordingly, using one S MSB coordinate and one T MSB coordinate, the block pointer is advanced to the appropriate one of the four blocks of the map.

If the MIP map needed has map number ten, then sixteen different blocks exist for storing the data of the map. Thus, two MSB S coordinates and two MSB T coordinates are required for decoding which of the sixteen blocks include the texture data portion of the map required by the hardware device. Using the S and T MSB coordinate bits, the appropriate block is determined and the block pointer is advanced to that block.

If, in step 820, it is determined that the map number is less than or equal to eight, then the routine proceeds to step 824. In step 824, the block pointer is moved from one of the two blocks that stores the texture data of the maps having map numbers eight and less to the other block if the T MSB bit is set. As explained above, all of the texture data of the maps having map numbers eight and less is stored within two blocks. Thus, only one bit is required to decode which of the two blocks is the appropriate block to download. Thus, the T MSB bit is used to decode which of the two blocks is the appropriate block for any of the maps having map numbers eight and less.

If, in step 816, it is determined that the texture required is stored in the shared memory location of the system, then the routine proceeds to step 826 where it is determined whether the map number is less than or equal to eight. If the map number is less than or equal to eight, then the routine proceeds to step 828 where the block pointer of the shared memory data structure is advanced to the start of the two blocks that store the map required. Then the routine proceeds to step 824 where the block pointer is advanced from one of the blocks to the other if the T MSB bit is set, as explained above.

If, alternatively, in step 826, it is determined that the map number is greater than eight, then the routine proceeds to step 830 where the block pointer is advanced to the beginning block of the multiple blocks that store the texture portions of the particular MIP map required. As previously described, if the map required has a map number of nine, then one of four different blocks is the block required. If the map required has a map number ten, then one of sixteen different blocks is the particular block required.

The routine then proceeds to step 832 where the block pointer is advanced to the particular block required within the shared memory data structure using the S,T MSB coordinate bits, similarly to how it was done in step 822, described above.

From each of steps 822, 824 and 832, in which the appropriate block pointer is advanced to point to the particular block required to be downloaded, the routine proceeds to step 834. In step 834, the device independent routine calls the device dependent download routine to download the required block and then clear the interrupt if no more interrupts exist. The device dependent routine for downloading the block selected is the download routine shown at step 648 in FIG. 26.

This device dependent routine for downloading the block downloads the block pointed to by the pointer, as performed in steps 822, 824 or 832. As explained above in detail, the block is downloaded, for the hardware device of this example, through the 2-D path avoiding the 3-D pipelined rendering path of the hardware device. The particular block is downloaded to a selected location in the cache memory. This selected location includes overwriting one of the sixty-four blocks then stored in the cache memory. The optimal block to overwrite, in order to avoid future interrupts for bandwidth savings, is determined in the device dependent routine shown at steps 646 in FIG. 26 and described in detail herein with reference to the flow chart of FIG. 29.

The routine of FIG. 28 then proceeds from step 834 to step 804 where it is determined whether the variable NOT-HALTED is true. If so, then the routine is completed. The device dependent download routine of step 834 sets the variable NOT-HALTED to true after the block is downloaded and it is determined that no more interrupts exist. This clears the interrupt and ends the routine.

If, in step 810, it is determined that the map number is not equal to −1, then the routine proceeds to step 814, described above.

Figure 29A:
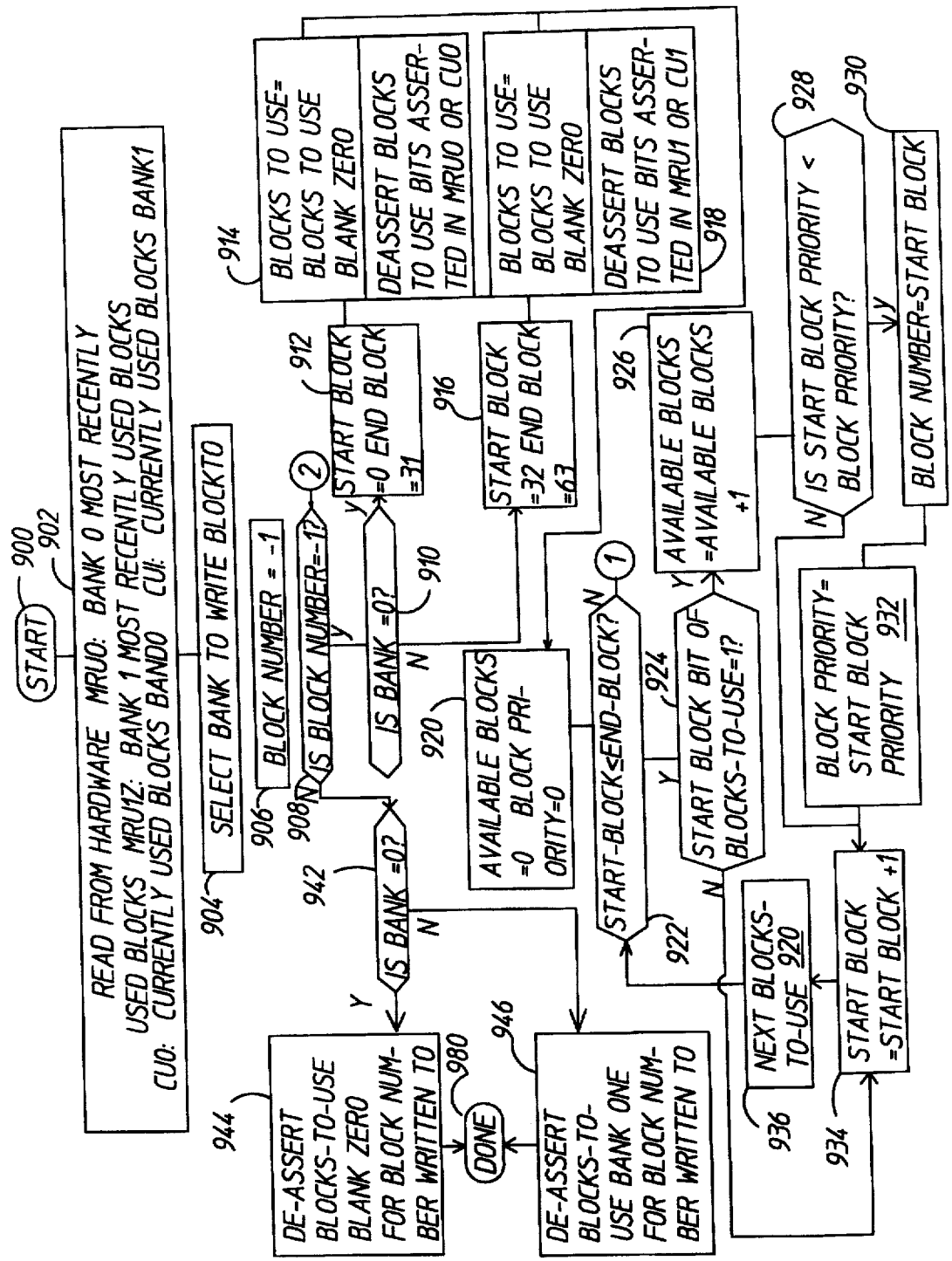
FIG. 29 is a flow diagram of the device dependent routine of TIM for determining which block within the local memory of the hardware device to replace during an interrupt.
Figure 29B:
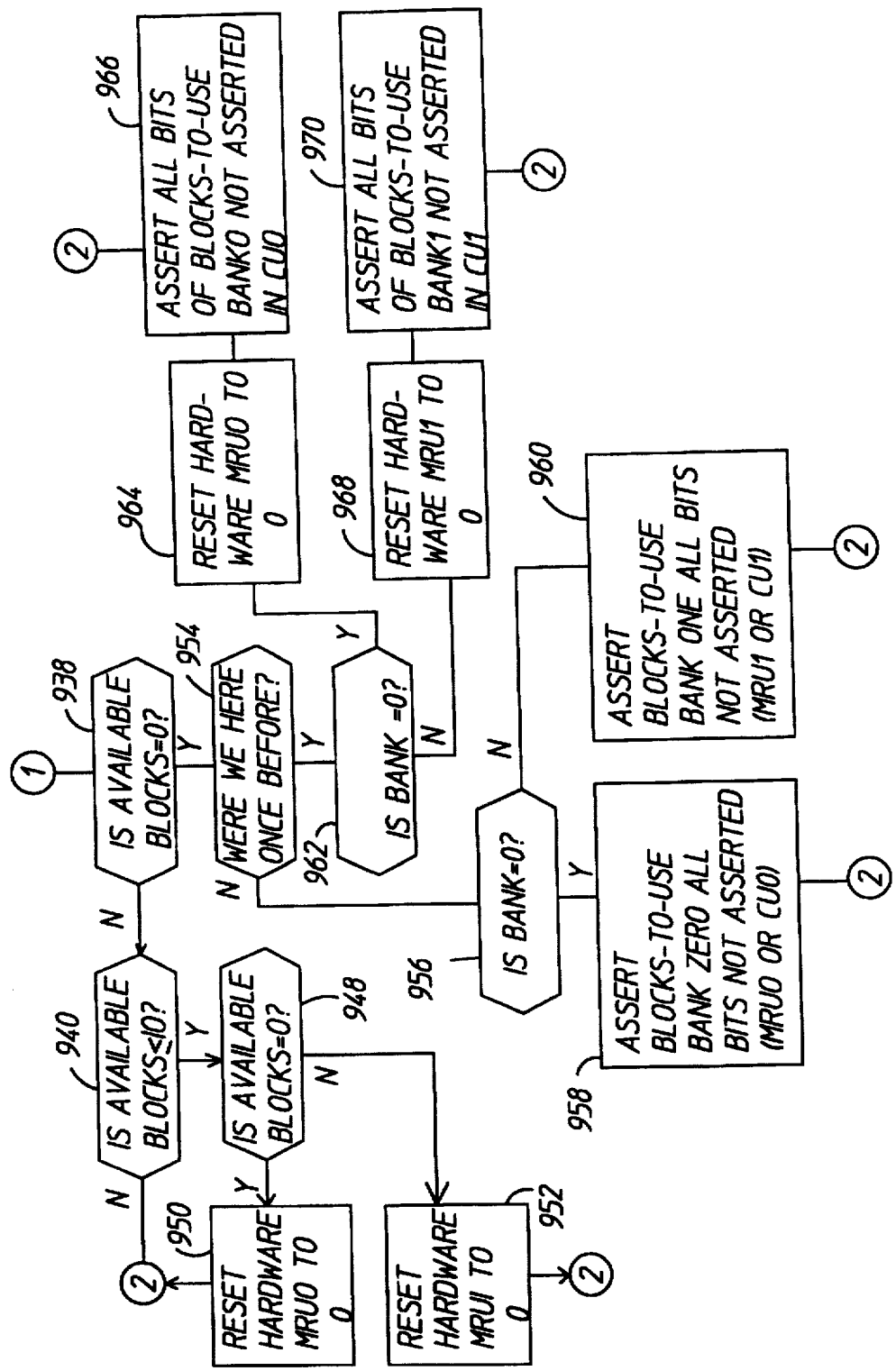

FIG. 29 is a block diagram of the device dependent routine implemented by TIM to determine which block within the local cache memory of the hardware device to replace when an interrupt occurs. This device dependent routine is shown as step 646 of FIG. 26. As explained above with reference to FIG. 26, the device dependent routine is called by the device independent routine of step 624 when an interrupt is processed. The scheme for selecting a block to replace in the cache memory considers both the frequency of past use of all of the blocks then in the cache memory as well as the predicted future use of such blocks based on the relative priorities of the textures stored in the blocks. The scheme is aimed at reducing the number of future interrupts to reduce system bandwidth.

The routine described with reference to FIG. 29 assumes use of the specific hardware device described above. Thus, as described in detail below, the routine also updates the most recently used (MRU) and currently used (CU) registers of the hardware device. It should be understood, however, that the routine of FIG. 29 could be altered to suit any underlying hardware device with which the system of the invention could be used. For example, the device need not have the identical physical construction as that of the example described but would need to be able to store a portion of the texture data stored in the system memory and would need to issue interrupts when texture data then needed to render images is not present in the local memory.

The routine of FIG. 29 starts at step 900 when an interrupt occurs in the hardware device, a signal is sent from the hardware device to the processor, that signal is read, TIM is awakened and TIM calls this routine from the device independent routine of step 624 of FIG. 26. The routine of FIG. 29 proceeds to step 902 in which TIM reads the MRU and CU registers corresponding to each SDRAM bank from the hardware device. These registers keep track of which blocks of texture data in the cache most recently have been used (MRU) or are currently in use (CU). As described above, each of the registers is a 32-bit register with one bit corresponding to each of the thirty-two blocks in the corresponding bank. A bit in the MRU register is asserted when the corresponding block has been used (i.e., texels have been accessed from that block in the cache) and a bit in the CU register is asserted when the corresponding block is in the mini-directory (described above).

As described in the foregoing hardware description, consecutive pixels will often map to texels stored in the same block or blocks requiring the same set of blocks to be used repeatedly when rendering pixels of a primitive (i.e., portion of a polygon such as a triangle). Thus, in order to avoid repeated interrupts, it is desirable not to replace blocks which recently have been used, as that block may need to be accessed when rendering a subsequent pixel. By selecting blocks to replace that have a lesser or least likelihood to be needed by the hardware device in rendering subsequent pixels, system bandwidth is minimized.

After reading the MRU and CU registers, the routine proceeds to step 904, wherein one of bank zero or bank one of the SDRAMs of the cache memory to write to is selected. The determination of which bank to write to is made in accordance with the scheme described above in connection with the hardware device.

The routine then proceeds to step 906 where the variable BLOCK NUMBER is set equal to minus one, which is used to indicate when the iteration is complete and a block has been selected for replacement, as described below. The variable BLOCK NUMBER represents the actual block number selected for replacement.

The routine then proceeds to step 908, in which it is determined whether the variable BLOCK NUMBER is equal to minus one. In the first iteration, the answer will be yes, as it was just set, and the routine proceeds to step 910, where it is determined what bank was selected to be written to in step 904. If the bank to be written to is bank zero, then the routine proceeds to steps 912 and 914. If, alternatively, the bank to be written to is bank one, then the routine proceeds to steps 916 and 918. The two pairs of steps for each bank perform a similar operation. The operation is designed to make unavailable any blocks that have either been most recently used or are being currently used, which blocks correspond to the bits then asserted in the MRU and CU registers.

As stated in the texture hardware memory description, the cache can hold up to sixty-four blocks of texture data. Each block is identified by a block tag. All sixty-four blocks are checked for availability for replacement. As described above, bank zero of the cache memory holds blocks zero to thirty-one while bank one holds blocks thirty-two to sixty-four. In step 912, block zero is designated as the starting block in checking for availability for replacement and block thirty-one is designated as the ending block in checking for availability for replacement of the bank zero blocks. This is accomplished by setting a variable START BLOCK to zero and setting a variable END BLOCK to thirty-one. Similarly, in step 916, for bank one, the variable START BLOCK is set equal to thirty-two and the variable END BLOCK is set equal to sixty-three designating that the starting block is block thirty-two and the ending block is block sixty-three in the checking for availability for replacement of the bank one blocks.

For each of banks zero and one, a variable called BLOCKS TO USE is a 32-bit word, with one bit corresponding to each block in that bank, that represents whether any of the blocks is available for replacement. If one of the bits in the BLOCKS TO USE variable is asserted, then the corresponding block within that bank is available for replacement.

The routine proceeds from step 912, if bank zero is selected, to step 914 where the variable BLOCKS TO USE is set equal to the variable BLOCKS TO USE BANKS ZERO and then the bits within the BLOCKS TO USE variable are deasserted that correspond to any bits asserted in either the MRU or CU registers of bank zero, where or is a logical OR operation. Similarly, if bank one is selected for replacement, then the routine proceeds from step 916 to step 918 where the variable BLOCKS TO USE is set equal to the variable BLOCKS TO USE BANK ONE and the bits within the BLOCKS TO USE variable that are asserted in the MRU or CU registers of bank one are deasserted.

From either of steps 914 or 918, the routine proceeds to step 920. In step 920, the variable AVAILABLE BLOCKS and the variable BLOCK PRIORITY are both set to zero. This step 920 will be visited once during each iteration for each block in determining whether any available blocks exist for that bank. The variable AVAILABLE BLOCKS is used to count the blocks within that bank which are available to be replaced. The number of available blocks within that bank influences how the routine flows, as described below. The variable BLOCK PRIORITY is used to monitor the priorities of the available blocks within that bank, in order to select the lowest priority of the available blocks to replace.

Steps 922–936 are a series of steps that are iterated for each block within each bank to determine the number of available blocks, and the lowest priority of the available blocks. From step 920, the routine proceeds to step 922 where it is determined whether the variable START BLOCK is less than or equal to the variable END BLOCK. If the variable START BLOCK is less than or equal to the variable END BLOCK, then not all of the blocks within that bank have been checked for replacement availability. During each iteration through the series of steps 922–936, the variable START BLOCK is incremented by one at least 934 and represents the block currently being checked. When START BLOCK is greater then END BLOCK, then the routine proceeds to step 938, described below.

If the variable START BLOCK is less than or equal to the variable END BLOCK, then blocks for that bank still need to be checked for replacement availability, and the routine proceeds to step 924. In step 924, it is determined whether the bit that corresponds to the block being checked in the BLOCKS TO USE variable is equal to one. If the bit in the BLOCKS TO USE variable corresponding to the block currently being checked is equal to one, then that block is available for replacement and the routine proceeds to step 926 where the variable AVAILABLE BLOCKS is incremented by one.

From step 926, the routine proceeds to step 928 where it is determined whether the priority of the presently available block, that is the priority of the block corresponding to the variable START BLOCK, is greater than or less than the lowest priority of any blocks found available thus far through the iteration of steps 922–936. The lowest priority of any available blocks is held in the variable BLOCK PRIORITY. If the priority of the present block is less than the lowest priority of any blocks available thus far, then the routine proceeds from step 928 to step 930 where the variable BLOCK NUMBER is set equal to the variable START BLOCK so that the variable BLOCK NUMBER will store the block number of the lowest priority of the available blocks thus far.

The routine then proceeds to step 932 where the variable BLOCK PRIORITY is set to the priority of the present block represented by the variable START BLOCK. If, in step 928, it is determined that the priority of the presently available block (represented by the variable START BLOCK) is not less than the lowest priority of the available blocks thus far (represented by the variable BLOCK PRIORITY), then steps 930 and 932 are bypassed and the routine proceeds to step 934. In such a case, neither the variable BLOCK NUMBER nor the variable BLOCK PRIORITY will be updated.

If, in step 924, it is determined that the bit in the variable BLOCKS TO USE, corresponding to the present block being checked for availability, is not equal to one, then that block is not available for replacement, and the routine proceeds to step 934. In step 934, the variable START BLOCK is incremented by one so that the next block within that bank will be checked for availability. The routine then proceeds to step 936. In step 936, the variable BLOCKS TO USE is advanced to the next bit corresponding to the next block to be checked for availability. Then the routine proceeds back to step 922 for another iteration.

When all of the blocks within that bank have been checked for availability, the variable START BLOCK is greater than the variable END BLOCK and the routine proceeds from step 922 to "1", which is shown in FIG. 29 (cont.). From "1", the routine proceeds to step 938 where it is determined whether the variable AVAILABLE BLOCKS is equal to zero. If the variable AVAILABLE BLOCKS is not equal to zero, then the routine proceeds to step 940 where it is determined whether the variable AVAILABLE BLOCKS is less than or equal to ten. If the variable AVAILABLE BLOCKS is greater than ten, then the routine proceeds to "2", and then to step 908. In step 908, it is determined whether the variable BLOCK NUMBER is equal to −1. Because more than ten blocks have been found available, one of which will have a lowest priority, the variable BLOCK NUMBER will be equal to the block number of the lowest priority of the available blocks and the answer to that determination will be no.

Therefore, the routine proceeds to step 942 where it is determined whether the block to be replaced is in bank zero or bank one. If the block is in bank zero, then the routine proceeds to step 944 wherein the bit within the variable BLOCKS TO USE for that bank corresponding to the block selected for replacement (that block represented by the variable BLOCK NUMBER) is deasserted. If the block to be replaced is in bank zero, then the routine proceeds to step 946 which carries out a similar function carried out in step 944. Then the routine is completed at step 980 as the block represented by the variable BLOCK NUMBER, having the lowest priority of all of the available blocks, has been selected for replacement. It should be understood from the foregoing that all of the available blocks represented by the variable AVAILABLE BLOCKS are those which have not been recently used or currently used and, of those, the block selected for replacement is the one which stores the least priority texture.

If it is determined in step 940 that the number of available blocks is less than or equal to ten, then the routine proceeds to step 948 where it is determined whether the available blocks are within bank zero or bank one. If in bank zero, then the routine proceeds to step 950. If in bank one, then the routine proceeds to step 952. In steps 950 and 952, the hardware registers MRU (for banks zero and one, respectively) are reset to zero. By the step of 950 or 952, the MRU register for that bank is reset in the situation where the number of available blocks for the bank is few. This is done so that all of the bits in the MRU register will not be asserted and, for a future interrupt, have to select a block to replace randomly. From either of steps 950 or 952, the routine proceeds to "2" which begins again at step 908, described above.

If it is determined in step 938, that the number of available blocks for that bank is equal to zero, then the routine proceeds to step 954 where it is determined whether this is the first time for that bank that the routine has been at this step. If so, then the routine proceeds to step 956 where it is determined whether it is checking the blocks in bank zero or bank one. If bank zero, then the routine proceeds to step 958. If bank one, then the routine proceeds to step 960. In either of steps 958 or 960, the bits in the variable BLOCKS TO USE (for the corresponding bank) that correspond to bits that are not asserted in either the MRU register or the CU register (of that bank) are asserted. In other words, in steps 958 and 960, the bits in the variable BLOCKS TO USE are set equal to one that correspond to blocks that are not then represented by asserted bits in the MRU or CU registers for that bank. This operation is different from that performed in steps 914 and 918 which deasserts the bits in the BLOCKS TO USE variable for all of the blocks then represented by the asserted bits in the MRU or CU registers of the corresponding bank. The operation of steps 958 and 960 is an attempt to make more blocks available in that bank. From either of steps 958 or 960, the routine proceeds to "2" where the routine then begins at step 908 again and another iteration for checking whether available blocks exist is carried out.

If the iteration occurs again and no blocks are determined available for that bank, then in step 954 the answer to the determination whether the routine has been there before for that bank is yes and the routine proceeds to step 962. In step 962, it is determined whether the blocks are being checked in bank zero or bank one. If bank zero, then the routine proceeds to steps 964 and 966. If bank one, then the routine proceeds to steps 968 and 970. In steps 964 and 968, the bits of the MRU register for the corresponding bank are reset to zero. Then, in steps 966 and 970, for the corresponding bank, the bits of the variable BLOCKS TO USE, corresponding to the deasserted bits of the CU register for that bank, are asserted. Then, the routine proceeds to "2" where it again begins at step 908. By asserting the bits within the BLOCKS TO USE register that are deasserted in the CU register, in steps 966 and 970, the routine attempts to provide a sufficient number of available blocks for the subsequent iteration. From either of steps 966 or 970, the routine proceeds to "2" and then the subsequent iteration is started.

Figure 30:
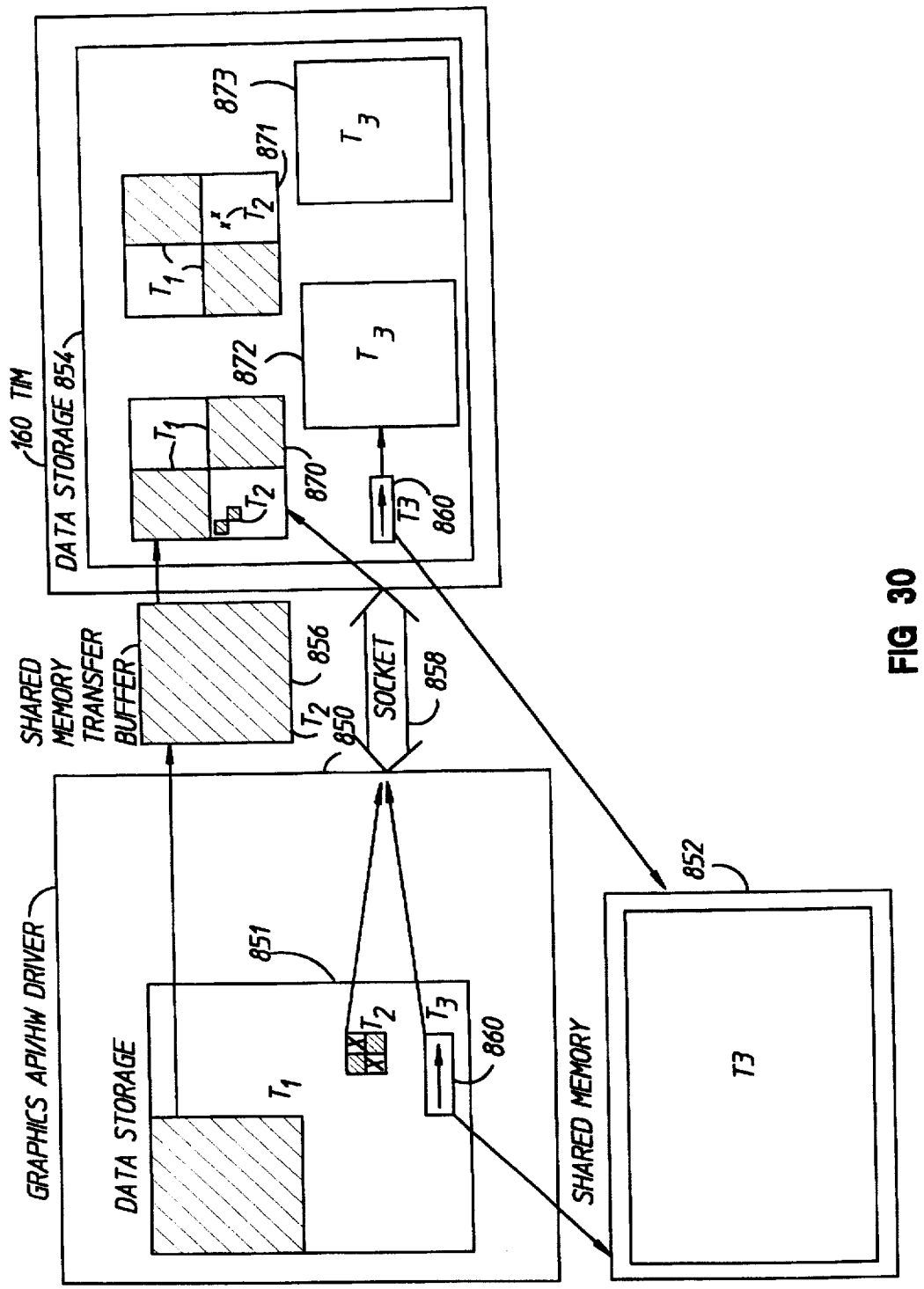
FIG. 30 is a functional block diagram showing the methods by which texture data can be communicated from a hardware driver to TIM and TIM's means for storing copies of textures.

FIG. 30 is a graphical illustration showing the different ways software texture data can be transferred from the graphics API/graphics hardware driver of a particular process to TIM. Shown in the upper left portion of the diagram is the graphics API/hardware driver 850 of a particular process. The graphics API/hardware driver 850 has its own allocated system software memory area 851 for storing copies of textures created within that process. Within that area 851, the example of FIG. 30 shows textures T1 and T2 being stored as well as a pointer 860 to a shared memory texture T3. In this example, texture T1 is 256×256 texels in size, texture T2 is 16×16 texels in size and texture T3 is 1024×1024 texels in size.

As shown in the upper right portion of the diagram is TIM 160 of the present invention. TIM 160 includes its own data storage area 854 within which copies of certain textures, or portions thereof, are stored. As shown, stored within the data storage area 854 are blocks 870, 871, 872 and 873 as well as pointer 860. Within blocks 870 and 871 are portions of textures T1 and T2. Because texture T1 is 256×256 texels in size and texture T2 is less than 128×128 texels in size, texture T1 is allocated among the two blocks 870 and 871 and empty space exists in those blocks for storing texture T2. Thus, TIM packs texture T2 into the same blocks as texture T1 and assigns texture T2 a sub-texture identifier, as described in detail above with respect to the hardware device and below with respect to FIG. 32.

Blocks 872 and 873 include portions of texture T3. Those portions include MIP map levels eight and less of texture T3.

As described above, maps having a map number of eight and less of a particular texture are allocated among two blocks.

Shown in the lower left portion of the diagram is a shared memory area 852 which, in the illustrative example of FIG. 30, stores texture T3. The data storage area 851 of the graphics API/hardware driver includes a pointer 860 to that texture within the shared memory area 852 and TIM's data storage area 854 also stores another pointer 860 to that location within the shared memory 852 where texture T3 is stored.

The software scheme of the present invention provides three different methods by which texture data can be communicated from the graphics API/hardware driver to TIM. The first method is to transfer blocks of data across a shared memory transfer buffer 856. In this method, the hardware driver breaks up the maps into blocks recognizable by the hardware device. In this particular example, those blocks are each sized 256×256 texels. Once broken up, then the hardware driver sends a packet across the socket 858 to TIM. The packet includes an indicator that a block or blocks of texture data will be coming across the shared memory transfer buffer 856. The packet also includes the software texture ID, the process ID to which the texture is associated, the S,T texture base map size, the number of MIP map levels of that texture, and the number of blocks that will be communicated. In one embodiment of the invention, the software texture ID is a 32-bit word and the process ID also is a 32-bit word. The software texture ID distinguishes textures within a particular process from one another and the process ID distinguishes processes, managed by TIM, from one another. TIM then receives this information and prepares for reading the texture blocks from the shared memory transfer buffer.

For maps having a map number greater than eight, each block is transferred through the shared memory transfer buffer including data only from that particular map. For each of these blocks, TIM then copies the block and stores that block in its own data storage area 854. For maps having a map number of eight, the whole map is sent within one 256×256 texel block. TIM then copies that block, allocates the portions of the map among two blocks in the format optimal for the hardware device, and stores those blocks in its data storage memory area 854. For maps having a map number seven and less, all of the maps are packed into a single block by the hardware driver and sent across the shared memory transfer buffer 856. TIM receives the block from the transfer buffer and allocates the texture data among the two blocks for subsequent storage into two separate banks of the SDRAMs in the cache memory, as described above. If another hardware device than that disclosed in the example above is used, then TIM packs the maps having map numbers eight and less into a pattern recognizable by the particular local memory of the hardware device.

As shown in the example of FIG. 30, texture T1, being 256×256 texels in size, is communicated across the shared memory transfer buffer as a single block. Then TIM copies that block and allocates the texture T1 among two blocks 870 and 871 recognizable by the hardware device so that those blocks can be downloaded into separate banks of the SDRAMS of the cache memory. Then those blocks 870 and 871 are stored within the data storage memory location 854 of TIM 160.

The second method by which texture data can be communicated from the graphics API/hardware driver to TIM is by sending the texture across the socket 858. In one illustrative embodiment of the present invention, textures are sent across the socket when they are 64×64 texels in size and less. Before the texture data is sent across the socket, the hardware driver sends a packet across the socket 858 to TIM indicating to TIM that texture data is going to be communicated across the socket. The packet also includes the S,T coordinates representing the base size of that texture, the software texture ID of the texture, the process ID corresponding to that texture, an indication of how many MIP map levels are within that texture and the physical size of the texture data in terms of the number of bytes. TIM receives this information by reading the packet from the socket and prepares for reading the texture data. Then the texture data is communicated across the socket from the hardware driver in the form of a data stream. TIM then reads the texture data from the socket and packs the texture data into blocks recognizable by the hardware device.

In the example shown in FIG. 30, texture T2, being 16×16 texels in size, is communicated across the socket and TIM then reads the texture T2 and packs that texture T2 among the two blocks 870 and 871 which also store portions of texture TI. As described above in connection with the hardware device example, the texture T2 would then be assigned the same texture ID as texture T1 but a different sub-texture ID to distinguish it from texture TI . The sub-texture ID is a four-bit word including two S coordinate bits and two T coordinate bits which identify the location of the sub-texture within the block.

The third method by which texture data can be communicated from the graphics API/hardware driver to TIM is by storing that texture data in the shared memory location which then can be accessed by both the graphics API/hardware driver and TIM which each store pointers to the addressed locations of the textures stored in the shared memory area 852. When textures are to be stored in the shared memory area 852, the hardware driver sends a packet across the socket 858 to TIM that indicates to TIM that a texture will be stored in the shared memory area 852. The packet includes also the software texture ID which is equal to the shared memory ID, the process ID, the S,T base map size of that texture, and the number of MIP map levels of that texture. TIM then reads the packet and converts the shared memory ID into a pointer and stores that pointer in its own data storage area 854. The pointer points to an address location within the shared memory area that is a starting address of the particular texture stored in the shared memory area.

TIM also determines whether the MIP map levels for that particular texture include maps eight or less. If that texture includes MIP map levels eight or less, then TIM copies only the MIP map levels eight or less of that particular texture and packs them into two blocks in accordance with the allocation scheme outlined above. Then, the packed blocks of texture data including the MIP map levels eight and less for that texture are stored in TIM's own memory area 854 while the map levels nine and greater are stored in the shared memory area 852. TIM stores a pointer in its own area 854 to the starting address of the map levels nine and greater of that texture.

The example shown in FIG. 30 should better illustrate this scheme. Assume that texture T3 has a base texture map size of 1024×1024 texels. Because of its size, it is determined texture should be stored in the shared memory area 852 rather than having two separate copies of the texture being stored in the areas 851 and 854. If texture T3 also includes MIP map levels eight through zero, then TIM copies maps eight through zero of texture T3 and packs them into two separate blocks 872 and 873 of data. Blocks 872 and 873 then are stored in TIM's allocated system memory area 854. As described above, TIM also stores a pointer 860 which points to the beginning address within the shared memory 852 where the texture T3 is stored. Thus, when the maps having map numbers nine and ten are required for texture T3, TIM can access that data using the pointer 860 to the shared memory location 852.

Because the TIM does not have a copy of maps nine and ten of texture T3 stored in its own memory area 854, maps nine and ten of texture T3 are not divided into the blocks recognizable by the hardware device until an interrupt occurs. Thus, a slight sacrifice in terms of system bandwidth occurs when a texture, or a portion of a texture, is stored in the shared memory area 852. However, a tremendous system memory space savings occurs by storing a texture, or a portion of a texture, in the shared memory area. Thus, a balance is struck between memory savings and system performance in determining whether to store a texture, or a portion thereof, in the shared memory area. In one embodiment of the present invention, textures having a base map of 1024×1024 texels in size and greater are stored in the shared memory area 852 of the system. The user of the system could select any size texture, however, as a cut-off size for storing textures in the shared memory area.

FIG. 31 is a functional block diagram showing how the texture priorities are defined for a particular process. Shown in the top row of the diagram is the user application or process 1030. Beneath that are shown both the graphics API 1032 and the graphics hardware driver 1034. Beneath the hardware driver, TIM 1036 is shown. In the process 1030, the user can supply a texture priority list 1040 for defined textures.

In this example, the user has assigned priorities to five previously created textures, which is shown in the texture priority list 1040. Each texture is assigned a different texture ID. The priority list 1040 supplied by the user in this particular example includes textures having the following IDs: ID 3, ID 1, ID 5, ID 2 and ID 6, in that order of priority. Additionally, the texture having the ID 8 is newly defined by the user and is about to be processed by the graphics API or hardware driver. Such a texture (ID 8) can, for example, be associated with a newly created context about to be acted upon by the API or hardware driver.

The graphics API 1032 tracks the recent use of the textures for each process, including process 1030. The texture having the ID 7, the texture having the ID 4 and the texture having the ID 1 have been recently processed by the graphics API for process 1030 with the texture having the ID 7 being processed most recently, in the example shown in FIG. 31. The recently processed texture priority list 1044 is maintained by the API for process 1030 and is stored in system memory. Of the recently processed textures (those maintained in the list 1044), the texture processed most recently (having the ID 7 in this example) is given the highest priority with each texture shifting down one in priority when a new texture has been processed. Thus, the texture having the ID 7 is given the highest priority and texture having the ID 1 is given the lowest priority of the most recently processed textures listed in the most recently processed texture priority list 1044 maintained by the graphics API 1032.

Then the graphics API 1032 coalesces the user-supplied texture priority list 1040 with the most recently processed texture priority list 1044 to compute the overall texture priority list 1042 of the system. The graphics API gives precedence to the user-supplied priorities over the most recently processed priorities. Thus, the textures having the IDs ID 3, ID 1, ID 5, ID 2 and ID 6 are given priority over the textures having the IDs ID7 and ID 4. The texture having the ID 8 is given the highest priority because it is a newly defined texture that is about to be processed by the graphics API. The priority list 1042 is continually updated in accordance with this scheme and is stored in the system software memory. The hardware driver uses the texture priority list 1042 generated by the graphics API to communicate texture priorities to TIM.

As explained above with reference to FIG. 27, the texture priority list 1042 is communicated to TIM and TIM also stores the priorities of the textures in a list 1048. TIM's texture priority list 1048 also is shown in FIG. 31 and matches that of the texture priority lists of the graphics API and graphics hardware driver. The user can at any time update the user-supplied priority list 1040 in which case the graphics API will update its own priority list 1042 and, as explained above, precedence will be given to the user-supplied texture priorities over the most recently processed texture priorities. If no user-supplied priority list is provided, then the graphics API overall priority list 1042 will be that of the most recently processed texture priority list 1044 except for newly created (not yet processed) textures which will be given the highest priority.

Figure 32:
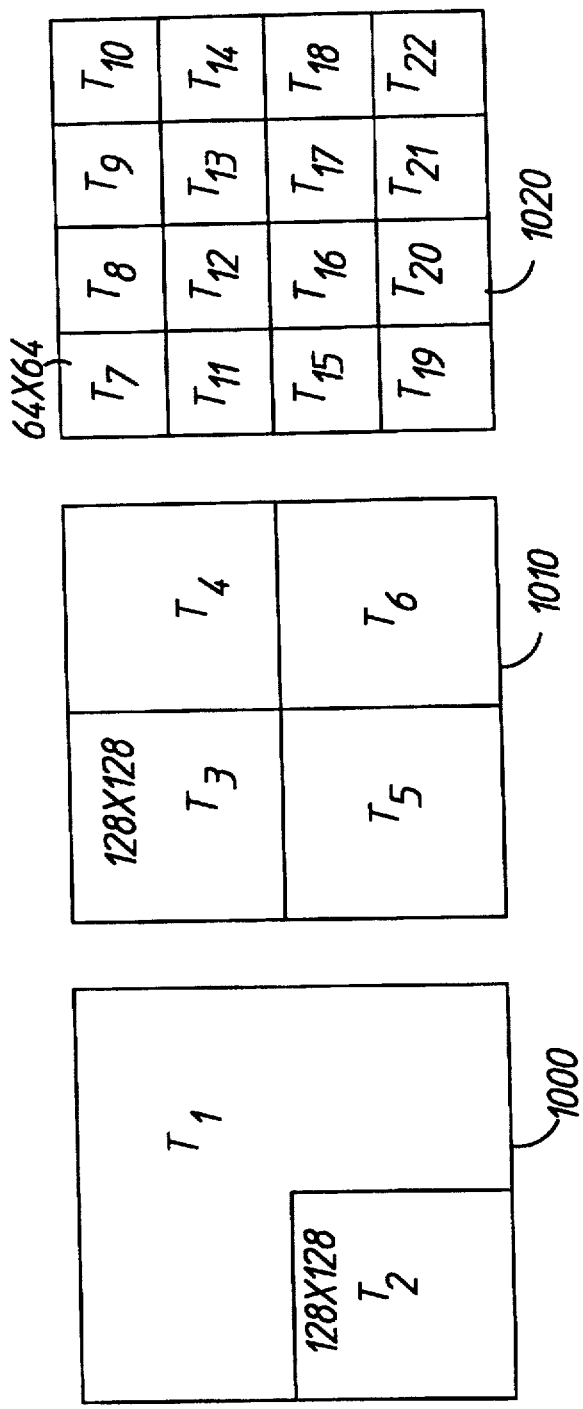
FIG. 32 is a functional block diagram illustrating different schemes for packing texture data of relatively small textures into blocks.

FIG. 32 is a graphical illustration showing three different ways multiple textures can be allocated within the same block and assigned different sub-texture IDs, in accordance with the memory allocation scheme of the particular hardware device of the example described above. Each block is 256×256 texels in size. For a first texture T1 having a base map with a map number eight, being 256×256 texels in size, that map would be allocated among two blocks, one block being stored in bank zero and one block being stored in bank one of the SDRAMs within the cache memory. Thus, an empty space within each block would enable the storage of another texture T2, created within the same process as texture T1, being 128×128 texels in size. One of these blocks 1000 is shown in FIG. 32. Textures T1 and T2 would include the same texture ID but a different sub-texture ID, as described above in the description of the hardware device.

As another example, four textures T3, T4, T5 and T6, each being 128×128 texels in size, and all created within the same process (and possibly shared among multiple contexts within that process), could be packed into four quadrants of another block 1010. Each of the textures T3, T4, T5 and T6 would be assigned a different sub-texture ID but would include the same texture ID, as explained above.

A third example includes sixteen unique textures T7–T22, each texture being 64×64 texels in size or smaller and created within the same process. All sixteen textures T7–T22 could be packed within the same block 1020, with each texture being assigned the same texture ID and a different sub-texture ID. As discussed above, the sub-texture ID would include two S coordinate bits and two T coordinate bits to distinguish between the sixteen different subtextures within the block.

Having thus described at least one illustrative embodiment of the invention, various alterations, modifications and improvements will readily occur to those skilled in the art. Such alterations, modifications and improvements are intended to be within the spirit and scope of the invention. Accordingly, the foregoing description is by way of example only and is not intended as limiting. The invention is limited only as defined in the following claims and the equivalents thereto.

What is claimed is:

1. A texture mapping computer graphics system comprising:

a host computer having a system memory that stores all texture data;

a graphics hardware device, coupled to the host computer, that renders texture mapped images, including a local memory that stores at least a portion of the texture data stored in the system memory at any one time; and a software daemon that runs on a processor of the host computer and asynchronously manages transferring texture data from the system memory to the local memory when needed by the hardware device to render an images;

wherein the software daemon allocates texture data in software from a series of MIP maps of at least one texture into at least one block of data, each MIP map being a filtered version of another MIP map, and downloads the texture data to the local memory one block at a time.

2. A method of managing texture data in a texture mapping computer graphics system, the system including a host computer with a main memory that stores texture data, a hardware device, coupled to the host computer, having a local memory that stores in blocks at least a portion of the texture data stored in the main memory at any one time, the blocks including portions of texture maps of larger-sized textures, wherein the hardware device renders texture mapped images using the texture data stored in the local memory, the method comprising the steps of:

monitoring the use by the hardware device of the texture data blocks stored in the local memory;

tracking the priorities of the textures stored in the main memory; and replacing lowest priority and least recently used texture data blocks in the local memory with texture data blocks needed by the hardware device to render images.

3. The method as claimed in claim 2 wherein the step of tracking further includes the step of maintaining an overall texture priority list.

4. The method as claimed in claim 3 wherein the step of maintaining an overall texture priority list includes the step of coalescing a user-defined texture priority list and a most recently processed texture priority list.

5. The method as claimed in claim 2 wherein the step of monitoring includes the step of reading data from the hardware device indicative of the current use or non-use of each data block stored in the local memory of the hardware device.

6. The method as claimed in claim 5 wherein the step of monitoring further includes the step of asserting bits of a multi-bit variable to represent recent use of corresponding blocks within the hardware device.

7. The method as claimed in claim 2 wherein the step of selecting includes the steps of:

determining available blocks to replace based on recent use by the hardware device of any blocks presently stored in the hardware device; and of the available blocks, determining a block that stores a texture having the lowest priority.

8. A software method of allocating texture data in a texture mapping computer graphics system, the system including a host computer and a graphics hardware device, coupled to the host computer, that renders texture mapped images, the data including at least one series of texture MIP maps, the software method performed asynchronously by a software daemon operating on a processor of the host computer and comprising the steps of:

dividing each map of the at least one series of maps into at least two map portions;

allocating the map portions into a plurality of blocks of data, wherein certain blocks may store less than an entire texture MIP map; and downloading certain blocks from the host computer to the hardware device when texture data stored within the certain blocks is required by the hardware device.

9. The method as claimed in claim 8 further including, before the step of downloading, the step of selecting lowest priority and least recently used data blocks in the hardware device to be replaced.

10. The method as claimed in claim 9 wherein the step of selecting includes the steps of:

monitoring the use of the data blocks stored in the hardware device; and tracking the priorities of textures of the at least one series of texture MIP maps.

11. The method as claimed in claim 10 wherein the step of tracking includes the step of assigning a unique texture ID to each texture.

12. The method as claimed in claim 11 wherein the step of tracking further includes the step of maintaining an overall texture priority list.

13. The method as claimed in claim 12 wherein the step of maintaining an overall texture priority list includes the step of coalescing a user-defined texture priority list and a most recently processed texture priority list.

14. The method as claimed in claim 13 wherein the step of coalescing includes the step of giving higher priority to user-defined textures than to most recently processed textures.

15. The method as claimed in claim 14 wherein the step of maintaining further includes the step of giving highest priority to newly defined but not yet processed textures.

16. The method as claimed in claim 10 wherein the step of monitoring includes the step of reading data from the hardware device indicative of the current use or non-use of each data block stored in the hardware device.

17. The method as claimed in claim 16 wherein the step of monitoring further includes the step of asserting bits of a multi-bit variable to represent recent use of corresponding blocks within the hardware device.

18. The method as claimed in claim 10 wherein the step of selecting includes the steps of:

determining available blocks to replace based on recent use by the hardware device of any blocks presently stored in the hardware device; and of the available blocks, determining a block that stores a texture having the lowest priority.

19. The method as claimed in claim 8 wherein the step of allocating includes the step of allocating map portions of a plurality of textures smaller in size than a block into a common block.

20. The method as claimed in claim 19 further including the step of assigning a sub-texture ID to each texture stored within the common block.

21. The method as claimed in claim 8 wherein the step of allocating includes the step of allocating map portions of MIPped maps smaller than or equal to a block into a common block.

22. A software daemon that manages texture data in a texture mapping computer graphics system, the system including a host computer having a system memory that stores texture data, a graphics hardware device, coupled to the host computer, that renders texture mapped images, and including a local memory that stores in blocks at least a portion of the texture data stored in the system memory at any one time, the blocks including portions of texture maps of larger-sized textures, the software daemon comprising:
- a process that allocates the texture data among blocks for downloading to the hardware device;
- a routine that determines which block is required by the hardware device during an interrupt;
- a routine that selects the block within the hardware device to be replaced during the interrupt; and
- a routine that downloads the required block to the hardware device to replace the selected block within the hardware device during the interrupt.

23. The software daemon as claimed in claim 22 wherein the routine that selects the block to be replaced includes a sub-routine that determines available blocks used least recently by the hardware device and, among the available blocks, those blocks storing textures having a least priority.

24. The software daemon as claimed in claim 22 wherein the process that allocates texture data includes a sub-process that allocates multiple textures smaller within size than a block in a common block.

* * * * *

UNITED STATES PATENT AND TRADEMARK OFFICE
CERTIFICATE OF CORRECTION

PATENT NO.    : 5,790,130
DATED         : August 4, 1998
INVENTOR(S)   : Ethan W. Gannett It is certified that error appears in the above-identified patent and that said Letters Patent is hereby corrected as shown below:

Column 73, Line 9:     "images" should be --image--

Signed and Sealed this

First Day of May, 2001

Attest:

NICHOLAS P. GODICI

Attesting Officer     Acting Director of the United States Patent and Trademark Office

UNITED STATES PATENT AND TRADEMARK OFFICE
CERTIFICATE OF CORRECTION

PATENT NO. : 5,790,130  
DATED : August 4, 1998  
INVENTOR(S) : Ethan W. Gannett It is certified that error appears in the above-identified patent and that said Letters Patent is hereby corrected as shown below:

<u>Title page,</u>
Item [*] Notice, after Item [73] Assignee, replace "Pat. No. 5,778,028" with -- Pat. No. 5,801,708 --.

Signed and Sealed this

Twenty-sixth Day of November, 2002

*Attest:*

*Attesting Officer*

JAMES E. ROGAN
*Director of the United States Patent and Trademark Office*